US009450513B2

(12) United States Patent
Ohori et al.

(10) Patent No.: US 9,450,513 B2
(45) Date of Patent: Sep. 20, 2016

(54) CONTROL CIRCUIT AND CONTROL METHOD FOR INVERTER CIRCUIT, AND CONTROL CIRCUIT AND CONTROL METHOD FOR POWER CONVERSION CIRCUIT

(71) Applicant: DAIHEN Corporation, Osaka-shi, Osaka (JP)

(72) Inventors: Akihiro Ohori, Osaka (JP); Nobuyuki Hattori, Osaka (JP)

(73) Assignee: DAIHEN Corporation, Osaka (JP)

( * ) Notice: Subject to any disclaimer, the term of this patent is extended or adjusted under 35 U.S.C. 154(b) by 56 days.

(21) Appl. No.: 14/495,394

(22) Filed: Sep. 24, 2014

(65) Prior Publication Data

US 2015/0092462 A1 Apr. 2, 2015

(30) Foreign Application Priority Data

| Sep. 27, 2013 | (JP) | 2013-200890 |
| Oct. 25, 2013 | (JP) | 2013-221851 |
| Nov. 20, 2013 | (JP) | 2013-239642 |
| Dec. 3, 2013 | (JP) | 2013-250257 |

(51) Int. Cl.
*H02M 7/48* (2007.01)
*H02M 5/42* (2006.01)

(52) U.S. Cl.
CPC ............... *H02M 7/44* (2013.01); *H02M 1/42* (2013.01); *H02M 7/493* (2013.01);
(Continued)

(58) Field of Classification Search
CPC .......... G05F 1/44; G05F 1/613; G05F 1/614; G05F 1/66; G05F 1/67; H02M 2001/0009; H02M 2001/0012; H02M 2001/0025; H02M 2001/081; H02M 2001/082; H02M 2001/0845; H02M 2007/4803; H02M 3/33507
USPC ........ 323/241, 242, 274–277, 282–285, 288, 323/906; 363/40–42, 55–56.05, 363/56.09–56.11, 71, 78, 79, 95, 97, 98
See application file for complete search history.

(56) References Cited

U.S. PATENT DOCUMENTS 8,400,792 B2 * 3/2013 Sato ..................... H02M 7/487
363/127

(Continued)

FOREIGN PATENT DOCUMENTS

JP 2013-99132 5/2013

OTHER PUBLICATIONS

Olfati-Saber et al. "Consensus and Cooperation in Networked Multi-Agent Systems", *Proceedings of the IEEE*, vol. 95, No. 1, pp. 215-233 (2007).

(Continued)

*Primary Examiner* — Adolf Berhane
*Assistant Examiner* — Gary Nash
(74) *Attorney, Agent, or Firm* — Hamre, Schumann, Mueller & Larson, P.C.

(57) ABSTRACT

A control circuit controls the inverter circuit in one of the non-master-slave inverters connected in parallel in a power system. The control circuit includes: a target parameter controller for generating a compensation value for adjusting a target parameter to the target value; a cooperative correction value generator for generating a correction value for cooperating with another of the inverters; a PWM signal generator for generating a PWM signal based on a correction compensation value obtained by adding the correction value to the compensation value; a weighting unit for weighting the correction compensation value; and a communication unit for communicating with other inverters. The communication unit transmits the weighted correction compensation value to the other inverters. The cooperative correction value generator generates the correction value using an operation result based on the weighted correction compensation value and a reception compensation value received by the communication unit from the other inverters.

15 Claims, 49 Drawing Sheets

(51) Int. Cl.
| | |
|---|---|
| *H02M 7/68* | (2006.01) |
| *H02M 3/24* | (2006.01) |
| *H02M 7/44* | (2006.01) |
| *H02M 1/42* | (2007.01) |
| *H02M 7/5387* | (2007.01) |
| *H02M 7/5395* | (2006.01) |
| *H02M 7/493* | (2007.01) |
| *H02M 1/00* | (2006.01) |
| *H02M 3/04* | (2006.01) |
| *H02J 3/38* | (2006.01) |

(52) U.S. Cl.
CPC ..... *H02M 7/5395* (2013.01); *H02M 7/53873* (2013.01); *H02J 3/385* (2013.01); *H02M 3/04* (2013.01); *H02M 2001/0003* (2013.01); *H02M 2001/007* (2013.01); *H02M 2001/0022* (2013.01); *H02M 2001/0025* (2013.01); *H02M 2007/4822* (2013.01); *Y02B 70/12* (2013.01); *Y02E 10/58* (2013.01)

(56) References Cited

U.S. PATENT DOCUMENTS

| | | | |
|---|---|---|---|
| 8,975,847 B2* | 3/2015 | Kono | H02M 1/36 180/65.275 |
| 2008/0205096 A1* | 8/2008 | Lai | H02J 3/38 363/40 |
| 2011/0063883 A1* | 3/2011 | Hattori | H02M 7/53873 363/148 |
| 2011/0235373 A1* | 9/2011 | Shen | H02M 7/49 363/46 |
| 2012/0243276 A1* | 9/2012 | Hattori | H02M 7/5387 363/98 |
| 2013/0082636 A1* | 4/2013 | Ohori | H02P 4/00 318/723 |
| 2014/0156144 A1* | 6/2014 | Hoshi | B62D 5/0463 701/41 |

OTHER PUBLICATIONS

Masuta et al. "Load Frequency Control by use of a Number of Both Heat Pump Water Heaters and Electric Vehicles in Power System with a Large Integration of Renewal Energy Sources", *IEEJ Transactions on Power and Energy*, vol. 132, No. 1, pp. 23-33 (2012) and English abstract.

* cited by examiner

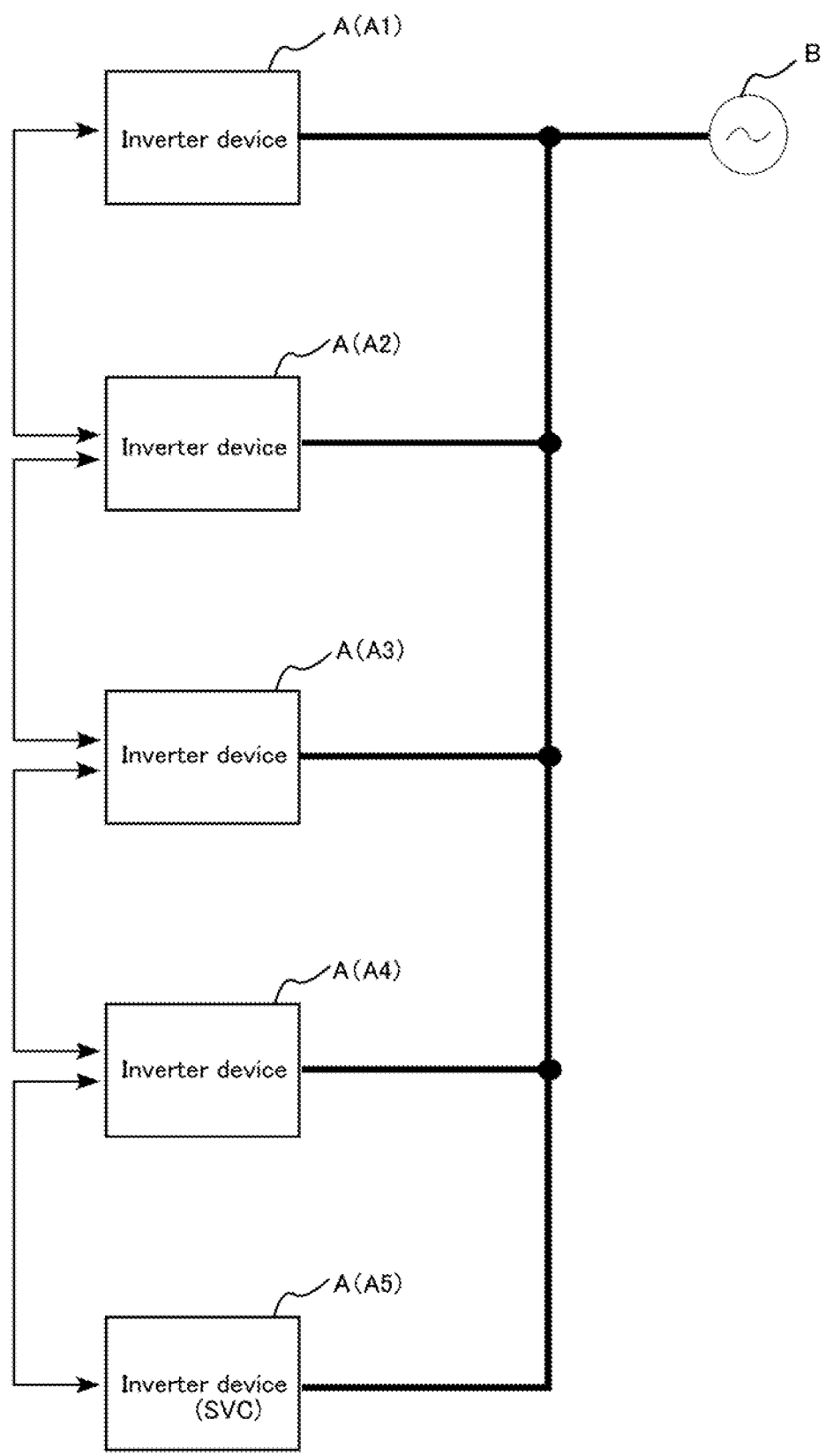

|  | January | February | March | ... |
|---|---|---|---|---|
| 8:00~9:00 | 1 | 1 | 1 | ... |
| 9:00~10:00 | 1.1 | 1 | 1 | ... |
| 10:00~11:00 | 1.4 | 1 | 1 | ... |
| 11:00~12:00 | 1.2 | 1 | 1 | ... |
| . | . | . | . | . |
| . | . | . | . | . |
| . | . | . | . | . |

|  | January | February | March | ... |
|---|---|---|---|---|
| 8:00~9:00 | 1 | 1 | 1 | ... |
| 9:00~10:00 | 0.9 | 1 | 1 | ... |
| 10:00~11:00 | 0.7 | 1 | 1 | ... |
| 11:00~12:00 | 0.8 | 1 | 1 | ... |
| . | . | . | . | . |
| . | . | . | . | . |
| . | . | . | . | . |

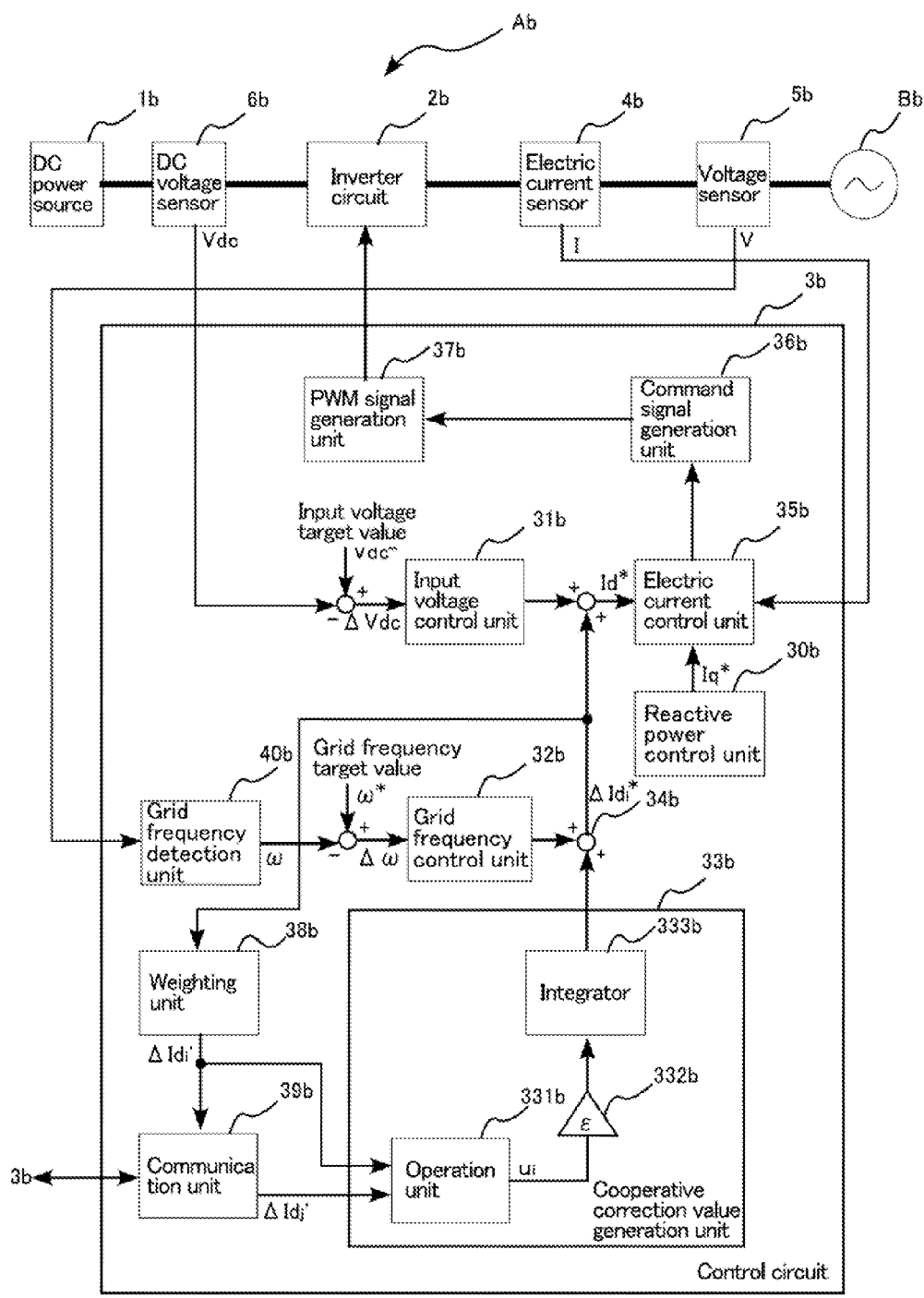

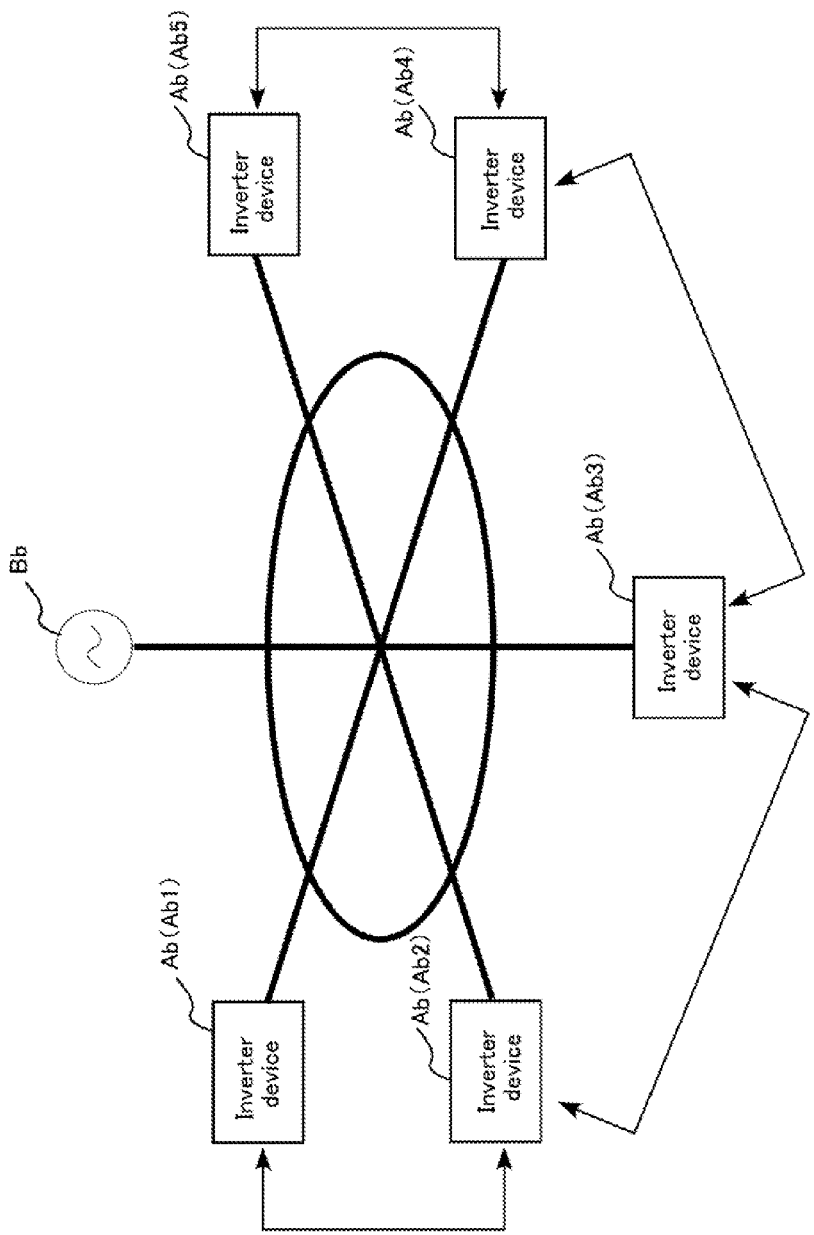

|  | January | February | March | ... |
|---|---|---|---|---|
| 8:00~9:00 | 1 | 1 | 1 | ... |
| 9:00~10:00 | 0.9 | 1 | 1 | ... |
| 10:00~11:00 | 0.7 | 1 | 1 | ... |
| 11:00~12:00 | 0.8 | 1 | 1 | ... |
| . | . | . | . | . |
| . | . | . | . | . |
| . | . | . | . | . |

CONTROL CIRCUIT AND CONTROL METHOD FOR INVERTER CIRCUIT, AND CONTROL CIRCUIT AND CONTROL METHOD FOR POWER CONVERSION CIRCUIT

BACKGROUND OF THE INVENTION

1. Field of the Invention

The present invention relates to a control circuit and a control method for controlling an inverter circuit, an inverter device provided with the control circuit, and an electric power system provided with the inverter device. Also, the present invention relates to a control circuit and a control method for controlling a power converter circuit, and a power conversion device provided with the control circuit.

2. Description of Related Art

Heretofore, inverter devices that convert direct-current (DC) power that is generated by a solar cell or the like into alternating-current (AC) power and supply the AC power to an electric power grid have been developed. In solar power plants such as mega solar power plants, large amounts of electric power are supplied to the electric power grid by connecting a large number of inverter devices in parallel. Also, a static VAR compensator (SVC) is used in order to alleviate a rise in voltage on the power transmission lines over which power is sent from the solar power plant to the electric power grid. The voltage of the interconnection points where the inverter devices are respectively connected in parallel is controlled to suppress a rise in voltage on the power transmission lines, mainly by the SVC compensating reactive power.

FIG. 13 is a conceptual diagram showing the configuration of a solar power plant in which a plurality of conventional inverter devices are connected in parallel.

Each inverter device A' converts DC power generated by a DC power source 1 that is provided with a solar cell into AC power and outputs the AC power. A large number of inverter devices A' are connected in parallel, and the power that is output by each inverter device A' is combined and supplied to an electric power system B. Each inverter device A' is provided with an inverter circuit 2 and a control circuit 3'. The inverter circuit 2 converts DC voltage that is input from the DC power source 1 into AC voltage, by switching switching elements (not shown) based on a PWM signal that is input from the control circuit 3'. The control circuit 3' generates and outputs a PWM signal for controlling the inverter circuit 2. The control circuit 3' is provided with a reactive power control unit 30'. The reactive power control unit 30' performs control such that the output reactive power of the inverter device A' is a target value. An inverter device A" (lowermost device in FIG. 13) functions as an SVC, although the configuration thereof is basically similar to the inverter device A'.

A monitoring device C performs centralized monitoring of the individual inverter devices A' and A", and sets respective target values for the output reactive power of the inverter devices A' and the inverter device A" (e.g., see Document 1). The monitoring device C causes the inverter device A" to compensate an amount of reactive power as much as possible, and causes the other inverter devices A' to compensate equally for any reactive power that cannot be compensated by the inverter device A". Also, in the case where a certain inverter device A' suffers a rise in temperature or has limited remaining capacity, the monitoring device C reduces the reactive power to be compensated by that inverter device A', and increases the load of the other inverter devices A'.

However, there is a problem with a configuration in which the monitoring device C sets the respective target values for the output reactive power of the inverter devices A' and the inverter device A" in that the system becomes large-scale. There is also a problem in that the system is open to failure due to not readily coping flexibly with an increase or decrease in the number of inverter devices. Specifically, in the above configuration, the monitoring device C needs to communicate with each of the inverter devices A' and A". In the case of wired communication, the monitoring device C needs to be connected to each of the inverter devices A' and A" with a communication line. In the case of wireless communication, it is necessary to avoid the electric waves being blocked by obstacles. Also, in the case where the number of inverter devices A' and A" is increased or decreased, the control program of the monitoring device C needs to be changed. Furthermore, there is also a problem in that in the case where the monitoring device C malfunctions, target values can no longer be set. Note that a similar problem arises even in the case where one of the inverter device A' ("master") that has the function of the monitoring device C outputs a target value to the other inverter devices A' and A" ("slave").

Document List

Document 1: JP-A-2013-99132

Document 2: Reza OLFATI-SABER, J. Alex FAX, and Richard M. MURRAY, "Consensus and Cooperation in Networked Multi-Agent Systems", proceedings of the IEEE, Vol. 95 (2007), No. 1

Document 3: Mehran MESBAHI and Magnus EGERSTEDT, "Graph Theoretic Methods in Multiagent Networks", Princeton University Press (2010)

Document 4: Taisuke MASUTA, Koichiro SHIMIZU, Akihiko YOKOYAMA, "Load Frequency Control by use of a Number of Both Heat Pump Water Heaters and Electric Vehicles in Power System with a Large Integration of Renewable Energy Sources", Transactions of the Institute of Electrical Engineers of Japan B, publication of the Power and Energy Society, Vol. 132, No. 1, pp. 23-33

SUMMARY OF THE INVENTION

The present invention has been proposed under the abovementioned circumstances. In view thereof, the present invention has as one object to provide a technology that is able to resolve the abovementioned problems.

According to one embodiment of a first aspect of the instant invention, a control circuit for controlling an inverter circuit that is included in one of a plurality of inverter devices that are connected in parallel in an electric power system and are not in a master-slave relationship is provided. This control circuit includes a target parameter control unit that generates a compensation value for controlling a predetermined target parameter (e.g., interconnection point voltage) to be a target value, a cooperative correction value generation unit that generates a correction value for cooperating with another of the plurality of inverter devices, a PWM signal generation unit that generates a PWM signal based at least on a correction compensation value obtained by adding the correction value to the compensation value, a weighting unit that weights the correction compensation value, and a communication unit that communicates with a predetermined number of other inverter devices. The communication unit transmits the weighted correction compensation value to the predetermined number of other inverter devices. The cooperative correction value generation unit generates the correction value, using an operation result that is based on the weighted correction compensation value and a reception compensation value that is received by the communication unit from each of the predetermined number of other inverter devices.

Examples of the target parameter other than the above-mentioned interconnection point voltage include a grid frequency. In the case where the target parameter is the interconnection point voltage, the target parameter control unit is referred to as an interconnection point voltage control unit, for example. Also, in the case where the target parameter is the grid frequency, the target parameter control unit is referred to as a grid frequency control unit, for example.

Note that the inverter devices not being in a master-slave relationship means that rather than a relationship where one of the inverter devices monitors or controls the other inverter devices, all the inverter devices relate to each other equally. Also, "electric power system" refers to, for example, a power plant (e.g., mega solar power plant) in which a large number of inverter devices are connected in parallel and generate solar power, a wind farm that generates wind power, or the like.

Preferably, the cooperative correction value generation unit includes an operation unit that performs an operation that is based on the weighted correction compensation value and the reception compensation value, and an integration unit that calculates the correction value by integrating the operation result that is output by the operation unit.

Preferably, the operation unit calculates an operation result by subtracting the weighted correction compensation value from the reception compensation value received from each of the predetermined number of other inverter devices, and adding together all the subtraction results.

Preferably, the operation unit calculates an operation result by subtracting the weighted correction compensation value from the reception compensation value received from each of the predetermined number of other inverter devices, adding together all the subtraction results, and dividing the addition result by the predetermined number.

Preferably, the operation unit calculates an operation result by subtracting the weighted correction compensation value from the reception compensation value received from each of the predetermined number of other inverter devices, adding together all the subtraction results, and multiplying the addition result by the weighted correction compensation value.

Preferably, the operation unit calculates an operation result by subtracting the reception compensation value received from each of the predetermined number of other inverter devices from the weighted correction compensation value, adding together all the subtraction results, and multiplying the addition result by the square of the weighted correction compensation value.

Preferably, the weighting unit divides the correction compensation value by a weight value set in advance.

Preferably, the control circuit further includes a temperature detection unit that detects a temperature of the inverter circuit, and a weight value setting unit that sets a weight value corresponding to the temperature, and the weighting unit divides the correction compensation value by the weight value set by the weight value setting unit.

Preferably, the control circuit further includes a clock unit that outputs a date-time or a time, and a weight value setting unit that stores a weight value in association with the date-time or the time, and sets a weight value corresponding to the date-time or time output by the clock unit, and the weighting unit divides the correction compensation value by the weight value set by the weight value setting unit.

Preferably, the control circuit further includes an active power calculation unit that calculates an output active power of the inverter circuit, and a weight value setting unit that sets a weight value corresponding to the output active power, and the weighting unit divides the correction compensation value by the weight value set by the weight value setting unit.

According to another embodiment of the first aspect of the instant invention, an inverter device that includes the control circuit and an inverter circuit is provided.

According to another embodiment of the first aspect of the instant invention, an electric power system in which a plurality of the inverter devices are connected in parallel is provided.

According to another embodiment of the first aspect of the instant invention, a control method for controlling an inverter circuit that is included in one of a plurality of inverter devices that are connected in parallel in an electric power system and are not in a master-slave relationship is provided. This control method has a first step of generating a compensation value for controlling a predetermined target parameter to be a target value, a second step of generating a correction value for cooperating with another of the plurality of inverter devices, a third step of generating a PWM signal based at least on a correction compensation value obtained by adding the correction value to the compensation value, a fourth step of weighting the correction compensation value, a fifth step of transmitting the weighted correction compensation value to a predetermined number of other inverter devices, and a sixth step of receiving a reception compensation value transmitted from each of the predetermined number of other inverter devices. In the second step, the correction value is generated using an operation result that is based on the weighted correction compensation value and the reception compensation value in the sixth step.

Examples of the target parameter other than the above-mentioned interconnection point voltage include a grid frequency wave.

According to the first aspect of the instant invention, the cooperative correction value generation unit generates a correction value, using an operation result that is based on a weighted correction compensation value and a reception compensation value. The weighted correction compensation values of all the inverter devices converge to the same value as a result of the cooperative correction value generation unit of each inverter device performs this processing. Accordingly, the correction compensation value of each inverter device will be a value that depends on the respective weighting. Because the output reactive power of each inverter device is controlled based on the correction compensation value, each inverter device can be made to compensate an amount of reactive power that depends on the weight. Also, each of the inverter devices need only perform mutual communication with at least one inverter device (e.g., an inverter device that is located nearby or with which communication has been established). That is, it is not necessary for one specific inverter device or a monitoring device to communicate with all the other inverter devices. Accordingly, the system does not become large-scale. Also, in the case where there is a fault with a certain inverter device, the remaining inverter devices need only be able to respectively communicate with one other inverter device. Also, it is possible to respond flexibly to an increase or decrease in the inverter devices.

According to one embodiment of a second aspect of the instant invention, a control circuit that controls an inverter circuit that is provided in one of a plurality of inverter devices that are connected in parallel with an electric power system and are not in a master-slave relationship is provided. A main difference of the control circuit according to this one embodiment of the second aspect from the control circuit according to one embodiment of the first aspect is the further provision of an "input voltage control unit" and an "addition unit".

Specifically, a control circuit that is provided by one embodiment of the second aspect of the instant invention includes an input voltage control unit that generates an active power compensation value for controlling a voltage that is input to the one inverter device, a target parameter control unit that generates a compensation value for controlling a predetermined target parameter (e.g., interconnection point voltage) to be a target value, a cooperative correction value generation unit that generates a correction value for cooperating with another of the plurality of inverter devices, an addition unit that calculates a correction compensation value by adding the correction value to the compensation value, a PWM signal generation unit that generates a PWM signal based on a value obtained by subtracting the correction compensation value from the active power compensation value, a weighting unit that weights the correction compensation value, and a communication unit that communicates with a predetermined number of other inverter devices. The communication unit transmits the weighted correction compensation value to the predetermined number of other inverter devices. The cooperative correction value generation unit generates the correction value, using an operation result that is based on the weighted correction compensation value and a reception compensation value that is received by the communication unit from each of the predetermined number of other inverter devices.

According to one embodiment of a third aspect of the instant invention, a control circuit that controls an inverter circuit that is provided in one of a plurality of inverter devices that are connected in parallel with an electric power system and are not in a master-slave relationship is provided. A main difference of the control circuit according to this one embodiment of the third aspect from the control circuit according to one embodiment of the first aspect is the further provision of an "active power control unit", a "grid frequency detection unit", and an "addition unit".

Specifically, a control circuit that is provided by one embodiment of the third aspect of the instant invention includes an active power control unit that generates an active power compensation value for controlling active power that is output or input from the one inverter device, a grid frequency detection unit that detects a predetermined target parameter such as a grid frequency, for example, a grid frequency control unit that generates a correction value for controlling the grid frequency to be a target value, a cooperative correction value generation unit that generates a correction value for cooperating with another of the plurality of inverter devices, an addition unit that calculates a correction compensation value by adding the correction value to the compensation value, a PWM signal generation unit that generates a PWM signal based on a value obtained by adding the correction compensation value to the active power compensation value, a weighting unit that weights the correction compensation value, and a communication unit that communicates with a predetermined number of other inverter devices. The communication unit transmits the weighted correction compensation value to the predetermined number of other inverter devices. The cooperative correction value generation unit generates the correction value, using an operation result that is based on the weighted correction compensation value and a reception compensation value that is received by the communication unit from each of the predetermined number of other inverter devices.

Preferably, the active power control unit is configured to restrict power that is input to the one inverter device to a state of being less than a maximum state.

Preferably, the communication unit is configured to switch communication partners based on the grid frequency that is detected by the grid frequency detection unit.

According to one embodiment of a fourth aspect of the instant invention, a control, circuit that controls a power converter circuit that converts DC power that is output by a solar cell is provided. This control circuit is constituted so as to control the DC power to be a power value that is not the maximum power value.

Preferably, the control circuit includes an output target value setting unit that sets an output target value, which is a target value of the output measurement value of the solar cell, and a PWM signal generation unit that generates a PWM signal based on the deviation of the output measurement value of the solar cell from the output target value and outputs the generated PWM signal to the power converter circuit. The output target value setting unit is configured to adjust the output target value based on the amount of change in the output power of the solar cell when the output target value is changed.

Preferably, the output target value setting unit is configured to adjust the output target value such that $\Delta P/\Delta V$ approaches a predetermined value, in the case where the output power of the solar cell changes by an amount of change $\Delta P$ when the output target value is changed by an amount of change $\Delta V$.

Preferably, the output target value setting unit is configured to reduce the output target value in the case where $\Delta P/\Delta V$ is smaller than the predetermined value when the output target value is changed, and to increase the output target value in the case where $\Delta P/\Delta V$ is greater than or equal to the predetermined value when the output target value is changed.

Preferably, the control circuit of the fourth aspect includes an output target value setting unit that sets an output target value which is the target value of the output measurement value of the solar cell, a PWM signal generation unit that generates a PWM signal based on the deviation of the output measurement value of the solar cell from the output target value and outputs the generated PWM signal to the power converter circuit, and a maximum power estimation unit that estimates the maximum power that is output by the solar cell. The output target value setting unit is configured to adjust the output target value such that the output power of the solar cell approaches a power value obtained by multiplying the maximum power estimated by the maximum power estimation unit by a predetermined rate.

Preferably, the maximum power estimation unit is configured to estimate the maximum power, based on the amount of solar radiation on the solar cell and the panel temperature of the solar cell.

Preferably, the maximum power estimation unit is configured to estimate the maximum power based on date and time.

Preferably, the control circuit of the fourth aspect includes an output target value setting unit that sets an output target value which is the target value of the output measurement value of the solar cell, a PWM signal generation unit that generates a PWM signal based on the deviation of the output measurement value of the solar cell from the output target value and outputs the generated PWM signal to the power converter circuit, and a storage unit that stores an output target value for outputting power obtained by multiplying the maximum power by a predetermined rate. The output target value setting unit is configured to read out a corresponding output target value from the storage unit and set the read output target value, based on the detected amount of solar radiation on the solar cell and the detected panel temperature of the solar cell.

Preferably, the output measurement value is a measurement value of an output voltage of the solar cell.

Preferably, the control circuit of the fourth aspect is configured to control the DC power to be a power value of 80 to 90 percent of the maximum.

Preferably, the power converter circuit is an inverter circuit that converts DC power into AC power.

Preferably, the power converter circuit is a DC/DC converter circuit that converts DC power into the DC power having a different voltage.

According to another embodiment of the fourth aspect of the instant invention, a power conversion device that includes a control circuit that has the abovementioned configuration and the power converter circuit is provided.

According to yet another embodiment of the fourth aspect of the instant invention, a method of setting an output target value, which is a target value of an output measurement value of a solar cell, in a power converter circuit that converts DC power that is output by the solar cell is provided. This method includes a first step of changing the output target value by an amount of change $\Delta V$, a second step of detecting an amount of change $\Delta P$ in the output power of the solar cell, a third step of calculating $\Delta P/\Delta V$, a fourth step of comparing $\Delta P/\Delta V$ with a predetermined value, and a fifth step of setting the next amount of change $\Delta V$ in the output target value to a negative value if $\Delta P/V\Delta$ is less than the predetermined value, and setting the next amount of change $\Delta V$ in the output target value to a positive value if $\Delta P/V\Delta$ is greater than or equal to the predetermined value.

Other features and advantages of the present invention will be more fully understood from the following detailed description, taken in conjunction with the accompanying drawings.

BRIEF DESCRIPTION OF THE DRAWINGS

FIG. 2 shows an electric power system (solar power plant) that utilizes the inverter device.

FIG. 27 is for illustrating an inverter device according to a first embodiment of the third aspect of the instant invention.

FIG. 28 shows the electric power system according to the first embodiment of the third aspect.

DETAILED DESCRIPTION OF THE PREFERRED EMBODIMENTS

<First Aspect>

Hereinafter, various embodiments of a first aspect of the instant invention will be specifically described, with reference to the drawings.

Figure 1:
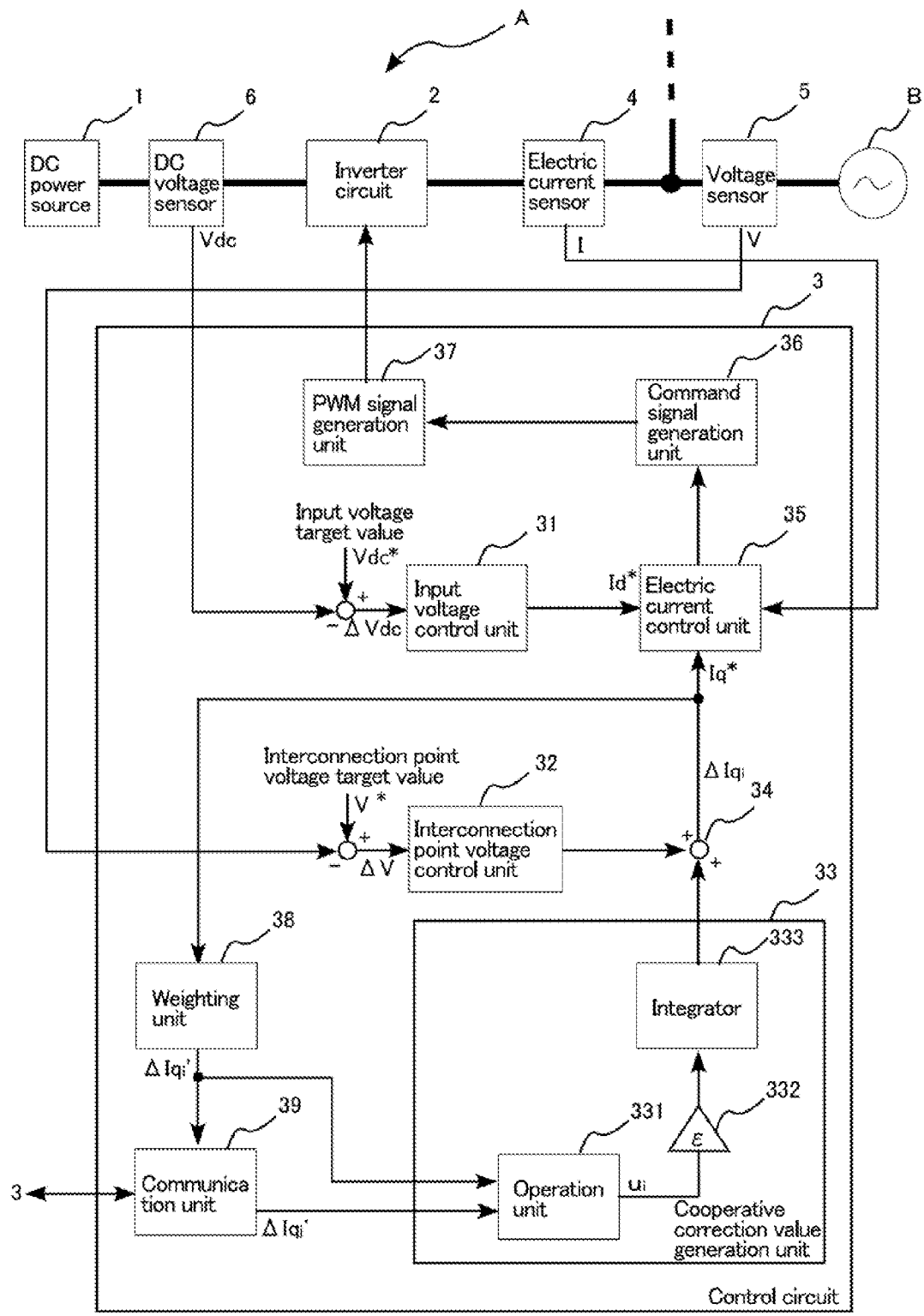
FIG. 1 is for illustrating an inverter device according to a first embodiment of a first aspect of the instant invention.

FIG. 1 is for illustrating an inverter device according to a first embodiment. FIG. 2 shows an electric power system (solar power plant) in which a plurality of inverter devices according to the first embodiment are connected in parallel.

A inverter device A is referred to as a so-called power conditioner, and is provided with an inverter circuit 2, a control circuit 3, an electric current sensor 4, a voltage sensor 5, and a DC voltage sensor 6, as shown in FIG. 1. The inverter device A converts DC power that is output by a DC power source 1 into AC power using the inverter circuit 2, and outputs the AC power. Note that, although not illustrated, a transformer for increasing (or decreasing) the AC voltage is provided on the output side of the inverter circuit 2.

As shown in FIG. 2, the inverter device A is connected in parallel with other inverter devices A. FIG. 2 shows a state where five inverter devices A (A1 to A5) are connected. Note that more inverter devices A are connected in an actual electric power system. Also, in the present embodiment, the inverter device A5 constitutes a SVC. The inverter device A5 is not connected to the DC power source 1, and a capacitor with a large capacity is provided for the capacitor of the input port.

The arrows shown in FIG. 2 indicate communication. That is, the inverter device A1 performs mutual communication with only the inverter device A2, and the inverter device A2 performs mutual communication with only the inverter device A1 and the inverter device A3. Also, the inverter device A3 performs mutual communication with only the inverter device A2 and the inverter device A4, the inverter device A4 performs mutual communication with only the inverter device A3 and the inverter device A5, and the inverter device A5 performs mutual communication with only the inverter device A4.

Returning to FIG. 1, the DC power source 1 outputs DC power and is provided with a solar cell. The solar cell generates DC power by converting solar energy into electric energy. The DC power source 1 outputs the generated DC power to the inverter circuit 2. Note that the DC power source 1 is not limited to generating DC power using a solar cell. For example, the DC power source 1 may be a fuel cell, a storage battery, an electric double-layer capacitor or a lithium ion battery, or may be a device that converts AC power generated by a diesel engine generator, a micro gas turbine generator, a wind turbine generator or the like into DC power, and outputs the DC power.

The inverter circuit 2 converts the DC power that is input from the DC power source 1 into AC power, and outputs the AC power. The inverter circuit 2 is provided with a PWM control inverter and filter that are not illustrated. The PWM control inverter is a three-phase inverter provided with three sets of six switching elements in total that are not illustrated, and converts DC power into AC power by switching the ON and OFF of each switching element based on the PWM signal that is input from the control circuit 3. The filter removes the high frequency component caused by the switching. Note that the inverter circuit 2 is not limited thereto. For example, the PWM control inverter may be a single-phase inverter, or may be a multilevel inverter. Also, another method other than PWM control may be used, such as phase shift control.

The electric current sensor 4 detects the instantaneous value of each of the three-phase output currents of the inverter circuit 2. The electric current sensor 4 digitally converts the detected instantaneous values, and outputs the resultant values to the control circuit 3 as current signals Iu, Iv and Iw (hereinafter, the three current signals may be collectively referred to as "current signals I"). The voltage sensor 5 detects the instantaneous value of each of the three-phase interconnection point voltages of the inverter device A. The voltage sensor 5 calculate an effective value by digitally converting the detected instantaneous values, and outputs the effective value to the control circuit 3 as a voltage signal V. The DC voltage sensor 6 detects the input voltage of the inverter circuit 2. The DC voltage sensor 6 digitally converts the detected voltage, and outputs the resultant voltage to the control circuit 3 as a voltage signal Vdc.

The control circuit 3 controls the inverter circuit 2, and is realized by a microcomputer or the like, for example. The control circuit 3 according to the present embodiment controls the input voltage of the inverter circuit 2, the interconnection point voltage, and the output current of the inverter circuit 2. Of these, the interconnection point voltage is controlled through the cooperation of all the inverter devices A (A1 to A5) (see FIG. 2) connected to the electric power system.

Hereinafter, a control system for controlling the interconnection point voltage will be described, with reference to FIGS. 3 to 6.

Figure 3A:
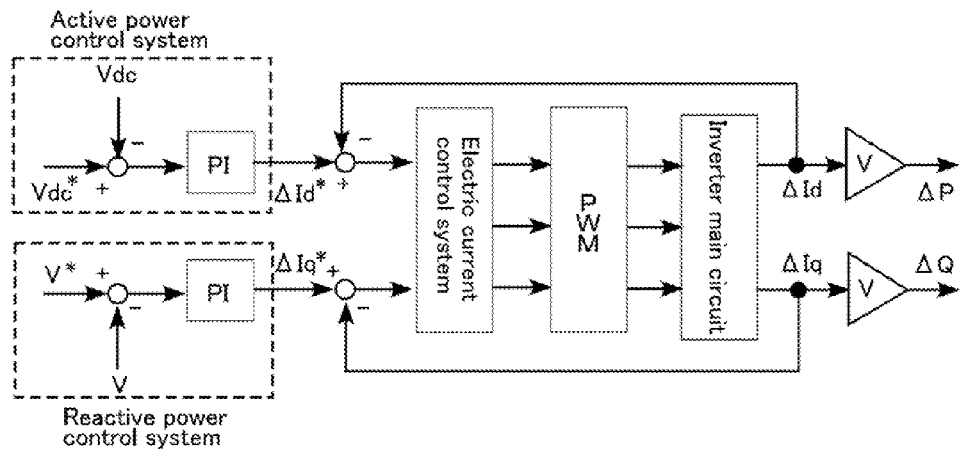
FIGS. 3A to 3C are for illustrating a reactive power control system (interconnection point voltage control system) of the inverter device.
Figure 3B:
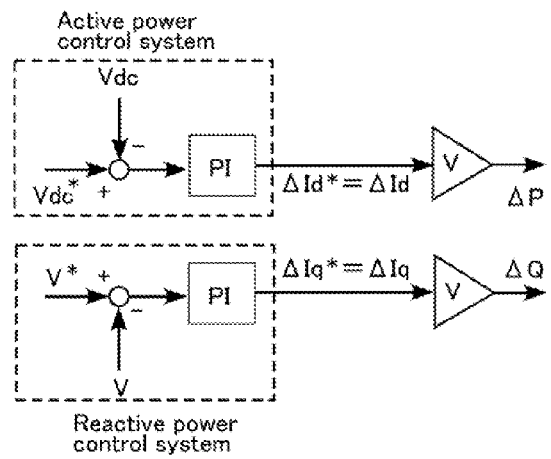
Figure 3C:
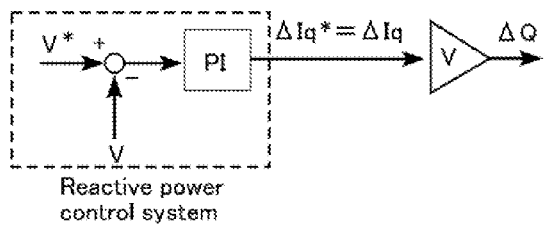

FIGS. 3A to 3C are for illustrating the reactive power control system (interconnection point voltage control system) of the inverter device A.

FIG. 3A shows a model of the inverter device A. The amount of change in active power that is output by the inverter device A is given as ΔP, the amount of change in reactive power is given as ΔQ, a d axis component and a q axis component of the output current of the inverter device A are given as ΔId and ΔIq (the respective target values are given as ΔId* and ΔIq*), and the input voltage is given as Vdc (the target value is given as Vdc*), and the interconnection point voltage is given as V (the target value is given as V*). Note that the d axis component and the q axis component are two-phase components of a rotating coordinate system after having been transformed by three-phase to two-phase transformation and rotating coordinate transformation processing that will be discussed later. Also, because the q axis component of the output voltage will be Vq=0 and the d axis component will be Vd=V, assuming that the internal phase of the inverter device A tracks the phase of the interconnection point voltage perfectly, the following holds:

$$\Delta P = Vd \cdot \Delta Id + Vq \cdot \Delta Iq = V \cdot \Delta Id$$

$$\Delta Q = Vd \cdot \Delta Iq - Vq \cdot \Delta Id = V \cdot \Delta Iq$$

The dynamics of the electric current control system, the PWM and the inverter main circuit can be disregarded, since these dynamics are fast compared with the dynamics of the power control system. FIG. 3B shows an approximated model that disregards these dynamics. A model that disregards the active power control system from the model shown in FIG. 3B, and focuses on only the reactive power control system is shown in FIG. 3C.

Figure 4A:
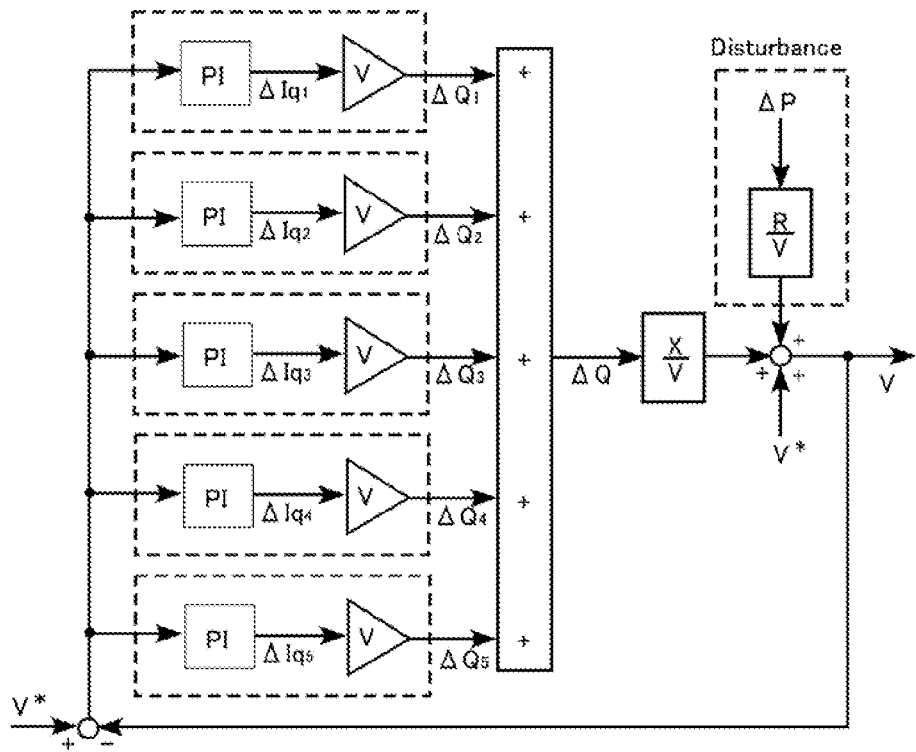
FIGS. 4A and 4B are for illustrating an interconnection point voltage control system of the entire electric power system.
Figure 4B:
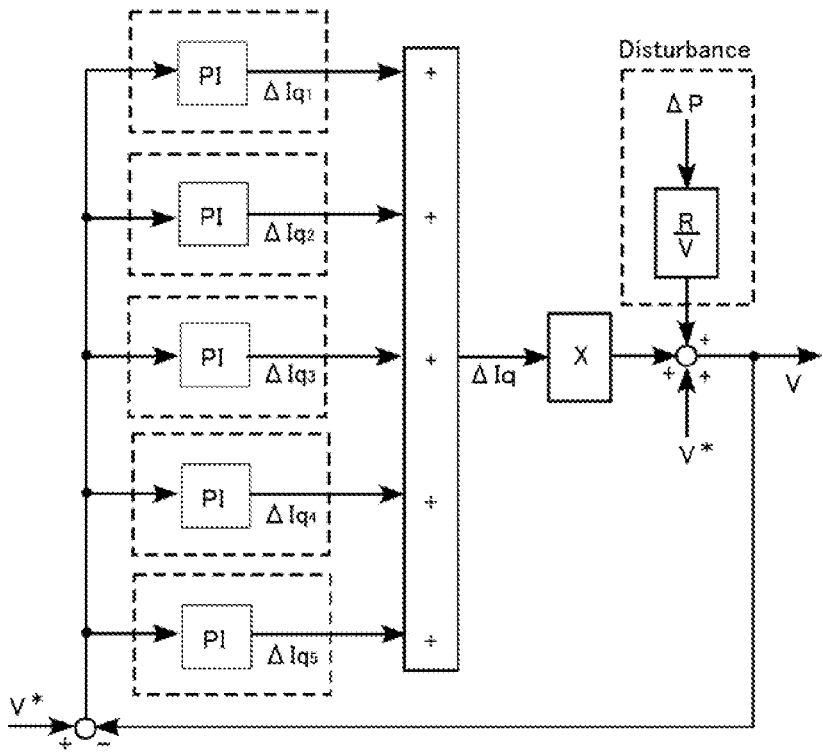

FIGS. 4A and 4B are for illustrating the interconnection point voltage control system of the entire electric power system. When the reactive powers that are output by the inverter devices A1 to A5 are respectively varied by $\Delta Q_1$ to $\Delta Q_2$, the reactive power that is supplied to the interconnection points varies by an amount of change ΔQ obtained by adding these reactive power variations together. The interconnection point voltage V varies due to the variation in the reactive power Q and the variation in the active power P that are supplied. This is represented in FIG. 4A. Note that R and X are the resistance component and the reactance component of line impedance of the power transmission line. Also, included in the variation (disturbance) in active power ΔP are load variation and variation caused by changes in the output of the solar cell.

Transforming the multiplication of V that is performed by each inverter device A such that the multiplication is performed after the addition can be realized by changing from the configuration shown in FIG. 4A to the configuration shown in FIG. 4B. FIG. 4B represents a system that controls variation in the interconnection point voltage through reactive power modulation of each inverter device A. In this case, however, not every inverter device A cooperatively outputs reactive power, and thus the reactive power that is output by each inverter device A will be determined by the gain that is set internally, the disposition location of the inverter device A, and the like. For example, it is not possible to control the inverter device A5 to compensate as much reactive power as possible and the inverter devices A1 to A4 to compensate the reactive power that the inverter device A5 is not able to compensate equally, or to cause each inverter device A to perform compensation according to the capacity thereof.

Next, a method by which the inverter devices A cooperatively output reactive power will be described.

Figure 5A:
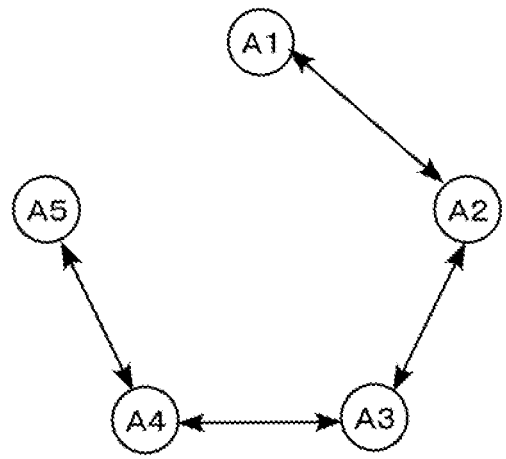
FIGS. 5A to 5C represent the electric power system shown in FIG. 2 in graph form.

Consensus algorithms that converge the values of the states of a plurality of control targets to the same value are known (see Documents 2 and 3). If, in the case where an electric power system is represented as a graph in which the communication states between the respective control targets are represented by edges and each control target represents a vertex, the graph is a connected, undirected graph in graph theory, a consensus can be reached by converging the values of the states of the control targets to the same value using a consensus algorithm. For example, the electric power system shown in FIG. 2 will be as shown in FIG. 5A when represented with a graph. The vertices A1 to A5 respectively represent the inverter devices A1 to A5, and the edges with arrows represent the communication states between the respective inverter devices. Each edge indicates mutual communication, and the graph is an undirected graph. The graph is connected because a communication path exists to any two vertices of the graph. Accordingly, a consensus can be reached in the case of the electric power system shown in FIG. 2. Because the graphs shown in FIGS. 5B and 5C axe also undirected graphs that are connected graphs, a consensus can also be reached in the case where the communication states of the inverter devices A1 to A5 in the electric power system of FIG. 2 are as shown by these graphs. Thus, a state in which each inverter device A performs mutual communication with at least one of the inverter devices A that are connected to the electric power system and a communication path exists to any two inverter devices A connected to the electric power system need only be realized (hereinafter, this state will be referred as a "connected state"), and it is not necessary for each inverter device A to communicate with all the inverter devices A connected to the electric power system.

In the present embodiment, the values of the states of the control targets are weighted rather than being converged to the same value, and the weighted values are converged to the same value. That is, a weight value $W_i$ is set for each inverter device A, the value of each state is weighted by dividing the value of the state by the weight value $W_i$, and the weighted values are converged to the same value. The values of the states are thereby converged to a value that depends on the weight value $W_i$. For example, if $W_1=W_2=W_3=W_4=1$ and $W_5=10$, the value of the state of the inverter device $A_5$ will be converged on a value that is 10 times the values of the states of the other inverter devices A.

Figure 6:
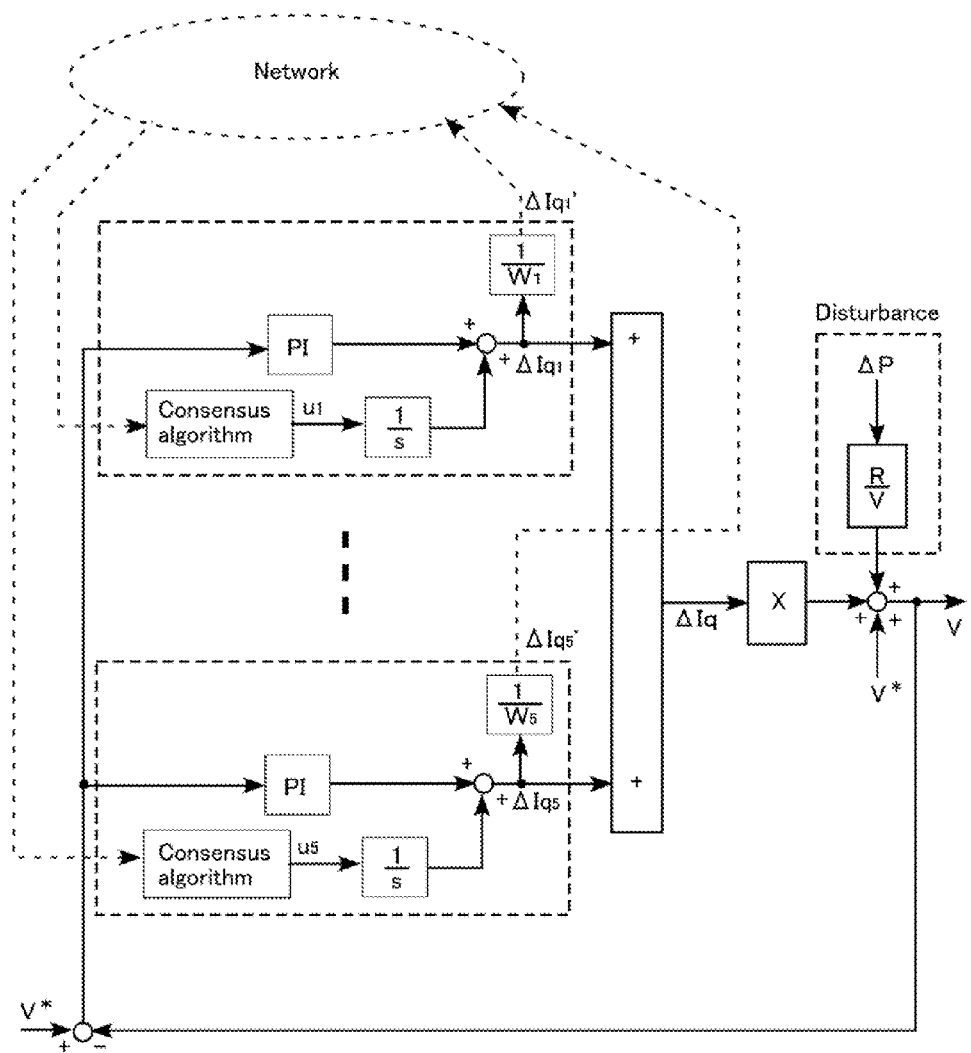
FIG. 6 represents a control system for controlling an interconnection point voltage of the entire electric power system.

FIG. 6 represents a control system in which a consensus algorithm and weighting are added to the system shown in FIG. 4B, and that suppresses the variation in the interconnection point voltage as a result of the inverter devices A each cooperatively compensating the reactive power that is the responsibility of that inverter device A.

As a result of the consensus algorithm, compensation values $\Delta Iq_i'$ ($=\Delta Iq_i/W_i$) obtained by respectively dividing compensation values $\Delta Iq_i$ by the weight values $W_i$ converge to the same value. Each inverter device $A_i$ compensates an amount of reactive power that depends on a correction value $\Delta Iq_i=W_i \cdot \Delta Iq\alpha'$, where $\Delta Iq\alpha'$ is the convergence value. In other words, reactive power that depends on the weight value $W_i$ will be compensated. Accordingly, if $W_1=W_2=W_3=W_4=1$ and $W_5=10$, for example, the inverter device $A_5$ can be made to compensate 10 times as much reactive power as the other inverter devices A.

Returning to FIG. 1, the control circuit 3 generates a PWM signal based on the current signals I that are input from the electric current sensor 4, the voltage signal V that is input from the voltage sensor 5, and the voltage signal Vdc that is input from the DC voltage sensor 6, and outputs the PWM signal to the inverter circuit 2. The control circuit 3 is provided with an input voltage control unit 31, an interconnection point voltage control unit ("target parameter control unit") 32, the cooperative correction value generation unit 33, an adder 34, an electric current control unit 35, a command signal generation unit 36, a PWM signal generation unit 37, a weighting unit 38, and a communication unit 39.

The input voltage control unit 31 is for controlling the input voltage of the inverter circuit 2. The input voltage control unit 31 controls the output active power of the inverter circuit 2 by controlling the input power through controlling the input voltage. The input voltage control unit 31 receives input of a deviation ΔVdc of the voltage signal Vdc which is input from the DC voltage sensor 6 from the input voltage target value Vdc* which is the target value of the voltage signal Vdc, performs PI control (proportional-integral control), and outputs an active power compensation value. The active power compensation value is input to the electric current control unit 35 as a target value Id*. Note that the input voltage control unit 31 is not limited to performing PI control, and may be configured to perform other control such as I control (integral control).

The interconnection point voltage control unit 32 is for controlling the interconnection point voltage. The interconnection point voltage control unit 32 controls the interconnection point voltage through controlling the reactive power that is output by the inverter circuit 2. The interconnection point voltage control unit 32 receives input of a deviation ΔV of the voltage signal V which is input from the voltage sensor 5 from the interconnection point voltage target value V* which is the target value of the voltage signal V, performs PI control, and outputs a reactive power compensation value. The reactive power compensation value is input to the adder 34. Note that the interconnection point voltage control unit 32 is not limited to performing PI control, and may be configured to perform other control such as I control (integral control).

The cooperative correction value generation unit 33 generates the cooperative correction value for cooperating with the inverter devices A. The cooperative correction value generation unit 33 will be discussed in detail later.

The adder 34 calculates the correction compensation value $\Delta Iq_i$ by adding the cooperative correction value that is input from the cooperative correction value generation unit 33 to the reactive power compensation value that is input from the interconnection point voltage control unit 32. The correction compensation value $\Delta Iq_i$ is input to the electric current control unit 35 as the target value Iq*. The adder 34 also outputs the calculated correction compensation value $\Delta Iq_i$ to the weighting unit 38.

The electric current control unit 35 is for controlling the output current of the inverter circuit 2. The electric current control unit 35 generates an electric current compensation value based on the current signals I that are input from the electric current sensor 4, and outputs the generated electric current compensation value to the command signal generation unit 36.

Figure 7:
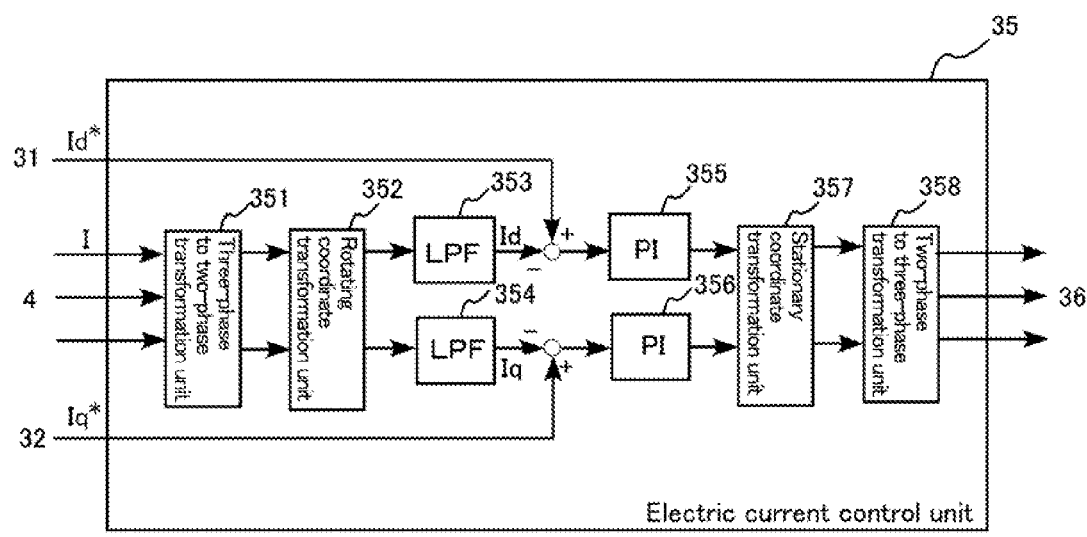
FIG. 7 is for illustrating an internal configuration of an electric current control unit.

FIG. 7 is a functional block diagram for illustrating the internal configuration of the electric current control unit 35.

The electric current control unit 35 is provided with a three-phase to two-phase transformation unit 351, a rotating coordinate transformation unit 352, a LPF 353, a LPF 354, a PI control unit 355, a PI control unit 356, a stationary coordinate transformation unit 357, and a two-phase to three-phase transformation unit 358.

The three-phase to two-phase transformation unit 351 performs so-called three-phase to two-phase transformation (αβ transformation). Three-phase to two-phase transformation is processing for transforming three-phase AC signals into equivalent two-phase AC signals, and involves transforming three-phase AC signals into the AC signal of an α-axis component and the AC signal of a β-axis component by respectively breaking down the three-phase AC signals into the components of the orthogonal α and β axes in a stationary orthogonal coordinate system (hereinafter "stationary coordinate system") and adding together the components of the axes. The three-phase to two-phase transformation unit 351 transforms the three-phase current signals Iu, Iv and Iw input from the electric current sensor 4 into an α-axis current signal Iα and a β-axis current signal Iβ, and output the current signals to the rotating coordinate transformation unit 352.

The transformation processing that is performed by the three-phase to two-phase transformation unit 351 is represented by the following equation (1).

$$\begin{bmatrix} I\alpha \\ I\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Iu \\ Iv \\ Iw \end{bmatrix} \quad (1)$$

The rotating coordinate transformation unit 352 performs so-called rotating coordinate transformation (dq transformation). Rotating coordinate transformation is processing for transforming two-phase signals of a stationary coordinate system into two-phase signals of a rotating coordinate system. The rotating coordinate system is an orthogonal coordinate system that has orthogonal d and q axes, and rotates at the same angular velocity and in the same rotation direction as the fundamental wave of the interconnection point voltage. The rotating coordinate transformation unit 352 transforms the α-axis current signal Iα and the β-axis current signal Iβ of the stationary coordinate system that are input from the three-phase to two-phase transformation unit 351, based on a phase θ of the fundamental wave of the interconnection point voltage, into a d-axis current signal Id and a q-axis current signal Iq of the rotating coordinate system, and outputs these current signals.

The transformation processing that is performed by the rotating coordinate transformation unit 352 is represented by the following equation (2).

$$\begin{bmatrix} Id \\ Iq \end{bmatrix} = \begin{bmatrix} \cos\theta & \sin\theta \\ -\sin\theta & \cos\theta \end{bmatrix} \begin{bmatrix} I\alpha \\ I\beta \end{bmatrix} \quad (2)$$

The LPF 353 and the LPF 354 are low pass filters, and respectively pass only the DC component of the d-axis current signal Id and the q-axis current signal Iq. As a result of the rotating coordinate transformation, the fundamental wave components of the α-axis current signal Iα and the β-axis current signal Iβ are respectively transformed into DC components of the d-axis current signal Id and the q-axis current signal Iq. In other words, the LPF 353 and the LPF 354 remove unbalanced and harmonic components, and pass only fundamental wave components.

The PI control unit 355 performs PI control based on the deviation of the DC component of the d-axis current signal. Id from the target value, and outputs an electric current compensation value Xd. The active power compensation value that is input from the input voltage control unit 31 is used as the target value Id* of the d-axis current signal Id. The PI control unit 356 performs PI control based on the deviation of the DC component of q-axis current signal Iq from the target value Iq*, and outputs an electric current compensation value Xq. The correction compensation value $\Delta Iq_i$ that is input from the adder 34 is used as the target value Iq* of the q-axis current signal Iq.

The stationary coordinate transformation unit 357 transforms the electric current compensation values Xd and Xq that are respectively input from the PI control unit 355 and the PI control unit 356 into electric current compensation values Xα and Xβ of the stationary coordinate system, and performs processing that is the reverse of the transformation processing performed by the rotating coordinate transformation unit 352. The stationary coordinate transformation unit 357 performs so-called stationary coordinate transformation (inverse dq transformation), and transforms the electric current compensation values Xd and Xq of the rotating coordinate system into the electric current compensation values Xα and Xβ of the stationary coordinate system based on the phase θ.

The transformation processing that is performed by the stationary coordinate transformation unit 357 is represented by the following equation (3).

$$\begin{bmatrix} X\alpha \\ X\beta \end{bmatrix} = \begin{bmatrix} \cos\theta & -\sin\theta \\ \sin\theta & \cos\theta \end{bmatrix} \begin{bmatrix} Xd \\ Xq \end{bmatrix} \quad (3)$$

The two-phase to three-phase transformation unit 358 transforms the electric current compensation values Xα and Xβ that are input from the stationary coordinate transformation unit 357 into three-phase electric current compensation values Xu, Xv and Xw. The two-phase to three-phase transformation unit 358 performs so-called two-phase to three-phase transformation (inverse αβ transformation), which is processing that is the reverse of the transformation processing performed by the three-phase to two-phase transformation unit 351.

The transformation processing that is performed by the two-phase to three-phase transformation unit 358 is represented by the following equation (4).

$$\begin{bmatrix} Xu \\ Xv \\ Xw \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} X\alpha \\ X\beta \end{bmatrix} \quad (4)$$

Note that the inverter device A was described as being a three-phase system in the present embodiment, but may be a single-phase system. In the case of a single-phase system, the electric current control unit 35 need only control a single-phase current signal obtained by detecting the output current of the inverter circuit 2.

The command signal generation unit 36 generates a command signal based on the electric current compensation values Xu, Xv and Xw that are input from the electric current control unit 35, and outputs the generated command signal to the PWM signal generation unit 37.

The PWM signal generation unit 37 generates a PWM signal. The PWM signal generation unit 37 generates the PWM signal using the triangular wave comparison method, based on a carrier signal and the command signal that is input from the command signal generation unit 36. For example, a pulse signal whose level is high in the case where the command signal is larger than the carrier signal and whose level is low in the case where the command signal is smaller than or equal to the carrier signal is generated as the PWM signal. The generated PWM signal is output to the inverter circuit 2. Note that the PWM signal generation unit 37 is not limited to generating the PWM signal with the triangular wave comparison method, and may generate the PWM signal with a hysteresis method, for example.

The weighting unit 38 weights the correction compensation value $\Delta Iq_i$ that is input from the adder 34. The weight value $W_i$ is set in advance in the weighting unit 38. The weighting unit 38 outputs a weighted correction compensation value $\Delta Iq_i'$ obtained by dividing the correction compensation value $\Delta Iq_i$ by the weight value $W_i$ to the communication unit 39 and the cooperative correction value generation unit 33.

The weight value $W_i$ is set in advance according to the size of the reactive power that is to be compensated by the inverter device A. For example, in order to make the inverter device A5 (see FIG. 2) serving as the SVC compensate as much reactive power as possible, the weight value $W_5$ of the inverter device A5 is set to a large value compared with the weight values $W_1$ to $W_4$ of the other inverter devices A1 to A4. Also, the weight values $W_1$ to $W_4$ may be the same value if the inverter devices A1 to A4 are made to compensate an amount of reactive power equally, and may be a value corresponding to the capacity if the capacities of the inverter devices A1 to A4 respectively differ. Also, a configuration may be adopted in which the weight value $W_i$ is set according to the size of the solar cell panel connected to the inverter device A. That is, the weight value $W_i$ is increased in order to make the inverter device A compensate a large amount of reactive power in the case where a small solar cell panel is connected, because the amount of electric power that is generated is small and the inverter device A has ample capacity. In contrast, in the case where a large solar cell panel is connected, the weight value $W_i$ is reduced.

The communication unit 39 communicates with the control circuit 3 of another inverter device A. The communication unit 39 receives input of the weighted correction compensation value $\Delta Iq_i'$ from the weighting unit 38, and transmits the weighted correction compensation value $\Delta Iq_i'$ to the communication unit 39 of another inverter device A. Also, the communication unit 39 outputs the correction value $\Delta Iq_j'$ received from the communication unit 39 of another inverter device A to the cooperative correction value generation unit 33. Note that the communication method is not limited, and may be wired communication or wireless communication.

For example, in the case of the inverter device A is the inverter device A2 shown in FIG. 2, the communication unit 39 transmits a weighted correction compensation value $\Delta Iq_2'$ to the communication unit 39 of the inverter devices A1 and A3, receives a correction value $\Delta Iq_1'$ from the communication unit 39 of the inverter device A1, and receives a correction value $\Delta Iq_3'$ from the communication unit 39 of the inverter device A3.

Next, the cooperative correction value generation unit 33 will be described in detail.

The cooperative correction value generation unit 33 generates the cooperative correction value for cooperating with each inverter device A, the weighted correction compensation value $\Delta Iq_i'$ (hereinafter, abbreviated to "compensation value $\Delta Iq_i'$") that is input from the weighting unit 38 and the correction value $\Delta Iq_j'$ of another inverter device A that is input from the communication unit 39. Even if the correction value $\Delta Iq_i'$ and the correction value $\Delta Iq_j'$ differ, the correction value $\Delta Iq_i'$ and the correction value $\Delta Iq_j'$ are converged to a common value by the operation processing of the cooperative correction value generation unit 33 being repeated. As shown in FIG. 1, the cooperative correction value generation unit 33 is provided with an operation unit 331, a multiplier 332, and an integrator 333.

The operation unit 331 performs the following operation processing that is based on the following equation (5). That is, the operation unit 331 subtracts the correction value $\Delta Iq_i'$ that is input from the weighting unit 38 from each compensation value $\Delta Iq_j'$ that is input from the communication unit 39, and outputs an operation result $u_i$ obtained by adding together all the subtraction results to the multiplier 332.

$$u_i = \sum_j (\Delta Iq_j' - \Delta Iq_i') \qquad (5)$$

For example, in the case where the inverter device A is the inverter device A2 (see FIG. 2), the operation unit 331 calculates the following equation (6), and outputs an operation result $u_2$.

$$\begin{aligned} u_2 &= \sum_{j=1,3} (\Delta Iq_j' - \Delta Iq_2') \qquad (6) \\ &= (\Delta Iq_1' - \Delta Iq_2') + (\Delta Iq_3' - \Delta Iq_2') \\ &= \Delta Iq_1' + \Delta Iq_3' - 2\Delta Iq_2' \end{aligned}$$

The multiplier 332 multiplies the operation result $u_i$ that is input from the operation unit 331 by a predetermined coefficient $\epsilon$, and outputs the resultant value to the integrator 333. The coefficient $\epsilon$ is a value that satisfies $0 < \epsilon < 1/d_{max}$, and is set in advance. $d_{max}$ is the maximum value of $d_i$, which is the number of other inverter devices A with which the communication unit 39 communicates, among all the inverter devices A connected to the electric power system. In other words, $d_{max}$ is the number of internal phases $\theta_j$ that is input to the communication unit 39 of the inverter device A that is communicating with the most other inverter devices A, among the inverter devices A connected to the electric power system. Note that the operation result $u_i$ is multiplied by the coefficient $\epsilon$, in order to ensure that the variation in the cooperative correction value does not become too large due to the operation result $u_i$ being overly large (small). Accordingly, in the case where processing by the cooperative correction value generation unit 33 is continuous-time processing, the multiplier 332 does not need to be provided.

The integrator 333 generates the cooperative correction value by integrating the values that are input from the multiplier 332, and outputs the generated cooperative correction value. The integrator 333 generates the cooperative correction value by adding the value that is input from the multiplier 332 to the cooperative correction value generated last time. The cooperative correction value is output to the adder 34.

In the present embodiment, the control circuit 3 was described as being realized as a digital circuit, but may be realized as an analog circuit. Also, the processing that is performed by each constituent element is designed with a program, and a computer may be caused to function as the control circuit 3 by executing the program. Also, a configuration may be adopted in which the program is recorded on a recording medium and read by a computer.

In the present embodiment, the cooperative correction value generation unit 33 generates the cooperative correction value, using the correction value $\Delta Iq_i'$ that is input from the weighting unit 38 and the correction value $\Delta Iq_j'$ of another inverter device A that is input from the communication unit 39. In the case where the correction value $\Delta Iq_i'$ is larger than the arithmetic mean value of the correction values $\Delta Iq_j'$, the operation result $u_i$ that is output by the operation unit 331 will be a negative value. When this is the case, the cooperative correction value decreases and the correction value $\Delta Iq_i'$ will also decrease. On the other hand, in the case where the correction value $\Delta Iq_i'$ is smaller than the arithmetic mean value of the correction values $\Delta Iq_j'$, the operation result $u_i$ that is output by the operation unit 331 will be a positive value. When this is the case, the cooperative correction value increases and the correction value $\Delta Iq_i'$ will also increase. In other words, the correction value $\Delta Iq_i'$ approaches the arithmetic mean value of the correction values $\Delta Iq_j'$. As a result of this processing being performed by each of the inverter devices A, the correction value $\Delta Iq_i'$ of each inverter device A converges to the same value. The fact that the values of the states of control targets converge to the same value as a result of using a consensus algorithm has also been proven mathematically (see Documents 2 and 3). In the case of the present embodiment, the correction value $\Delta Iq_i'$ is the value of a state of a control target.

Hereinafter, simulation that confirms that variation in the interconnection point voltage is suppressed by each inverter device A cooperatively compensating reactive power in the electric power system shown in FIG. 2 will be described.

Figure 8A:
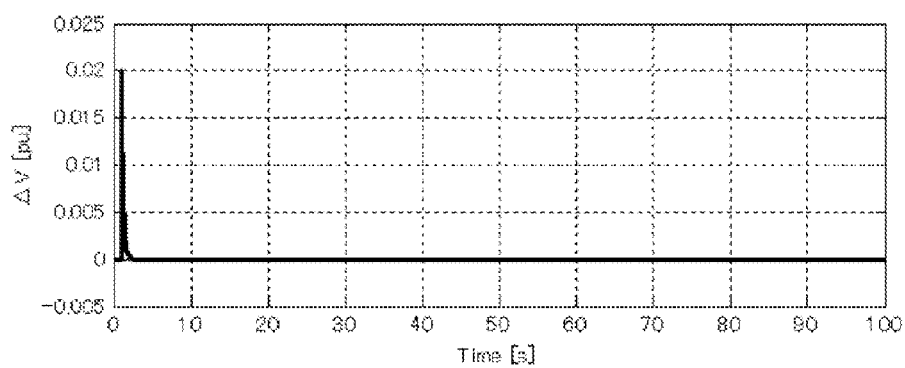
FIGS. 8A and 8B show simulation results relating to suppression of variation in the interconnection point voltage of an electric power system.
Figure 8B:
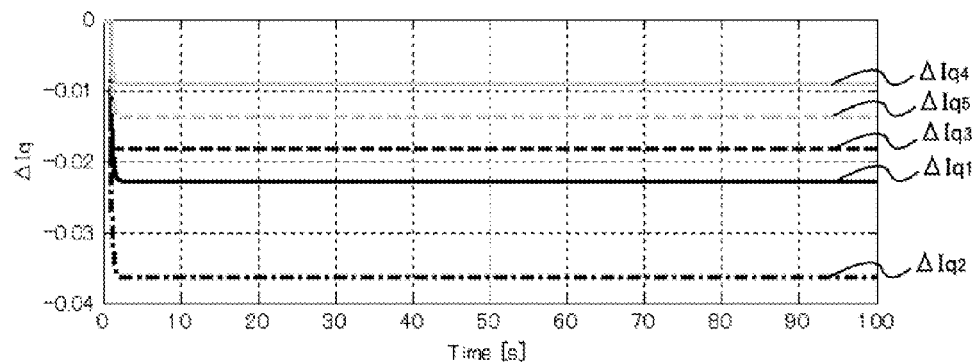
Figure 9A:
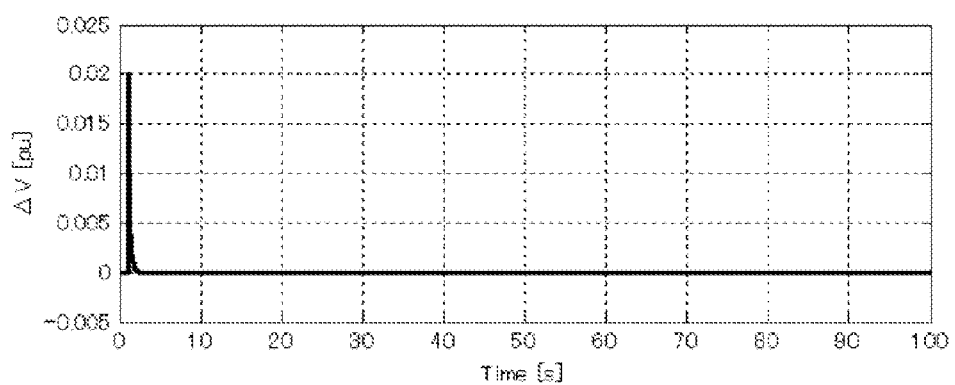
FIGS. 9A and 9B show simulation results relating to suppression of variation in the interconnection point voltage of an electric power system.
Figure 9B:
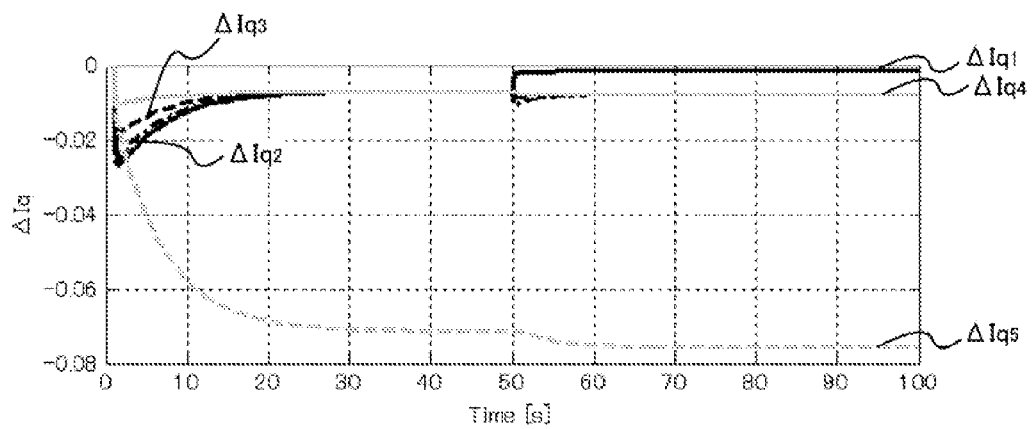

A proportional gain $Kp_1$ of the interconnection point voltage control unit 32 of the inverter device A1 is given as "0.5", an integral gain $Ki_1$ is given as "5", a proportional gain $Kp_2$ of the interconnection point voltage control unit 32 of the inverter device A2 is given as "1", an integral gain $Ki_2$ is given as "8", a proportional gain $Kp_3$ of the interconnection point voltage control unit 32 of the inverter device A3 is given as "1", an integral gain $Ki_3$ is given as "4", a proportional gain $Kp_4$ of the interconnection point voltage control unit 32 of the inverter device A4 is given as "0.2", an integral gain $Ki_4$ is given as "2", a proportional gain $Kp_5$ of the interconnection point voltage control unit 32 of the inverter device A5 is given as "0.3", an integral gain $Ki_5$ is given as "3", and the weight values $W_1$ to $W_5$ set in the weighting units 38 of the inverter devices A1 to A5 are given as $W_1=W_2=W_3=W_4=1$ and $W_5=10$. FIGS. 8A and 8B and FIGS. 9A and 9B show the results of the simulation, with FIGS. 8A and 8B showing the results in the case where cooperation is not performed (i.e., in the case of a configuration without the cooperative correction value generation unit 33, the weighting unit 38, and the communication unit 39 shown in FIG. 1), and FIGS. 9A and 9B showing the results in the case where cooperation is performed (i.e., the case of the configuration shown in FIG. 1).

In both cases, an interconnection point voltage variation of 0.05 p.u. was injected as a disturbance one second after the start of simulation. Also, in the case of FIGS. 9A and 9B, the weight value $W_i$ of the inverter device A1 was changed from "1" to "0.2" 50 seconds after the start of simulation. FIG. 8A and FIG. 9A show the temporal change in the interconnection point voltage deviation $\Delta V$ (=V*−V). Also, FIG. 8B and FIG. 9B show the temporal change in the correction values $\Delta Iq_1$ to $\Delta Iq_5$ that are respectively output by the adders 34 of the inverter devices A1 to A5.

In the case of FIGS. 8A and 8B, variation in the interconnection point voltage can be quickly suppressed, but the value of each of the correction compensation values $\Delta Iq$ to $\Delta Iq_5$ is fixed to a value that depend on the respective gain. Accordingly, the amount of reactive power that each of the inverter devices A1 to A5 compensates cannot be controlled. In the case of FIG. 8B, the inverter device A2 compensates the most reactive power, and the inverter device A5, which is originally supposed to compensate the most reactive power, only compensates a small amount of reactive power.

In the case of FIGS. 9A and 9B, variation in the interconnection point voltage can also be quickly suppressed, similarly to the case of FIGS. 8A and 8B. Also, in the case of FIGS. 9A and 9B, each of the inverter devices A1 to A5 compensates an amount of reactive power that depends on the respective weight values $W_1$ to $W_5$. That is, as shown in FIG. 9B, the correction compensation values $\Delta Iq_1$ to $\Delta Iq_4$ converge to the same value approximately 30 seconds after the start of simulation, and the correction compensation value $\Delta Iq_5$ converges to a value that is approximately ten times the convergence value of the correction compensation values $\Delta Iq_1$ to $\Delta Iq_4$. Accordingly, the inverter device A5 compensates about ten times more reactive power than the inverter devices A1 to A4. Also, after changing the weight value $W_1$ 50 seconds after the start of simulation, the correction compensation value $\Delta Iq_1$ increases (i.e., the reactive power to be compensated decreases), and the correction compensation values $\Delta Iq_2$ to $\Delta Iq_5$ decrease (i.e., the reactive power to be compensated increases). In other words, the inverter devices A2 to A5 are charged with compensating some of the reactive power that was compensated by the inverter device A1.

Figure 5B:
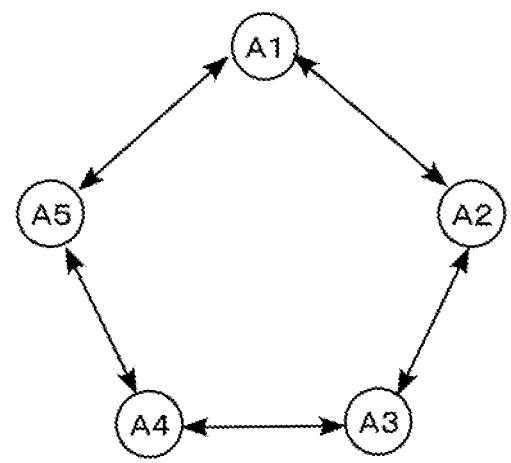
Figure 5C:
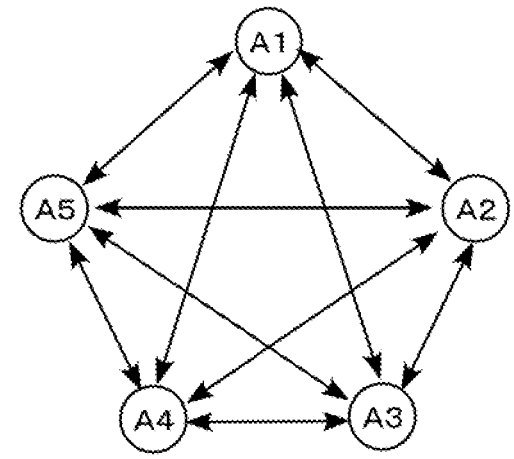

Simulation was also respectively performed for cases where the communication state of the electric power system shown in FIG. 2 is as depicted in the graphs shown in FIGS. 5B and 5C. It was also confirmed in these cases that, similarly to the case of FIGS. 9A and 9B, variation in the interconnection point voltage can be quickly suppressed, and each of the inverter devices A1 to A5 compensates an amount of reactive power that depends on the respective weight values $W_1$ to $W_5$. Also, the time taken for the correction compensation values $\Delta Iq_1$ to $\Delta Iq_5$ to converge was shorter in the case of the graph of FIG. 5B than in the case of FIGS. 9A and 9B (in the case of the graph of FIG. 5A), and the time taken to converge was even shorter in the case of the graph of FIG. 5C. Note that illustration of the simulation results is omitted.

According to the present embodiment, the cooperative correction value generation unit 33 generates a cooperative correction value using an operation result that is based on the correction value $\Delta Iq_i'$ and the correction value $\Delta Iq_j'$. The compensation values $\Delta Iq_i'$ of all the inverter devices A1 to A5 converge to the same value, as a result of the cooperative correction value generation unit 33 of each of the inverter devices A1 to A5 performing this processing. Accordingly, the correction compensation value $\Delta Iq_i$ of each of the inverter devices A1 to A5 will be a value that depends on the respective weight values $W_1$ to $W_5$. Because the output reactive power of each of the inverter devices A1 to A5 is controlled based on the correction compensation value $\Delta Iq_i$, the inverter devices A1 to A5 can be made to compensate an amount of reactive power that depends on the weight values $W_1$ to $W_5$.

Also, a configuration need only be adopted in which each of the inverter devices A connected to the electric power system only performs mutual communication with at least one inverter device A (e.g., an inverter device A that is located nearby or with which communication has been established) and the electric power system is in a connected state, and it is not necessary for one inverter device A or a monitoring device to perform communication with all the other inverter devices A. Accordingly, the system does not become large-scale. Also, even in the case where there is a fault with a certain inverter device A or one of the inverter devices A is eliminated, all of the remaining inverter devices A need only be able to communicate with one inverter device A, and the electric power system need only be in a connected state. Also, in the case of adding an inverter device A, that inverter device A need only be able to perform mutual communication with at least one inverter device A. Accordingly, the number of inverter devices A can be flexibly increased or decreased.

Note that although the case where the operation equation that is set in the operation unit 331 is the equation (5) was described in the first embodiment, the present invention is not limited thereto. Any other equation that converges the correction values $\Delta Iq_i'$ of the inverter devices A1 to A5 to the same value may be used.

For example, the correction values $\Delta Iq_1'$ can also be converges to the same value in the case where the operation equation that is set in the operation unit 331 is the following equation (7), where $d_i$ is the number of other inverter devices A with which the communication unit 39 communicates, that is, the number of the correction values $\Delta Iq_j'$ that is input to the communication unit 39.

$$u_i = \frac{1}{d_i} \sum_j (\Delta Iq_j' - \Delta Iq_i') \qquad (7)$$

The compensation values $\Delta Iq_i'$ can also be converges to the same value in the case where the operation equation that is set in the operation unit 331 is the following equations (8) to (10).

$$u_i = \Delta Iq_i' \sum_j (\Delta Iq_j' - \Delta Iq_i') \qquad (8)$$

$$u_i = \Delta Iq_i'^2 \sum_j (\Delta Iq_i' - \Delta Iq_j') \qquad (9)$$

$$u_i = \frac{1}{P \Delta Iq_i'^{P-1}} \sum_j (\Delta Iq_j' - \Delta Iq_i') \qquad (10)$$

Although the case where a fixed value is set in advance as the weight value of each inverter device A was described in the first embodiment, the present invention is not limited thereto. A configuration may be adopted in which the weight value of each inverter device A is changeable.

Figure 10:
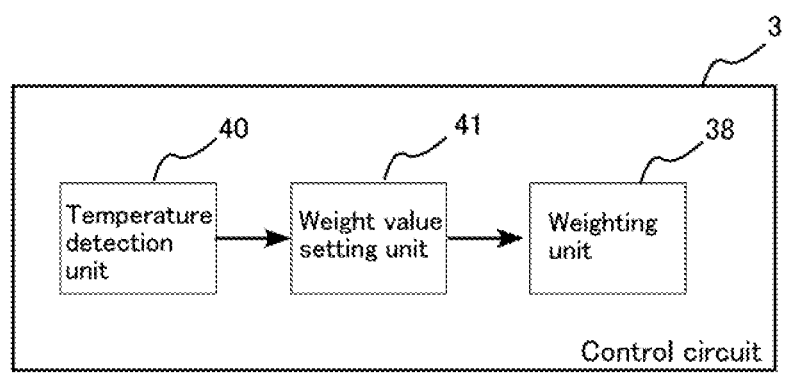
FIG. 10 is for illustrating an inverter device according to a second embodiment of the first aspect.

FIG. 10 is for illustrating an inverter device A according to a second embodiment. In FIG. 10, only the control circuit 3 is shown, and illustration of portions of the control circuit 3 that are in common with the control circuit 3 according to the first embodiment (see FIG. 1) is omitted. The inverter device A according to the second embodiment differs from the inverter device A according to the first embodiment in that the weight value $W_i$ is changed according to the temperature of the inverter circuit 2. As shown in FIG. 10, the control circuit 3 of the inverter device A according to the second embodiment is further provided with a temperature detection unit 40 and a weight value setting unit 41.

Although not illustrated, a temperature sensor is attached to a heat sink of the inverter circuit 2. The temperature detection unit 40 detects the temperature that is detected by the temperature sensor, and outputs the detected temperature to the weight value setting unit 41. The weight value setting unit 41 sets a weight value $W_i$ that depends on the temperature that is input from the temperature detection unit 40 in the weighting unit 38. It is thought that a load is placed on the inverter circuit 2 in the case where the temperature of the inverter circuit 2 is high, making it preferable to reduce the load involved in compensating reactive power. Accordingly, the weight value setting unit 41 sets the weight value $W_i$ to a smaller value as the temperature that is input from the temperature detection unit 40 increases. In the present embodiment, the temperature that is input from the temperature detection unit 40 is compared with a threshold that is set in advance, and the weight value $W_i$ is changed to a small value in the case where the temperature is larger than the threshold. Note that a configuration may be adopted in which a plurality of thresholds are set and the weight value $W_i$ is changed gradually. Also, a configuration may be adopted in which a calculation equation that calculates the weight value $W_i$ linearly based on the temperature that is input from the temperature detection unit 40 is set, and the calculation result of the calculation equation is set.

According to the second embodiment, the weight value $W_i$ is changed to a small value, in the case where the inverter circuit 2 of the inverter device A is overloaded and the temperature of the inverter circuit 2 becomes high. The reactive power that is compensated by the inverter device A is thereby reduced, and the other inverter devices A are charged with compensating that amount of reactive power. Accordingly, the load on the inverter circuit 2 of that inverter device A is reduced. Similar effects to the first embodiment can also be accomplished in the second embodiment.

Figures 11A, 11B:
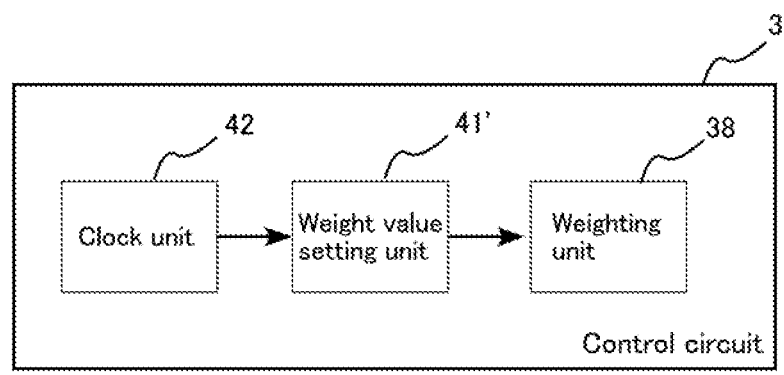
FIGS. 11A and 11B are for illustrating an inverter device according to a third embodiment of the first aspect.

FIGS. 11A and 11B are for illustrating an inverter device A according to a third embodiment. In FIG. 11A, only the control circuit 3 of the inverter device A according to the third embodiment is shown, and illustration of portions of the control circuit 3 that are in common with the control circuit 3 according to the first embodiment (see FIG. 1) is omitted. The inverter device A according to the third embodiment differs from the inverter device A according to the first embodiment in that the weight value $W_i$ is changed by date and/or time. As shown in FIG. 11A, the control circuit 3 of the inverter device A according to the third embodiment is further provided with a clock unit 42 and a weight value setting unit 41'.

The clock unit 42 outputs the date and time (hereinafter, referred to as "date-time") to the weight value setting unit 41'.

The weight value setting unit 41' sets a weight value $W_i$ that depends on the date-time that is input from the clock unit 42 in the weighting unit 38. Because the position of the sun changes with the time of day, the area that is in the shadow of a building or the like changes with the time of day. Also, because the orbit of the sun changes with the time of year (e.g., the sun's orbit differs greatly between the summer and winter solstices), the area that is in the shadow of a building or the like changes also with the time of year. In the case where the solar cell panel connected to the inverter device A is in shadow, the amount of electric power that is generated by the solar cell panel is small. In this case, the inverter device A has excess capacity, and thus can be made to compensate a large amount of reactive power. In the present embodiment, solar cell panels that are in shadow are searched for in advance, and the weight value $W_i$ of inverter devices A to which a solar cell panel that is in shadow is connected is switched to a large value at the date-time at which the solar cell panel is in shadow. Also, the weight value $W_i$ is increased as the size of the area that is in shadow increases. Specifically, the weight value setting unit 41' stores a table of weight values $W_i$ shown in FIG. 11B in a memory, and reads out and sets a weight value $W_i$ corresponding to the date-time that is input from the clock unit 42. Because the solar cell panel is in shadow from 9:00 to 12:00 in January, a larger value than usual is set for this date-time in FIG. 11B. Note that a configuration may be adopted in which the weight value $W_i$ is only changed by time regardless of the date, or is changed only by date regardless of the time.

According to the third embodiment, the weight value $W_i$ is changed to a large value at the date-time at which the solar cell panel that is connected to the inverter device A is in shadow, and the inverter device A can be made to compensate a larger amount of reactive power than usual. Similar effects to the first embodiment can also be accomplished in the third embodiment.

Figure 12:
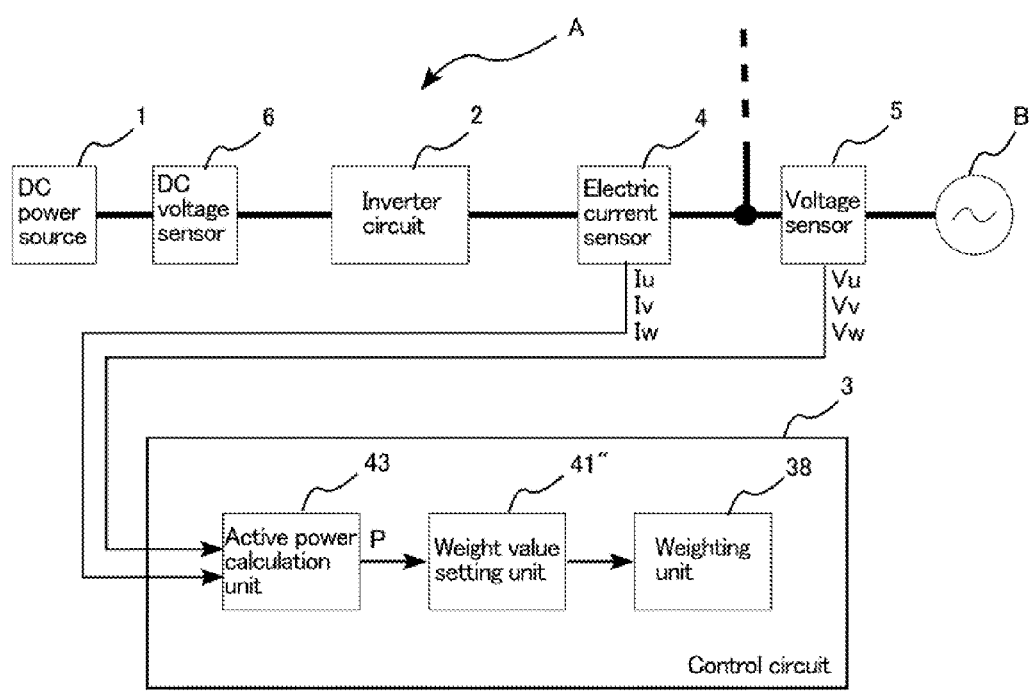
FIG. 12 is for illustrating an inverter device according to a fourth embodiment of the first aspect.
Figure 13:
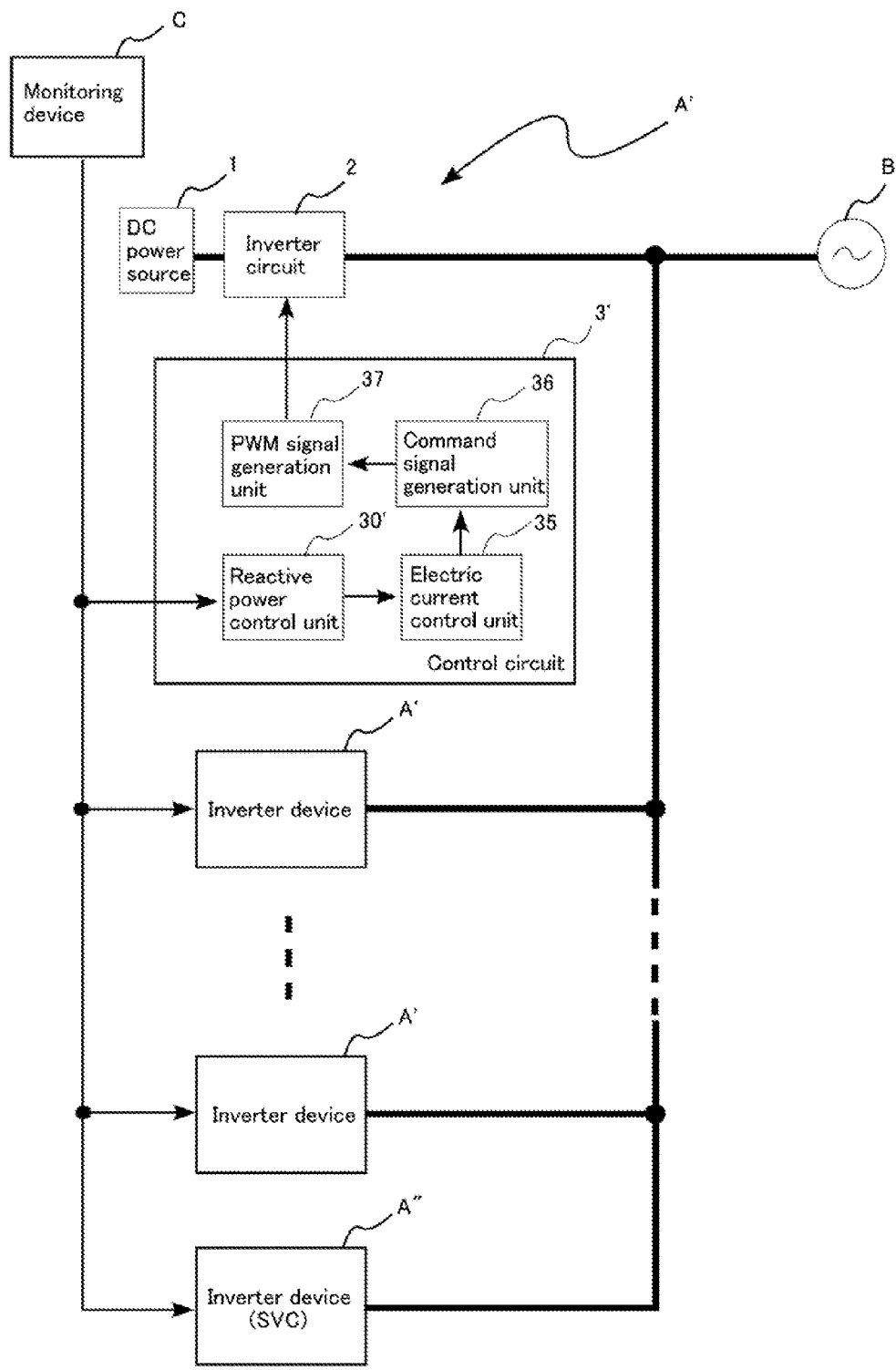
FIG. 13 shows a solar power plant that uses a plurality conventional inverter devices.

FIG. 12 is for illustrating an inverter device A according to a fourth embodiment. In FIG. 12, illustration of portions that are in common with the control circuit 3 according to the first embodiment (see FIG. 1) are omitted. The inverter device A according to the fourth embodiment differs from the inverter device A according to the first embodiment in that the weight value $W_i$ is changed according to the output active power of the inverter circuit 2. As shown in FIG. 12, the control circuit 3 of the inverter device A according to the fourth embodiment is further provided with an active power calculation unit 43 and a weight value setting unit 41".

The active power calculation unit 43 is for calculating an output active power P of the inverter circuit 2, and calculates the output active power P from the current signals Tu, Iv and Iw that are input from the electric current sensor 4 and from voltage signals Vu, Vv and Vw input from the voltage sensor 5 that are obtained by digitally converting the instantaneous value of the three-phase interconnection point voltages. The active power calculation unit 43 outputs the calculated output active power P to the weight value setting unit 41".

The weight value setting unit 41" sets a weight value $W_i$ that depends on the output active power P that is input from the active power calculation unit 43 in the weighting unit 38. Because the inverter device A has little remaining capacity in the case where there is a large amount of output active power P, the amount of reactive power that the inverter circuit 2 compensates is reduced in the present embodiment. That is, the weight value setting unit 41" compares the output active power P that is input from the active power calculation unit 43 with a threshold that is set in advance, and changes the weight value $W_i$ to a small value in the case where the output active power P is greater than the threshold. Note that a configuration may be adopted in which a plurality thresholds are set and the weight value $W_i$ is changed gradually. Also, a configuration may be adopted in which the calculation equation for calculating the weight value $W_i$ linearly from the output active power P is set, and the calculation result of the calculation equation is set.

According to the fourth embodiment, the weight value $W_i$ is converted into a small value in the case where the amount of output active power P of the inverter device A is large. The amount of reactive power that is compensated by the inverter device A is thereby reduced, and the other inverter devices A are charged with compensating that amount of reactive power. Accordingly, the load on the inverter circuit 2 of that inverter device A is reduced. Similar effects to the first embodiment can also be accomplished in the fourth embodiment.

Although the case where the weight value $W_i$ is reduced when the amount of output active power P of the inverter device A is large was described in the fourth embodiment, the present invention is not limited thereto. The weight value $W_i$ may conversely be increased to also increase the output reactive power in response to an increase in output active power P, and the power factors of the inverter devices A may be matched.

<Second Aspect>

According to the first aspect of the instant invention, as described above, it becomes possible to control the amount of reactive power that is compensated by each inverter device A' and A".

On the other hand, there is a limit to amount of reactive power that can be compensated. For example, in the case where the capacity of each inverter device A' and A" is small or where a minimum power factor is set, reactive power cannot be sufficiently compensated to alleviate a rise in voltage on the power transmission line. In particular, it is difficult to compensate reactive power in the case where the reactance component of the line impedance of the power transmission line is small compared with the resistance component. There is also a method of suppressing the output active power of each inverter device A' in order to alleviate a rise in voltage on a power transmission line. However, a separate monitoring device is also needed in this case, in order to adjust the amount by which the output active power of each inverter device A' is suppressed.

In view of the above, according to a second aspect of the instant invention, a method that enables the suppression amount of output active power of each inverter device to be adjusted is provided, as will be described below.

Hereinafter, various embodiments of the second aspect of the instant invention will be specifically described, with reference to the drawings.

Figure 14:
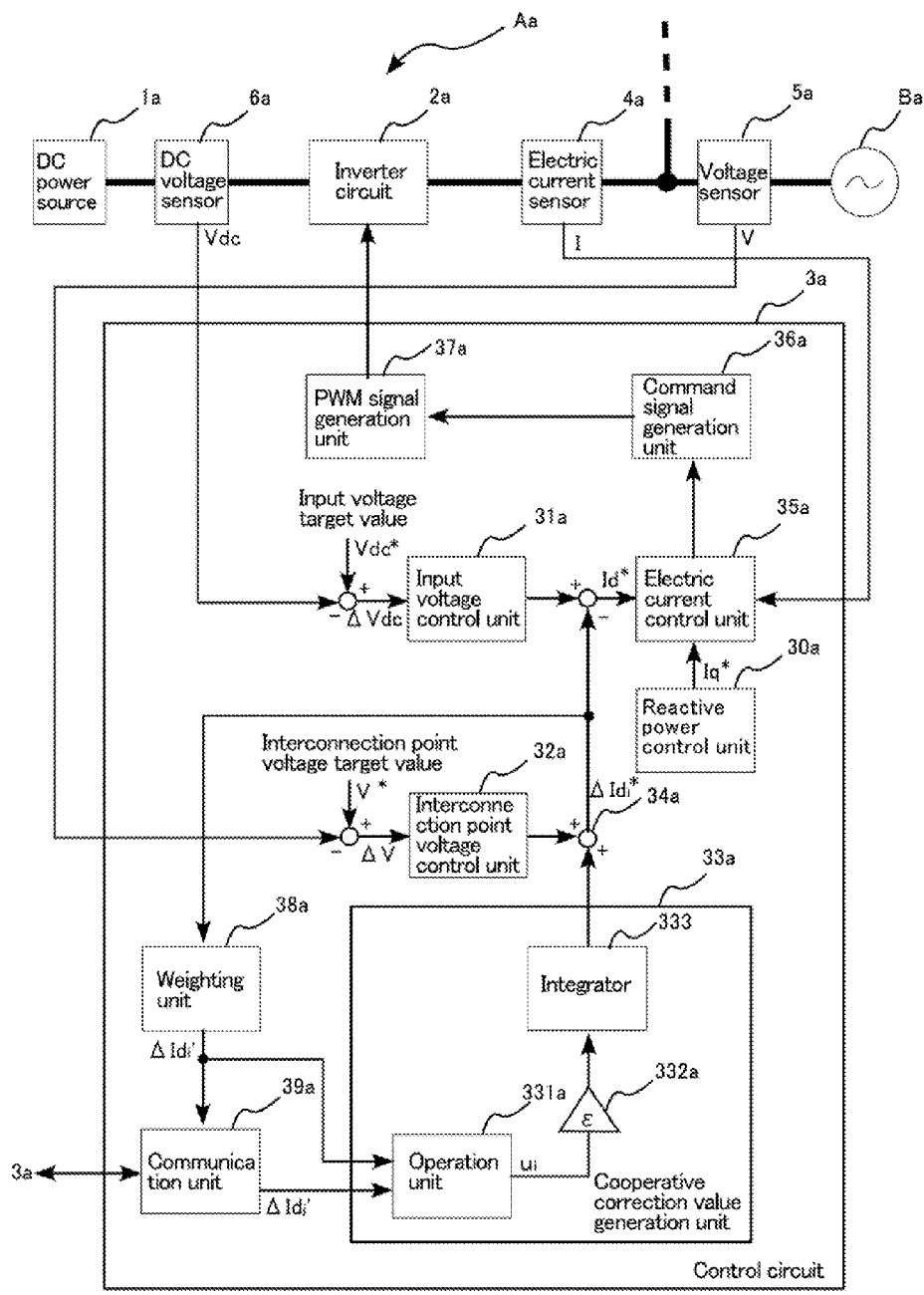
FIG. 14 is for illustrating an inverter device according to a first embodiment of a second aspect of the instant invention.
Figure 15:
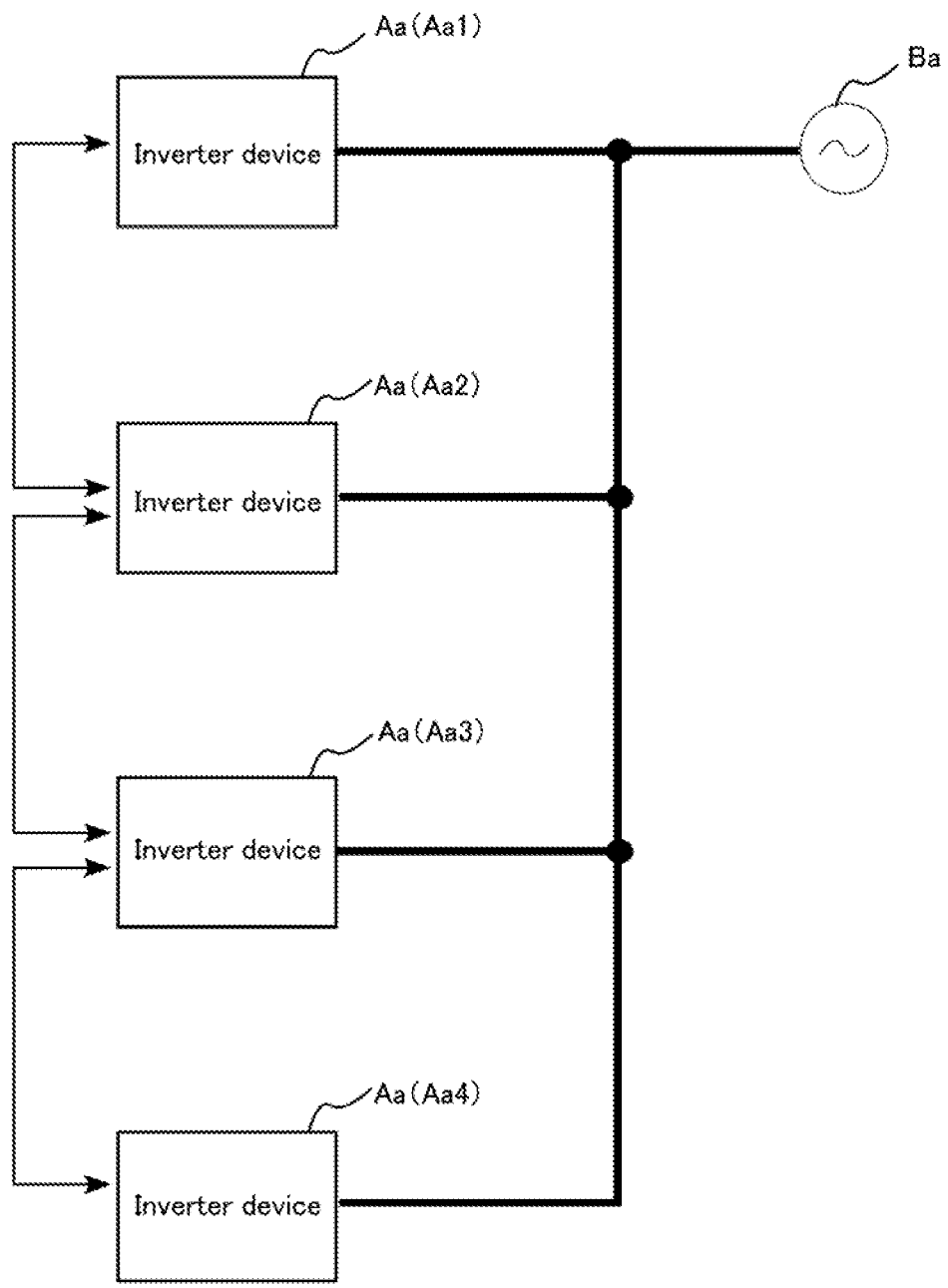
FIG. 15 shows a solar power plant that utilizes an inverter device according to the first embodiment of the second aspect.

FIG. 14 is for illustrating an inverter device according to a first embodiment of the second aspect. FIG. 15 shows an electric power system (solar power plant) in which a plurality of inverter devices according to the first embodiment are connected in parallel.

The inverter device Aa is a so-called power conditioner, and is provided with an inverter circuit 2a, a control circuit 3a, an electric current sensor 4a, a voltage sensor 5a, and a DC voltage sensor 6a, as shown in FIG. 14. The inverter device Aa converts DC power that is output by a DC power source 1a into AC power using the inverter circuit 2a, and outputs the AC power. Note that, although not illustrated, a transformer for increasing (or decreasing) the AC voltage is provided on the output side of the inverter circuit 2a.

Also, as shown in FIG. 15, the inverter device Aa is connected in parallel with other inverter devices Aa. In FIG. 15, a state where four inverter devices Aa (Aa1 to Aa4) are connected is shown. Note that more inverter devices Aa are connected in an actual electric power system.

The arrows shown in FIG. 15 indicate communication. That is, the inverter device Aa1 performs mutual communication with only the inverter device Aa2, and the inverter device Aa2 performs mutual communication with only the inverter device Aa1 and the inverter device Aa3. Also, the inverter device Aa3 performs mutual communication with only the inverter device Aa2 and the inverter device Aa4, and the inverter device Aa4 performs mutual communication with only the inverter device Aa3.

Returning to FIG. 14, the DC power source 1a outputs DC power, and is provided with a solar cell. The solar cell generates DC power by converting solar energy into electric energy. The DC power source 1a outputs the generated DC power to the inverter circuit 2a. Note that the DC power source 1a is not limited to generating DC power using a solar cell. For example, the DC power source 1a may be a fuel cell, a storage battery, an electric double-layer capacitor or a lithium ion battery, or may be device that converts AC power generated by a diesel engine generator, a micro gas turbine generator, a wind turbine generator or the like into DC power, and outputs the DC power.

The inverter circuit 2a converts the DC power that is input from the DC power source 1a into AC power, and outputs the AC power. The inverter circuit 2a is provided with a PWM control inverter and a filter that are not illustrated. The PWM control inverter is a three-phase inverter provided with three sets of six switching elements in total that are not illustrated, and converts DC power into AC power by switching the ON and OFF of each switching element based on the PWM signal that is input from the control circuit 3a. The filter removes the high frequency component caused by the switching. Note that the inverter circuit 2a is not limited thereto. For example, the PWM control inverter may be a single-phase inverter, or may be a multilevel inverter. Also, another method other than PWM control may be used, such as phase shift control.

The electric current sensor 4a detects the instantaneous value of each of the three-phase output currents of the inverter circuit 2a. The electric current sensor 4a digitally converts the detected instantaneous values, and outputs the resultant values to the control circuit 3a as the current signals Iu, Iv and Iw (hereinafter, the three current signals may be collectively referred to as "current signals I"). The voltage sensor 5a detects the instantaneous value of each of the three-phase interconnection point voltages of the inverter device Aa. The voltage sensor 5a calculates an effective value by digitally converting the detected instantaneous values, and outputs the effective value to the control circuit 3a as a voltage signal V. The DC voltage sensor 6a detects the input voltage of the inverter circuit 2a. The DC voltage sensor 6a digitally converts the detected voltage, and outputs the resultant voltage to the control circuit 3a as a voltage signal Vdc.

The control circuit 3a controls the inverter circuit 2a, and is realized by a microcomputer or the like, for example. The control circuit 3a according to the present embodiment controls the input voltage, the output reactive power and the output current of the inverter circuit 2a, and the interconnection point voltage. Of these, the interconnection point voltage is controlled through the cooperation of all the inverter devices Aa (Aa1 to Aa4) (see FIG. 15) connected to the electric power system.

Hereinafter, a control system for controlling the interconnection point voltage according to the second aspect of the instant invention will be described, with reference to FIGS. 16 to 19.

FIGS. 16A to 16D are for illustrating the interconnection point voltage control system of the inverter device Aa.

Figure 16A:
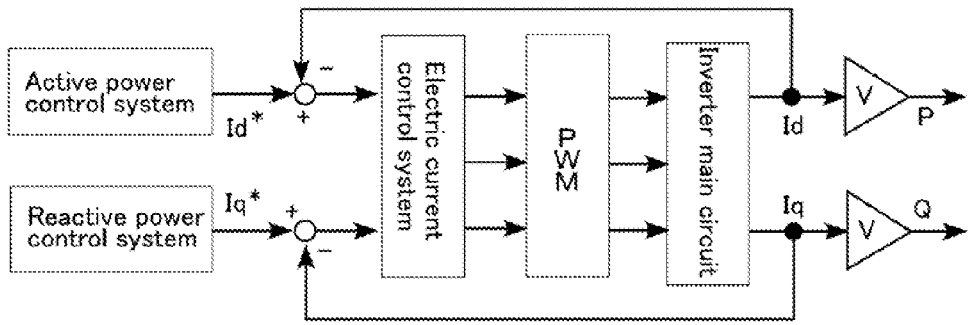
FIGS. 16A to 16D are for illustrating an interconnection point voltage control system of an inverter device.

FIG. 16A shows a model of a typical inverter device. The active power that is output by the inverter device is given as P, the reactive power is given as Q, and the d axis component and the q axis component of the output current of the inverter device are given as Id and Iq (the respective target values are given as Id* and Iq*). Note that the d axis component and the q axis component are two-phase components of a rotating coordinate system after having been transformed by three-phase to two-phase transformation and rotating coordinate transformation that will be discussed later. Also, because the q axis component of the output voltage will be Vq=0 and the d axis component will be Vd=V (effective value of the interconnection point voltage), assuming that the internal, phase of the inverter device tracks the phase of the interconnection point voltage perfectly, the following holds:

$$P = Vd \cdot Id + Vq \cdot Iq = V \cdot Id$$

$$Q = Vd \cdot Iq - Vq \cdot Id = V \cdot Iq$$

Figure 16B:
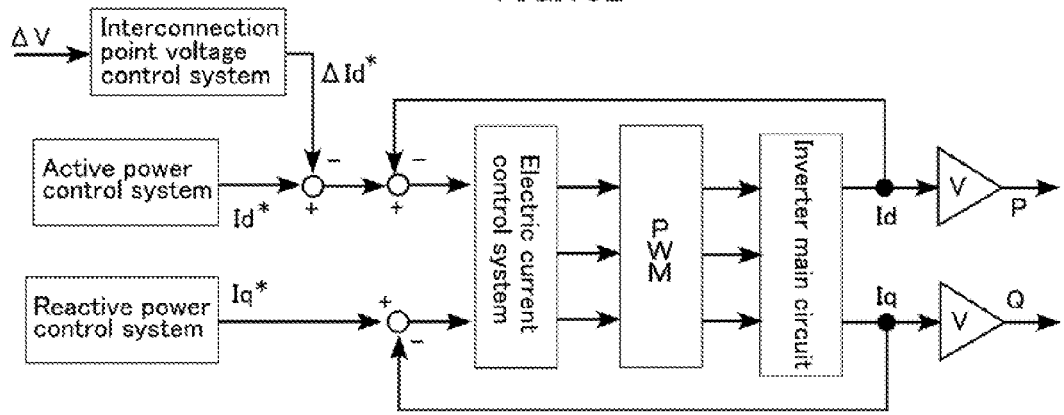

In the second aspect of the instant invention, a rise in the interconnection point voltage is alleviated by controlling output active power, and thus a control system for suppressing a rise in the interconnection point voltage is added to the model of FIG. 16A. FIG. 16B shows a model to which a control system for suppressing a rise in the interconnection point voltage has been added. In FIG. 16B, an interconnection point voltage control system that receives input of a deviation ΔV of the interconnection point voltage V from the target value and outputs an interconnection point voltage compensation value ΔId* is added, and the interconnection point voltage compensation value ΔId* is subtracted from a target value Id* of the d axis component of the output current.

Figure 16C:
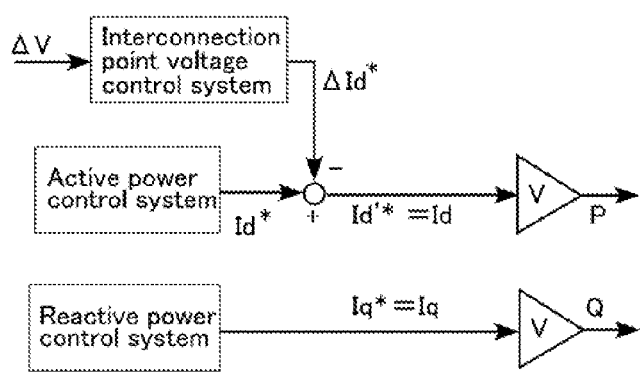

The dynamics of the electric current control system, the PWM and the inverter main circuit can be disregarded, since these dynamics are fast compared with the dynamics of the power control system. FIG. 16C shows an approximated model that disregards these dynamics. Note that Id'*=Id*−ΔId*.

Figure 16D:
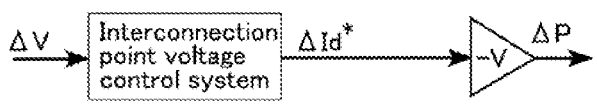

A model that focuses on only the interconnection point voltage control system in the model of FIG. 16C is shown in FIG. 16D.

Figure 17:
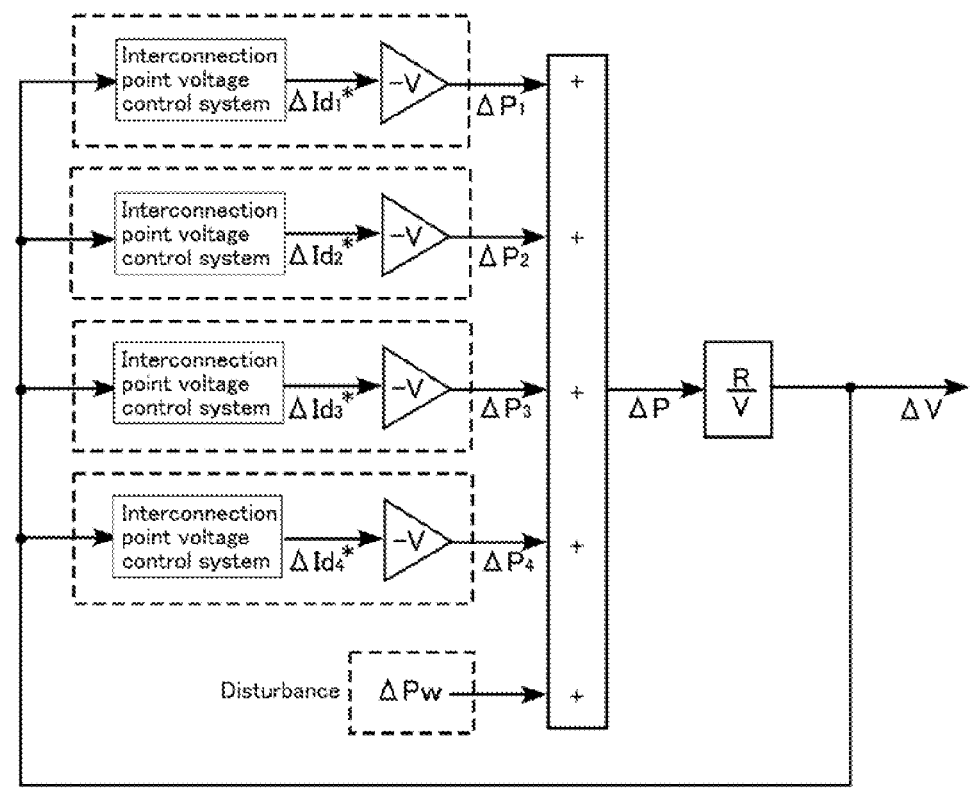
FIG. 17 is for illustrating the interconnection point voltage control system of the entire electric power system.

FIG. 17 is for illustrating the interconnection point voltage control system of the entire electric power system. The active power that is output by the inverter devices Aa1 to Aa4 is respectively varied by $\Delta P_1$ to $\Delta P_4$, and the active power that is supplied to the interconnection point varies by an amount of change ΔP obtained by adding the respective variations together. The interconnection point voltage V varies due to change in active power P that is supplied. This is represented in FIG. 17. Note that R is the resistance component of the line impedance of the power transmission line. Also, included in the variation (disturbance) in active power ΔPw are load variation and variation caused by changes in the output of the solar cell. FIG. 17 represents a system that suppresses the variation in the interconnection point voltage by active power adjustment of each inverter device Aa. In this case, however, not every inverter device Aa cooperatively suppresses output active power, and thus the output active power that is suppressed by each inverter device Aa will be determined by the gain that is set internally, the disposition location of the inverter device Aa, and the like. For example, it is not possible to control the inverter device Aa1 to suppress output active power to half that of the other inverter devices and the inverter devices Aa2 to Aa4 to suppress output active power equally, or to control each inverter device Aa to suppress output active power according to the capacity thereof.

Next, a method by which the inverter devices Aa cooperatively suppress output active power will be described.

Figure 18A:
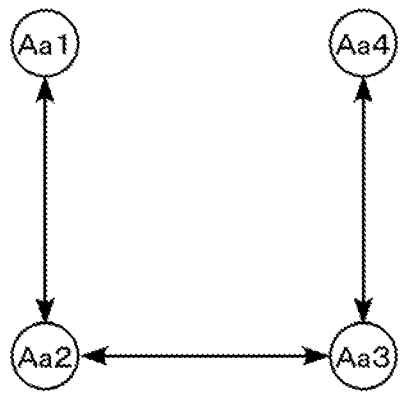
FIGS. 18A to 18C represent the electric power system shown in FIG. 15 in graph form.
Figure 18B:
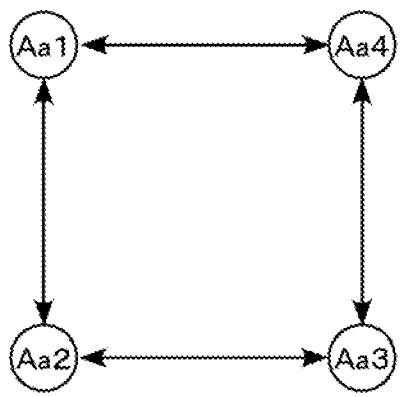
Figure 18C:
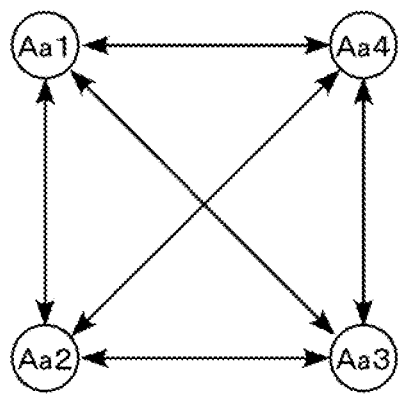

A consensus algorithm for converging the values of the states of a plurality control targets to the same value is known (see Documents 2 and 3). If, in the case where an electric power system is represented as a graph in which the communication states between the respective control targets are represented by edges and each control target represents a vertex, the graph is a connected undirected graph in graph theory, a consensus can be reached by converging the values of the states of the control targets to the same value using a consensus algorithm. For example, the electric power system shown in FIG. 15 will be as shown in FIG. 18A when represented with a graph. The vertices Aa1 to Aa4 respectively represent the inverter devices Aa1 to Aa4, and the edges with arrows represent the communication states between the respective inverter devices. Each edge indicates mutual communication, and the graph is an undirected graph. The graph is a connected graph because a communication path exists to any two vertices of the graph. Accordingly, a consensus can be reached in the case of the electric power system shown in FIG. 15. Because the graphs shown in FIGS. 18B and 18C are also undirected graphs that are connected graphs, a consensus can also be reached in the case where the communication states of the inverter devices Aa1 to Aa4 in the electric power system of FIG. 15 are as shown by these graphs. Thus, a state in which each inverter device Aa performs mutual communication with at least one of the inverter devices Aa that are connected to the electric power system and a communication path exists to any two inverter devices Aa connected to the electric power system need only be realized ("connected state"), and it is not necessary for each inverter device Aa to communicate with all the inverter devices Aa connected to the electric power system.

In the present embodiment, the values of the states of the control targets are weighted rather than being converged to the same value, and the weighted values are converged to the same value. That is, a weight value $W_i$ is set for each inverter device Aa, the value of each state is weighted by dividing the value of the state by the weight value $W_i$, and the weighted values are converged to the same value. The values of the states are thereby converged to a value that depends on the weight value $W_i$. For example, if $W_1=W_2=W_3=1$ and $W_4=10$, the value of the state of the inverter device Aa4 will be converged on a value that is 10 times the values of the states of the other inverter devices Aa.

Figure 19:
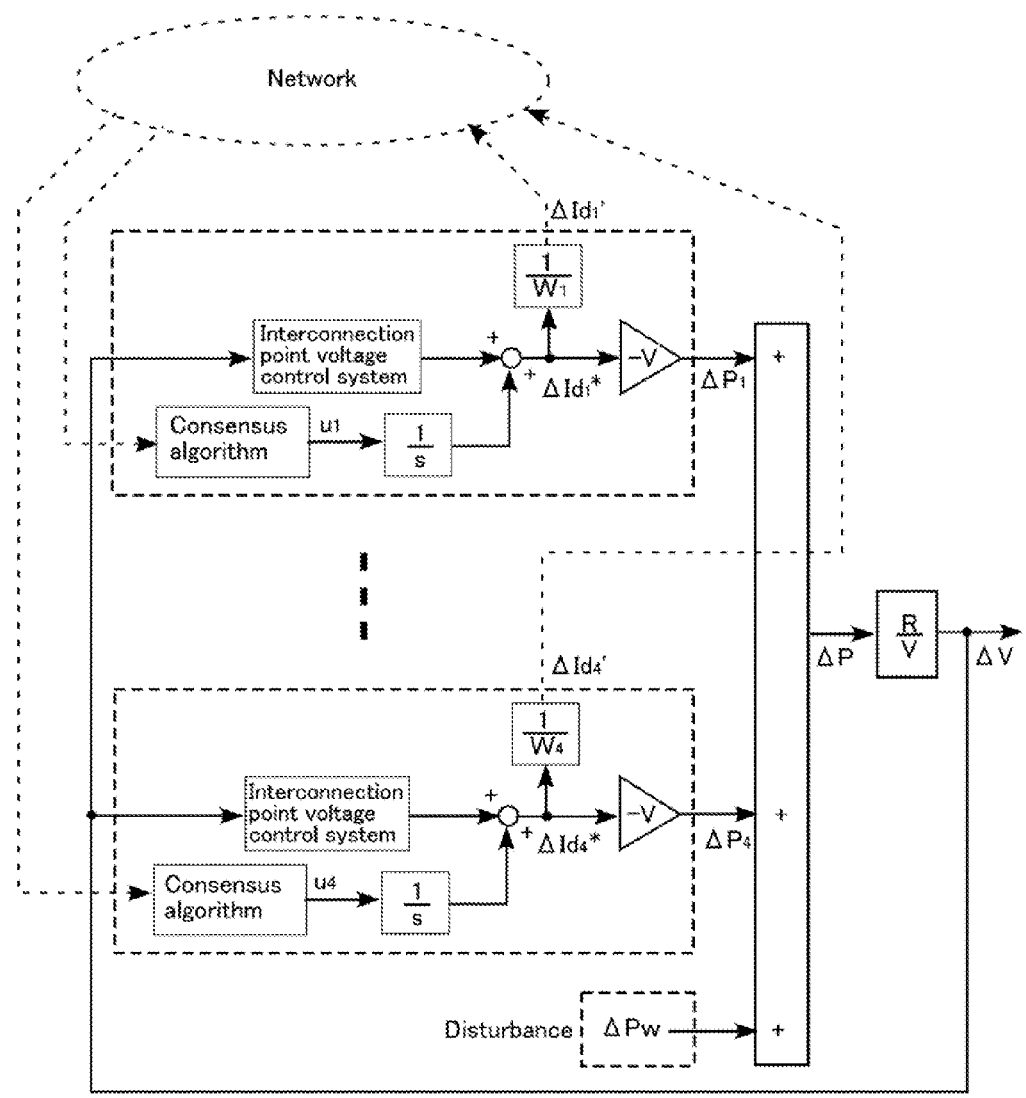
FIG. 19 shows the control system for controlling the interconnection point voltage of the entire electric power system according to the first embodiment of the second aspect.

FIG. 19 represents a control system in which a consensus algorithm and weighting are added to the system shown in FIG. 17, and that suppresses the variation in the interconnection point voltage as a result of the inverter devices Aa each cooperatively suppressing the active power that is the responsibility of that inverter device Aa.

As a result of the consensus algorithm, compensation values $\Delta Id_i'$ ($=\Delta Id_i^*/W_i$) obtained by respectively dividing compensation values $\Delta Id_i^*$ by the weight values $W_i$ converge to the same value. Each inverter device $Aa_i$ suppresses an amount of active power that depends on a compensation value $\Delta Id_i^* = W_i \cdot \Delta Id\alpha'$, where $\Delta Id\alpha'$ is the convergence value. In other words, active power that depends on the weight value $W_i$ will be suppressed. Accordingly, if $W_1=W_2=W_3=1$ and $W_4=10$, for example, the inverter device Aa4 can be made to compensate 10 times as much reactive power as the other inverter devices Aa.

Returning to FIG. 14, the control circuit 3a generates a PWM signal based on the current signals I that are input from the electric current sensor 4a, the voltage signal V that is input from the voltage sensor 5a, and the voltage signal Vdc that is input from the DC voltage sensor 6a, and outputs the PWM signal to the inverter circuit 2a. The control circuit 3a is provided with a reactive power control unit 30a, an input voltage control unit 31a, an interconnection point voltage control unit ("target parameter control unit") 32a, the cooperative correction value generation unit 33a, an adder 34a, an electric current control unit 35a, a command signal generation unit 36a, a PWM signal generation unit 37a, a weighting unit 38a, and a communication unit 39a.

The reactive power control unit 30a is for controlling the output reactive power of the inverter circuit 2a. Although not illustrated, the reactive power control unit 30a calculates the output reactive power of the inverter circuit 2a from the instantaneous value of the current detected by the electric current sensor 4a and the instantaneous value of the voltage detected by the voltage sensor 5a, performs PI control (proportional-integral control) on the deviation with the target value, and outputs a reactive power compensation value. The reactive power compensation value is input to the electric current control unit 35a as the target value Iq*. Note that the reactive power control unit 30a is not limited to performing PI control, and may be configured to perform other control such as I control (integral control).

The input voltage control unit 31a is for controlling the input voltage of the inverter circuit 2a. The input voltage control unit 31a controls the output active power of the inverter circuit 2a by controlling the input power through controlling the input voltage. The input voltage control unit 31a receives input of a deviation ΔVdc of the voltage signal Vdc which is input from the DC voltage sensor 6a from the input voltage target value Vdc* which is the target value of the voltage signal Vdc, performs PI control, and outputs an active power compensation value. Note that the input voltage control unit 31a is not limited to performing PI control, and may be configured to perform other control such as I control.

The interconnection point voltage control unit 32a is for controlling the interconnection point voltage. The interconnection point voltage control unit 32a controls the interconnection point voltage through suppressing the active power that is output by the inverter circuit 2a. The interconnection point voltage control unit 32a receives input of a deviation ΔV of the voltage signal V which is input from the voltage sensor 5a from the interconnection point voltage target value V* which is the target value of the voltage signal V, performs PI control, and outputs a interconnection point voltage compensation value. The interconnection point voltage compensation value is input to the adder 34a. Note that the interconnection point voltage control unit 32a is not limited to performing PI control, and may be configured to perform other control such as I control.

The cooperative correction value generation unit 33a generates the cooperative correction value for cooperating with the inverter devices Aa. The cooperative correction value generation unit 33a will be discussed in detail later.

The adder 34a calculates the correction compensation value $\Delta Id_i^*$ by adding the cooperative correction value that is input from the cooperative correction value generation unit 33a to the interconnection point voltage compensation value that is input from the interconnection point voltage control unit 32a. The correction compensation value $\Delta Id_i^*$ that is output from the adder 34a is subtracted from the active power compensation value that is output from the input voltage control unit 31a, and the resultant value is input to the electric current control unit 35a as the target value Id*. The adder 34a also outputs the calculated correction compensation value $\Delta Id_i^*$ to the weighting unit 38a.

The electric current control unit 35a is for controlling the output current of the inverter circuit 2a. The electric current control unit 35a generates an electric current compensation value based on the current signals I that are input from the electric current sensor 4a, and outputs the generated electric current compensation value to the command signal generation unit 36a.

Figure 20:
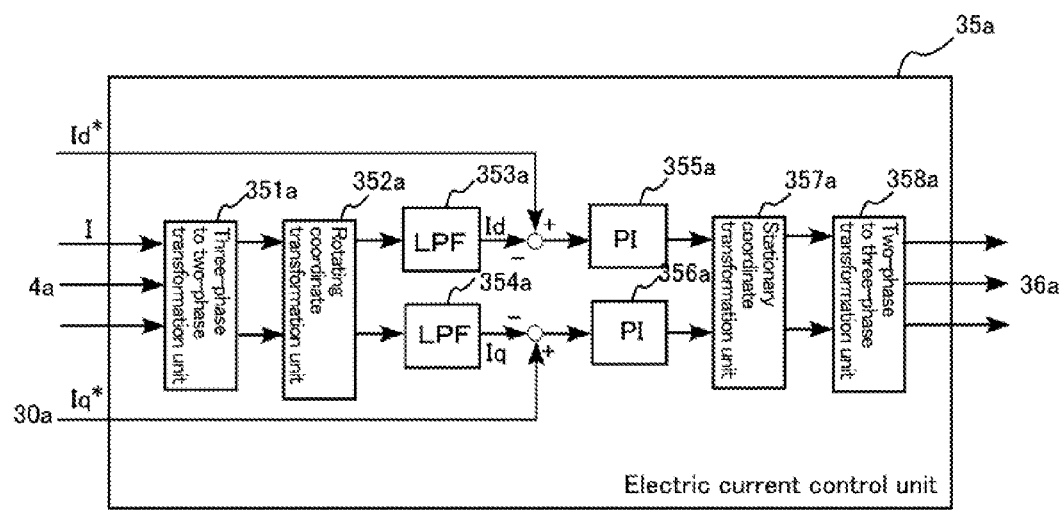
FIG. 20 is for illustrating an internal configuration of an electric current control unit.

FIG. 20 is a functional block diagram for illustrating the internal configuration of the electric current control unit 35a.

The electric current control unit 35a is provided with a three-phase to two-phase transformation unit 351a, a rotating coordinate transformation unit 352a, a LPF 353a, a LPF 354a, a PI control unit 355a, a PI control unit 356a, a stationary coordinate transformation unit 357a, and a two-phase to three-phase transformation unit 358a.

The three-phase to two-phase transformation unit 351a performs so-called three-phase to two-phase transformation (αβ transformation). Three-phase to two-phase transformation is processing for transforming three-phase AC signals into equivalent two-phase AC signals, and involves transforming three-phase AC signals into the AC signal of an α-axis component and the AC signal of a β-axis component by respectively breaking down the three-phase AC signals into the components of the orthogonal α and β axes in a stationary orthogonal coordinate system (hereinafter "stationary coordinate system") and adding together the components of the axes. The three-phase to two-phase transformation unit 351a transforms the three-phase current signals Iu, Iv and Iw input from the electric current sensor 4a into an α-axis current signal Iα and a β-axis current signal Iβ, and output the current signals to the rotating coordinate transformation unit 352a.

The transformation processing that is performed by the three-phase to two-phase transformation unit 351a is represented by the following equation (1a).

$$\begin{bmatrix} I\alpha \\ I\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Iu \\ Iv \\ Iw \end{bmatrix} \quad (1a)$$

The rotating coordinate transformation unit 352a performs so-called rotating coordinate transformation (dq transformation). Rotating coordinate transformation is processing for transforming two-phase signals of a stationary coordinate system into two-phase signals of a rotating coordinate system. The rotating coordinate system is an orthogonal coordinate system that has orthogonal d and q axes, and rotates at the same angular velocity and in the same rotation direction as the fundamental wave of the interconnection point voltage. The rotating coordinate transformation unit 352a transforms the α-axis current signal Iα and the β-axis current signal Iβ of the stationary coordinate system that are input from the three-phase to two-phase transformation unit 351a, based on a phase θ of the fundamental wave of the interconnection point voltage, into a d-axis current signal Id and a q-axis current signal Iq of the rotating coordinate system, and outputs these current signals.

The transformation processing that is performed by the rotating coordinate transformation unit 352a is represented by the following equation (2a).

$$\begin{bmatrix} Id \\ Iq \end{bmatrix} = \begin{bmatrix} \cos\theta & \sin\theta \\ -\sin\theta & \cos\theta \end{bmatrix} \begin{bmatrix} I\alpha \\ I\beta \end{bmatrix} \quad (2a)$$

The LPF 353a and the LPF 354a are low pass filters, and respectively pass only the DC component of the d-axis current signal Id and the q-axis current signal Iq. As a result of the rotating coordinate transformation, the fundamental wave components of the α-axis current signal Iα and the β-axis current signal Iβ are respectively transformed into DC components of the d-axis current signal Id and the q-axis current signal Iq. In other words, the LPF 353a and the LPF 354a remove unbalanced and harmonic components, and pass only fundamental wave components.

The PI control unit 355a performs PI control based on the deviation of the DC component of the d-axis current signal Id from the target value, and outputs an electric current compensation value Xd. The correction compensation value $\Delta Id_i^*$ is subtracted from the active power compensation value that is output from the input voltage control unit 31a, and the resultant value is used as the target value Id* of the d-axis current signal Id. The PI control unit 356a performs PI control based on the deviation of the DC component of q-axis current signal Iq from the target value Iq*, and outputs an electric current compensation value Xq. The reactive power compensation value that is output from the reactive power control unit 30a is used as the target value Iq* of the q-axis current signal Iq.

The stationary coordinate transformation unit 357a transforms the electric current compensation values Xd and Xq that are respectively input from the PT control unit 355a and the PI control unit 356a into electric current compensation values Xα and Xβ of the stationary coordinate system, and performs processing that is the reverse of the transformation processing performed by the rotating coordinate transformation unit 352a. The stationary coordinate transformation unit 357a performs so-called stationary coordinate transformation (inverse dq transformation), and transforms the electric current compensation values Xd and Xq of the rotating coordinate system into the electric current compensation values Xα and Xβ of the stationary coordinate system based on the phase θ.

The transformation processing that is performed by the stationary coordinate transformation unit 357a is represented by the following equation (3a).

$$\begin{bmatrix} X\alpha \\ X\beta \end{bmatrix} = \begin{bmatrix} \cos\theta & -\sin\theta \\ \sin\theta & \cos\theta \end{bmatrix} \begin{bmatrix} Xd \\ Xq \end{bmatrix} \quad (3a)$$

The two-phase to three-phase transformation unit 358a transforms the electric current compensation values Xα and Xβ that are input from the stationary coordinate transformation unit 357a into three-phase electric current compensation values Xu, Xv and Xw. The two-phase to three-phase transformation unit 358a performs so-called two-phase to three-phase transformation (inverse αβ transformation), which is processing that is the reverse of the transformation processing performed by the three-phase to two-phase transformation unit 351a.

The transformation processing that is performed by the two-phase to three-phase transformation unit 358a is represented by the following equation (4a).

$$\begin{bmatrix} Xu \\ Xv \\ Xw \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} X\alpha \\ X\beta \end{bmatrix} \quad (4a)$$

Note that, the inverter device Aa was described as being a three-phase system in the present embodiment, but may be a single-phase system. In the case of a single-phase system, the electric current control unit 35a need only control a single-phase current signal obtained by detecting the output current of the inverter circuit 2a.

The command signal generation unit 36a generates a command signal based on the electric current compensation values Xu, Xv and Xw that are input from the electric current control unit 35a, and outputs the generated command signal to the PWM signal generation unit 37a.

The PWM signal generation unit 37a generates a PWM signal. The PWM signal generation unit 37a generates the PWM signal using the triangular wave comparison method, based on a carrier signal and the command signal that is input from the command signal generation unit 36a. For example, a pulse signal whose level is high in the case where the command signal is larger than the carrier signal and whose level is low in the case where the command signal is smaller than or equal to the carrier signal is generated as the PWM signal. The generated PWM signal is output to the inverter circuit 2a. Note that the PWM signal generation unit 37a is not limited to generating the PWM signal with the triangular wave comparison method, and may generate the PWM signal with a hysteresis method, for example.

The weighting unit 38a weights the correction compensation value $\Delta Id_i^*$ that is input from the adder 34a. The weight value $W_i$ is set in advance in the weighting unit 38a. The weighting unit 38a outputs a weighted correction compensation value $\Delta Id_i'$ obtained by dividing the correction compensation value $\Delta Id_i^*$ by the weight value $W_i$ to the communication unit 39a and the cooperative correction value generation unit 33a.

The weight value $W_i$ is set in advance according to the size (suppression amount) of the output active power that is to be suppressed by the inverter device Aa. For example, because the capacity of the inverter device Aa1 (see FIG. 15) is greater than the capacity of the inverter devices Aa2 to Aa4, in the case of wanting to increase the suppression amount of the inverter device Aa1 (wanting to reduce the suppression amount of the inverter devices Aa2 to Aa4 as much as possible), the weight value $W_1$ of the inverter device Aa1 is set to a large value compared with the weight values $W_2$ to $W_4$ of the other inverter devices Aa2 to Aa4. The weight values $W_2$ to $W_4$ may be the same value in order to equalize the suppression amounts. Also, a configuration may be adopted in which the weight value $W_i$ is set according to the size of the solar cell panel connected to the inverter device Aa.

The communication unit 39a communicates with the control circuit 3a of another inverter device Aa. The communication unit 39a receives input of the weighted correction compensation value $\Delta Id_i'$ from the weighting unit 38a, and transmits the weighted correction compensation value $\Delta Id_i'$ to the communication unit 39a of another inverter device Aa. Also, the communication unit 39a outputs the compensation value $\Delta Id_j'$ received from the communication unit 39a of another inverter device Aa to the cooperative correction value generation unit 33a. Note that the communication method is not limited, and may be wired communication or wireless communication.

For example, in the case of the inverter device Aa is the inverter device Aa2 shown in FIG. 15, the communication unit 39a transmits a weighted correction compensation value $\Delta Id_j'$ to the communication unit 39a of the inverter devices Aa1 and Aa3, receives a compensation value $\Delta Id_1'$ from the communication unit 39a of the inverter device Aa1, and receives a compensation value $\Delta Id_3'$ from the communication unit 39a of the inverter device Aa3.

Next, the cooperative correction value generation unit 33a will be described in detail.

The cooperative correction value generation unit 33a generates the cooperative correction value for cooperating with each inverter device Aa, the weighted correction compensation value $\Delta Id_i'$ (hereinafter, abbreviated to "compensation value $\Delta Id_i'$") that is input from the weighting unit 38a and the compensation value $\Delta Id_j'$ of another inverter device Aa that is input from the communication unit 39a. Even if the compensation value $\Delta Id_i'$ and the compensation value $\Delta Id_j'$ differ, the compensation value $\Delta Id_i'$ and the compensation value $\Delta Id_j'$ are converged to a common value by the operation processing of the cooperative correction value generation unit 33a being repeated. As shown in FIG. 14, the cooperative correction value generation unit 33a is provided with an operation unit 331a, a multiplier 332a, and an integrator 333a.

The operation unit 331a performs the following operation processing that is based on the following equation (5a). That is, the operation unit 331a subtracts the compensation value $\Delta Id_i'$ that is input from the weighting unit 38a from each compensation value $\Delta Id_j'$ that is input from the communication unit 39a, and outputs an operation result $u_i$ obtained by adding together all the subtraction results to the multiplier 332a.

$$u_i = \sum_j (\Delta Id_j' - \Delta Id_i') \quad (5a)$$

For example, in the case where the inverter device Aa is the inverter device Aa2 (see FIG. 15), the operation unit 331a calculates the following equation (6a), and outputs an operation result $u_2$.

$$\begin{aligned} u_2 &= \sum_{j=1,3} (\Delta Id_j' - \Delta Id_2') \\ &= (\Delta Id_1' - \Delta Id_2') + (\Delta Id_3' - \Delta Id_2') \\ &= \Delta Id_1' + \Delta Id_3' - 2\Delta Id_2' \end{aligned} \quad (6a)$$

The multiplier 332a multiplies the operation result $u_i$ that is input from the operation unit 331a by a predetermined coefficient $\epsilon$, and outputs the resultant value to the integrator 333a. The coefficient $\epsilon$ is a value that satisfies $0<\epsilon<1/d_{max}$, and is set in advance. $d_{max}$ is the maximum value of $d_j$, which is the number of the other inverter devices Aa with which the communication unit 39a communicates, among all the inverter devices Aa connected to the electric power system. In other words, $d_{max}$ is the number of compensation values $\Delta Id_j'$ that is input to the communication unit 39a of the inverter device Aa that is communicating with the most other inverter devices Aa, among the inverter devices Aa connected to the electric power system. Note that the operation result $u_i$ is multiplied by the coefficient $\epsilon$, in order to ensure that the variation in the cooperative correction value does not become too large due to the operation result $u_i$ being overly large (small). Accordingly, in the case where processing by the cooperative correction value generation unit 33a is continuous-time processing, the multiplier 332a does not need to be provided.

The integrator 333a generates the cooperative correction value by integrating the values that are input from the multiplier 332a, and outputs the generated cooperative correction value. The integrator 333a generates the cooperative correction value by adding the value that is input from the multiplier 332a to the cooperative correction value generated last time. The cooperative correction value is output to the adder 34a.

In the present embodiment, the control circuit 3a was described as being realized as a digital circuit, but may be realized as an analog circuit. Also, the processing that is performed by each constituent element is designed with a program, and a computer may be caused to function as the control circuit 3a by executing the program. Also, a configuration may be adopted in which the program is recorded on a recording medium and read by a computer.

In the present embodiment, the cooperative correction value generation unit 33a generates the cooperative correction value, using the compensation value $\Delta Id_i'$ that is input from the weighting unit 38a and the compensation value $\Delta Id_j'$ of another inverter device Aa that is input from the communication unit 39a. In the case where the compensation value $\Delta Id_i'$ is larger than the arithmetic mean value of the correction values $\Delta Id_j'$, the operation result $u_i$ that is output by the operation unit 331a will be a negative value. When this is the case, the cooperative correction value decreases and the compensation value $\Delta Id_i'$ will also decrease. On the other hand, in the case where the compensation value $\Delta Id_i'$ is smaller than the arithmetic mean value of the correction values $\Delta Id_j'$, the operation result $u_i$ that is output by the operation unit 331a will be a positive value. When this is the case, the cooperative correction value increases and the compensation value $\Delta Id_i'$ will also increase. In other words, the compensation value $\Delta Id_i'$ approaches the arithmetic mean value of the correction values $\Delta Id_j'$. As a result of this processing being performed by each of the inverter devices Aa, the compensation value $\Delta Id_i'$ of each inverter device Aa converges to the same value. The fact that the values of the states of control targets converge to the same value as a result of using a consensus algorithm has also been proven mathematically (see Documents 2 and 3). In the case of the present embodiment, the compensation value $\Delta Id_i'$ is the value of a state of a control target.

Hereinafter, simulation that confirms that variation in the interconnection point voltage is suppressed by each inverter device Aa cooperatively suppressing output active power in the electric power system shown in FIG. 15 will be described. The simulation was performed using the control system shown in FIG. 19.

A proportional gain $Kp_1$ of the interconnection point voltage control unit 32a of the inverter device Aa1 is given as "0.5", an integral gain $Ki_1$ is given as "6", a proportional gain $Kp_2$ of the interconnection point voltage control unit 32a of the inverter device Aa2 is given as "1", an integral gain $Ki_2$ is given as "10", a proportional gain $Kp_3$ of the interconnection point voltage control unit 32a of the inverter device Aa3 is given as "0.5", an integral gain $Ki_3$ is given as "3", a proportional gain $Kp_4$ of the interconnection point voltage control unit 32a of the inverter device Aa4 is given as "0.6", an integral, gain $Ki_4$ is given as "7", an interconnection point voltage V is given as "1 p.u." and a resistance component R of the line impedance of the power transmission line is given as "0.06 p.u.". FIG. 21A to FIG. 23B show the results of the simulation.

Figure 21A:
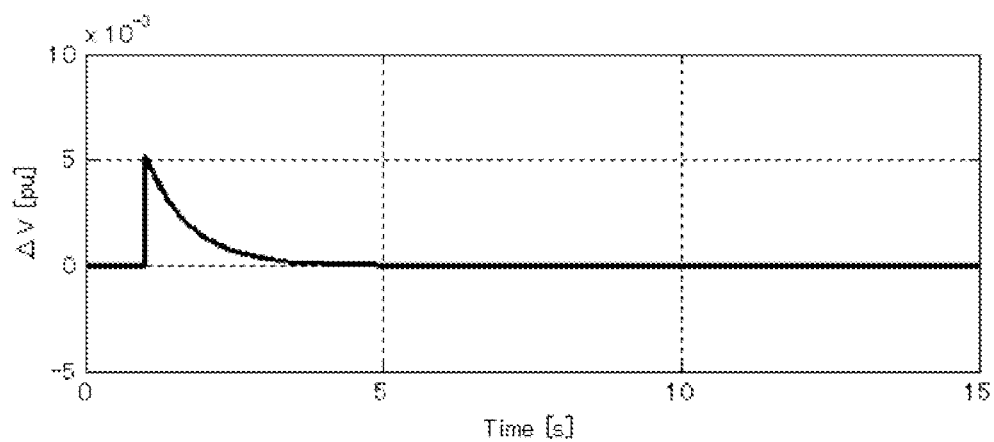
FIGS. 21A and 21B show simulation results confirming suppression of variation in the interconnection point voltage in the electric power system.
Figure 21B:
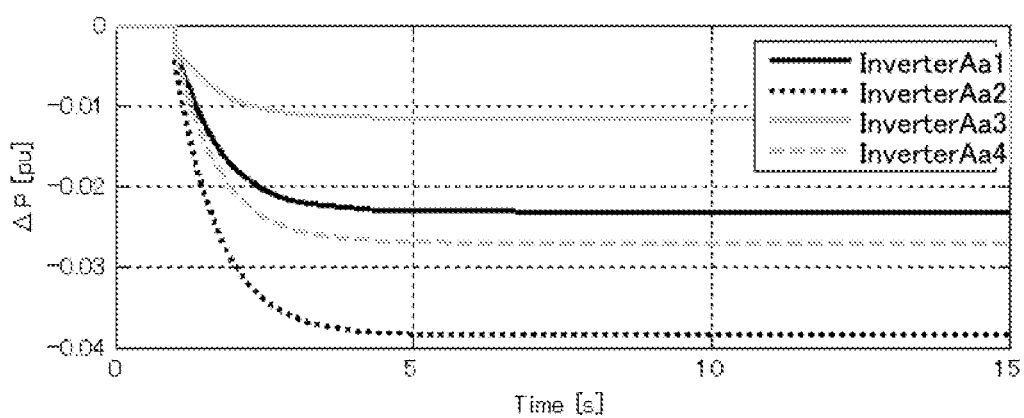
Figure 22A:
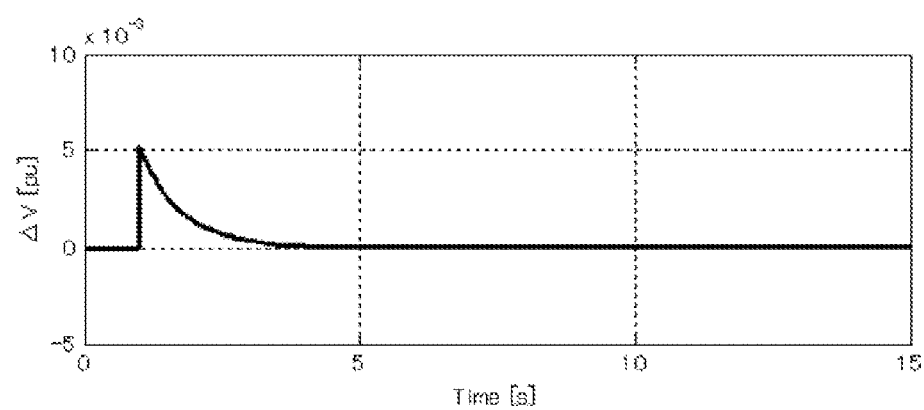
FIGS. 22A and 22B show simulation results confirming suppression of variation in the interconnection point voltage in the electric power system.
Figure 22B:
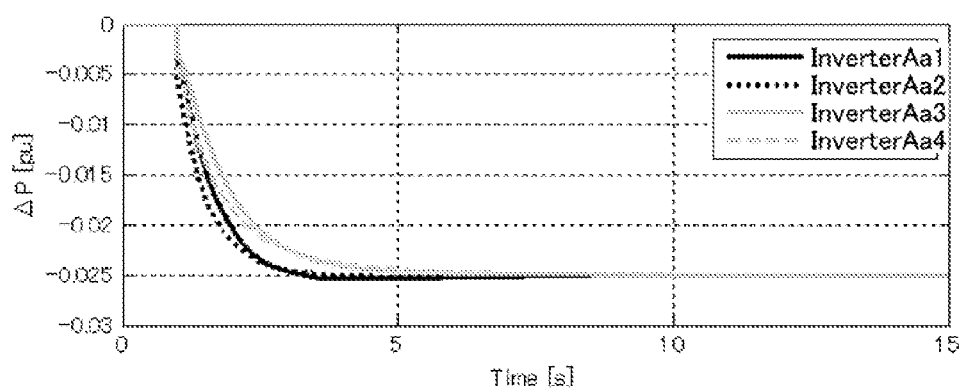

FIGS. 21A and 21B and FIGS. 22A and 22B are for confirming that each inverter device Aa cooperatively suppresses output active power, where the weight values $W_1$ to $W_4$ that are set in the weighting unit 38a of the inverter devices Aa1 to Aa4 are given as $W_1=W_2=W_3=W_4=1$. FIGS. 21A and 21B are for comparison and show the case where cooperation is not performed (i.e., in the case where the control system shown in FIG. 17 is used), whereas FIGS. 22A and 22B show the case where cooperation is performed (i.e., in the case where the control system shown in FIG. 19 is used).

In both cases, 0.1 p.u. was injected stepwise as a disturbance ΔPw one second after the start of simulation. FIG. 21A and FIG. 22A show the temporal change in the interconnection point voltage deviation ΔV. Also, FIG. 21B and FIG. 22B show the change in the suppression amount of output active power of the inverter devices Aa1 to Aa4. Because the case of increasing output active power is given in the positive direction in the diagrams, the suppression amount is shown with a negative value.

In the case of FIGS. 21A and 21B, variation in the interconnection point voltage can be quickly suppressed, but the suppression amount of each of the inverter devices Aa1 to Aa4 is fixed to a value that depend on the respective gain. Accordingly, the amount of output active power that each of the inverter devices Aa1 to Aa4 suppresses cannot be controlled. In the case of FIG. 21B, the output active power of the inverter device Aa2 is suppressed the most, and suppression amount thereof cannot be reduced.

In the case of FIGS. 22A and 22B, variation in the interconnection point voltage can also be quickly suppressed, similarly to the case of FIGS. 21A and 21B. Also, in the case of FIGS. 22A and 22B, the suppression amounts of the inverter devices Aa1 to Aa4 converge to the same value approximately 8 seconds after the start of simulation. That is, the inverter devices Aa1 to Aa4 cooperatively suppress output active power.

Simulation was also respectively performed for cases where the communication state of the electric power system shown in FIG. 15 is as depicted in the graphs shown in FIGS. 18B and 18C. It was also confirmed in these cases that, similarly to the case of FIGS. 22A and 22B, variation in the interconnection point voltage can be quickly suppressed, and the suppression amounts of the inverter devices Aa1 to Aa4 converge to the same value. Also, the time taken to converge was shorter in the case of the graph of FIG. 18B than in the case of FIGS. 22A and 22B (in the case of the graph of FIG. 18A), and the time taken to converge was even shorter in the case of the graph of FIG. 18C. Note that illustration of the simulation results is omitted.

Figure 23A:
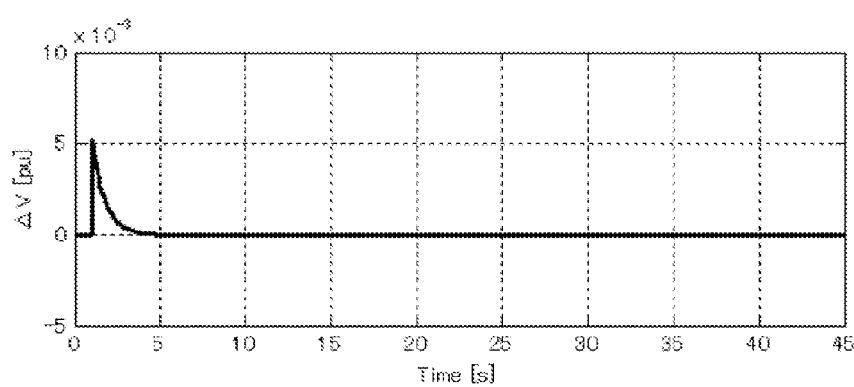
FIGS. 23A and 23B show simulation results confirming suppression of variation in the interconnection point voltage in the electric power system.
Figure 23B:
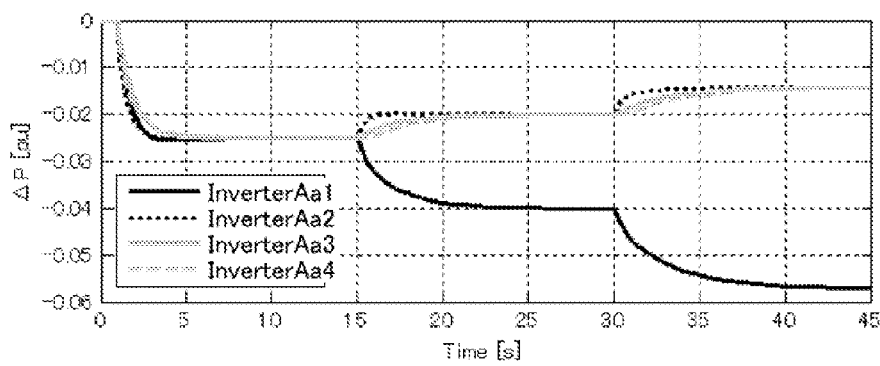

FIGS. 23A and 23B are diagrams in which the weight values $W_1$ to $W_4$ that are set in the weighting unit 38a of the inverter device Aa1 to Aa4 are given as $W_2=W_3=W_4=1$, and $W_1$ is changed over time, and for confirming that the suppression amount of the output active power of each inverter device Aa changes depending on the weight value. 0.1 p.u. is also injected stepwise as a disturbance ΔPw 1 second after the start of simulation in the case of FIG. 23. FIG. 23A shows the temporal change in the interconnection point voltage deviation ΔV, and FIG. 23B shows the temporal change in the suppression amount of output active power of each inverter device Aa1 to Aa4. The weight value $W_1$ is given as "1" when the simulation is started, but is changed to "2" 15 seconds after the start of simulation, and to "4" after 30 seconds.

As shown in FIGS. 23A and 23B, variation in the interconnection point voltage can be quickly suppressed, and the suppression amounts of the inverter devices Aa1 to Aa4 converge to the same value approximately 8 seconds after the start of simulation. Also, after changing the weight value $W_1$ to "2", the suppression amounts the inverter devices Aa2 to Aa4 decrease (the values in FIG. 23B increase), and the suppression amount of the inverter device Aa1 increases (the value in FIG. 23B decreases). In other words, the inverter device Aa1 bears part of the suppression amount of the inverter devices Aa2 to Aa4. The suppression amount of the inverter devices Aa2 to Aa4 is half the suppression amount of the inverter device Aa1. Furthermore, after changing the weight value $W_1$ to "4", the suppression amount of the inverter devices Aa2 to Aa4 drops to one quarter of the suppression amount of the inverter device Aa1. Thus, it could be confirmed that the suppression amount of output active power of each inverter device Aa changes depending on the weight value.

According to the present embodiment, the cooperative correction value generation unit 33a generates a cooperative correction value using an operation result that is based on the compensation value $\Delta Id_i'$ and the compensation value $\Delta Id_j'$. The compensation values $\Delta Id_i'$ of all the inverter devices Aa1 to Aa4 converge to the same value, as a result of the cooperative correction value generation unit 33a of each of the inverter devices Aa1 to Aa4 performing this processing. Accordingly, the correction compensation value $\Delta Id_i^*$ of each of the inverter devices Aa1 to Aa4 will be a value that depends on the respective weight values $W_1$ to $W_4$. Because the suppression amount of output active power of each of the inverter devices Aa1 to Aa4 is adjusted based on the correction compensation value $\Delta Id_i^*$, the suppression amount of output active power of the inverter devices Aa1 to Aa4 can be adjusted according to the weight values $W_1$ to $W_4$.

Also, a configuration need only be adopted in which each of the inverter devices Aa connected to the electric power system only performs mutual communication with at least one inverter device Aa (e.g., an inverter device Aa that is located nearby or with which communication has been established) and the electric power system is in a connected state, and it is not necessary for one inverter device Aa or a monitoring device to perform communication with all the other inverter devices Aa. Accordingly, the system does not become large-scale. Also, even in the case where there is a fault with a certain inverter device Aa or one of the inverter devices Aa is eliminated, all of the remaining inverter devices Aa need only be able to communicate with one inverter device Aa, and the electric power system need only be in a connected state. Also, in the case of adding an inverter device Aa, that inverter device Aa need only be able to perform mutual communication with at least one inverter device Aa. Accordingly, the number of inverter devices Aa can be flexibly increased or decreased.

Although the case where the inverter device Aa converts the input from the DC power source 1a and outputs the conversion result to the electric power system Ba was described in the first embodiment, the present invention is not limited thereto. For example, the inverter device Aa may be an inverter device for charging and discharging a storage battery, or may be an inverter device for a power adjustable load. Suppression of active power can also be cooperatively performed with other inverter devices Aa in these cases.

Note that although the case where interconnection point voltage rises was described above, there are also cases where the interconnection point voltage falls. Because output active power is controlled so as to be maximized in the case where each inverter device Aa performs MPPT control, the output active power cannot be further increased in order to raise interconnection point voltage. In order to also be able to support a fall in interconnection point voltage, an alternative configuration to MPPT control may be adopted in which the output active power is controlled to be about 90 percent of the maximum value. Alternatively, a configuration may be adopted, in the case where the interconnection point voltage falls, that involves switching to performing communication with only inverter devices (storage batteries or inverter devices for a load) whose output active power can be increased, and cooperatively increasing active power only among those inverter devices.

Note that although the case where the operation equation that is set in the operation unit 331a is the equation (5a) was described in the first embodiment, the present invention is not limited thereto. Any other equation that converges the correction values $\Delta Id_i'$ of the inverter devices Aa1 to Aa4 to the same value may be used.

For example, the correction values $\Delta Id_i'$ can also be converges to the same value in the case where the operation equation that is set in the operation unit 331a is the following equation (7a), where $d_i$ is the number of the other inverter devices Aa with which the communication unit 39a communicates, that is, the number of the correction values $\Delta Id_j'$ that is input to the communication unit 39a.

$$u_i = \frac{1}{d_i} \sum_j (\Delta Id_j' - \Delta Id_i') \quad (7a)$$

The compensation values $\Delta Id_i'$ can also be converges to the same value in the case where the operation equation that is set in the operation unit 331a is the following equations (8a) to (10a).

$$u_i = \Delta Id_i' \sum_j (\Delta Id_j' - \Delta Id_i') \quad (8a)$$

$$u_i = \Delta Id_i'^2 \sum_j (\Delta Id_i' - \Delta Id_j') \quad (9a)$$

$$u_i = \frac{1}{P \Delta Id_i'^{P-1}} \sum_j (\Delta Id_j' - \Delta Id_i') \quad (10a)$$

Although the case where a fixed value is set in advance as the weight value of each inverter device Aa was described in the first embodiment, the present invention is not limited thereto. A configuration may be adopted in which the weight value of each inverter device Aa is changeable.

Figure 24:
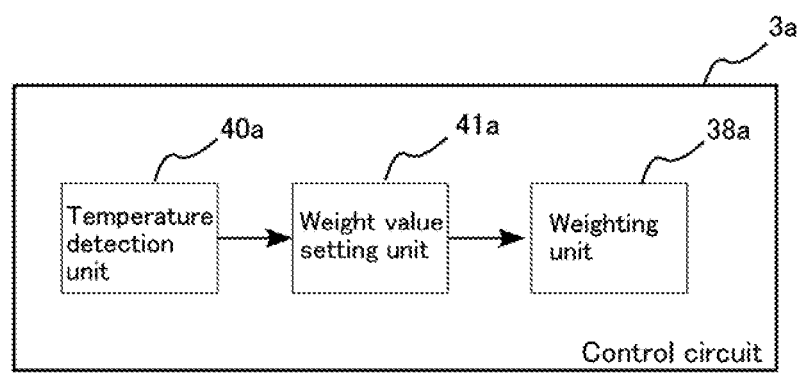
FIG. 24 is for illustrating an inverter device according to a second embodiment of the second aspect.

FIG. 24 is for illustrating an inverter device Aa according to a second embodiment. In FIG. 24, only the control circuit 3a is shown, and illustration of portions of the control circuit 3a that are in common with the control circuit 3a according to the first embodiment (see FIG. 14) is omitted. The inverter device Aa according to the second embodiment differs from the inverter device Aa according to the first embodiment in that the weight value $W_i$ is changed according to the temperature of the inverter circuit 2a. As shown in FIG. 24, the control circuit 3a of the inverter device Aa according to the second embodiment is further provided with a temperature detection unit 40a and a weight value setting unit 41a.

Although not illustrated, a temperature sensor is attached to a heat sink of the inverter circuit 2a. The temperature detection unit 40a detects the temperature that is detected by the temperature sensor, and outputs the detected temperature to the weight value setting unit 41a. The weight value setting unit 41a sets a weight value $W_i$ that depends on the temperature that is input from the temperature detection unit 40a in the weighting unit 38a. It is thought that a load is placed on the inverter circuit 2a in the case where the temperature of the inverter circuit 2a is high, making it preferable to reduce the load by reducing the output active power through increasing the suppression amount. Accordingly, the weight value setting unit 41a sets the weight value $W_i$ to a larger value as the temperature that is input from the temperature detection unit 40a increases. In the present embodiment, the temperature that is input from the temperature detection unit 40a is compared with a threshold that is set in advance, and the weight value $W_i$ is changed to a large value in the case where the temperature is larger than the threshold. Note that a configuration may be adopted in which a plurality of thresholds are set and the weight value $W_i$ is changed gradually. Also, a configuration may be adopted in which a calculation equation that calculates the weight value $W_i$ linearly based on the temperature that is input from the temperature detection unit 40a is set, and the calculation result of the calculation equation is set.

According to the second embodiment, the weight value $W_i$ is changed to a large value, in the case where the inverter circuit 2a of the inverter device Aa is overloaded and the temperature of the inverter circuit 2a becomes high. The suppression amount of output active power of the inverter device Aa is thereby increased, and the suppression amount of output active power of the other inverter devices Aa is reduced. The output active power of that inverter device Aa is thereby suppressed, and the load is reduced. Similar effects to the first embodiment can also be accomplished in the second embodiment.

Figures 25A, 25B:
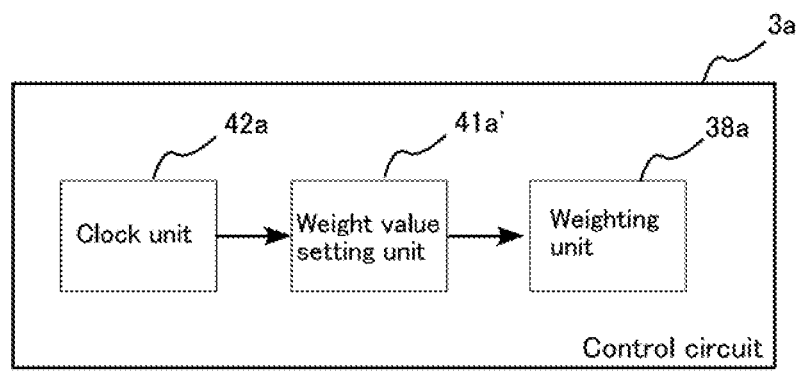
FIGS. 25A and 25B are for illustrating an inverter device according to a third embodiment of the second aspect.

FIGS. 25A and 25B are for illustrating an inverter device Aa according to a third embodiment. In FIG. 25A, only the control circuit 3a of the inverter device Aa according to the third embodiment is shown, and illustration of portions of the control circuit 3a that are in common with the control circuit 3a according to the first embodiment (see FIG. 14) is omitted. The inverter device Aa according to the third embodiment differs from the inverter device Aa according to the first embodiment in that the weight value $W_i$ is changed by date and/or time. As shown in FIG. 25A, the control circuit 3a of the inverter device Aa according to the third embodiment is further provided with a clock unit 42a and a weight value setting unit 41a'.

The clock unit 42a outputs the date and time (hereinafter, referred to as "date-time") to the weight value setting unit 41a'.

The weight value setting unit 41a' sets a weight value $W_i$ that depends on the date-time that is input from the clock unit 42a in the weighting unit 38a. Because the position of the sun changes with the time of day, the area that is in the shadow of a building or the like changes with the time of day. Also, because the orbit of the sun changes with the time of year (e.g., the sun's orbit differs greatly between the summer and winter solstices), the area that is in the shadow of a building or the like changes also with the time of year. In the case where the solar cell panel connected to the inverter device Aa is in shadow, the amount of electric power that is generated by the solar cell panel is small. In this case, it is desirable to avoid further suppressing the output power of the inverter device Aa, thus making it desirable to reduce the suppression amount. In the present embodiment, solar cell panels that are in shadow are searched for in advance, and the weight value $W_i$ of inverter devices Aa to which a solar cell panel that is in shadow is connected is switched to a small value at the date-time at which the solar cell panel is in shadow. Also, the weight value $W_i$ is reduced as the size of the area that is in shadow increases. Specifically, the weight value setting unit 41a' stores a table of weight values $W_i$ shown in FIG. 25B in a memory, and reads out and sets a weight value $W_i$ corresponding to the date-time that is input from the clock unit 42a. Because the solar cell panel is in shadow from 9:00 to 12:00 in January, a smaller value than usual is set for this date-time in FIG. 25B. Note that a configuration may be adopted in which the weight value $W_i$ is only changed by time regardless of the date, or is changed only by date regardless of the time.

According to the third embodiment, the weight value $W_i$ is changed to a small value at the date-time at which the solar cell panel that is connected to the inverter device Aa is in shadow, and the suppression amount of output active power is reduced. Thereby, when the electric power that is generated as a result of the shadow decreases, the suppression amount can be reduced. Similar effects to the first embodiment can also be accomplished in the third embodiment.

Figure 26:
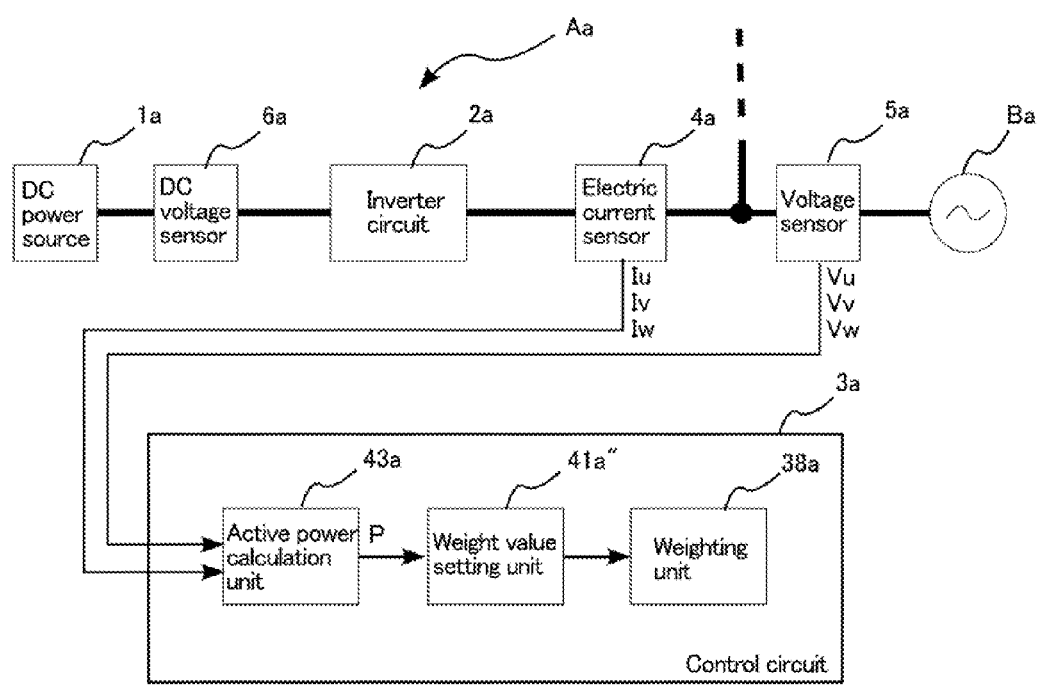
FIG. 26 is for illustrating an inverter device according to a fourth embodiment of the second aspect.

FIG. 26 is for illustrating an inverter device Aa according to a fourth embodiment. In FIG. 26, illustration of portions that are in common with the control circuit 3a according to the first embodiment (see FIG. 14) are omitted. The inverter device Aa according to the fourth embodiment differs from the inverter device Aa according to the first embodiment in that the weight value $W_i$ is changed according to the output active power of the inverter circuit 2a. As shown in FIG. 26, the control circuit 3a of the inverter device Aa according to the fourth embodiment is further provided with an active power calculation unit 43a and a weight value setting unit 41a".

The active power calculation unit 43a is for calculating an output active power P of the inverter circuit 2a, and calculates the output active power P from the current signals Iu, Iv and Iw that are input from the electric current sensor 4a and from voltage signals Vu, Vv and Vw input from the voltage sensor 5a that are obtained by digitally converting the instantaneous value of the three-phase interconnection point voltages. The active power calculation unit 43a outputs the calculated output active power P to the weight value setting unit 41a".

The weight value setting unit 41a" sets a weight value $W_i$ that depends on the output active power P that is input from the active power calculation unit 43a in the weighting unit 38a. Because the inverter device Aa has little remaining capacity in the case where there is a large amount of output active power P, output active power is reduced by increasing the suppression amount in the present embodiment. That is, the weight value setting unit 41a" compares the output active power P that is input from the active power calculation unit 43a with a threshold that is set in advance, and changes the weight value $W_i$ to a large value in the case where the output active power P is greater than the threshold. Note that a configuration may be adopted in which a plurality thresholds are set and the weight value $W_i$ is changed gradually. Also, a configuration may be adopted in which the calculation equation for calculating the weight value $W_i$ linearly from the output active power P is set, and the calculation result of the calculation equation is set.

According to the fourth embodiment, the weight value $W_i$ is changed to a large value in the case where the amount of output active power P of the inverter device Aa is large. The suppression amount of output active power of that inverter device Aa is thereby increased, and output active power is suppressed. Similar effects to the first embodiment can also be accomplished in the fourth embodiment.

Note that a configuration may be adopted in which the weight value $W_i$ is changed depending on the generation of electricity by the DC power source 1a. Also, a configuration may be adopted in which the weight value $W_i$ is changed depending on the amount of solar radiation in the case where the DC power source 1a is a solar cell, and depending on the amount of wind in the case where the DC power source 1a converts AC power generated by a wind turbine generator or the like into DC power and outputs the DC power. Also, the weight value $W_i$ may be changed according to an electricity power selling price.

According to the second aspect of the instant invention, a cooperative correction value generation unit generates a correction value, using an operation result that is based on a weighted correction compensation value and a reception compensation value. As a result of the cooperative correction value generation unit of each inverter device performing this processing, the weighted correction compensation values of all the inverter devices converge to the same value. Accordingly, the correction compensation value of each inverter device will be a value that depends on the respective weight. Because the suppression amount of output active power of each inverter device is adjusted based on the correction compensation value, the suppression amount of output active power can be adjusted according on the weighting. Also, each inverter device need only perform mutual communication with at least one inverter device (e.g., an inverter device that is located nearby or with which communication has been established), and it is not necessary for one inverter device or a monitoring device to communicate with all the other inverter devices. Accordingly, the system does not become large-scale. Even in the case where there is a fault with a certain inverter device, all the other inverter devices need only be able to communicate with one of the inverter devices. Also, increasing or decreasing the number to inverter devices can be flexibly supported.

<Third Aspect>

Heretofore, inverter devices that convert DC power that is generated by a solar cell or the like into AC power and supply the AC power to an electric power grid have been developed. When a large number of distributed power sources whose output is unstable such as solar power generation is introduced to an electric power grid, the resistance to frequency variation of the electric power grid falls, and frequency variation occur frequently. Conventionally, governor free operation is performed on the generator side as a countermeasure to such variation in the grid frequency. However, it is not sufficient to perform a counter measure on the generator side, and variation in the grid frequency needs to be suppressed by optimally adjusting active power using cooperative operation between an inverter device for distributed power sources and an inverter device for storage battery systems or power adjustable loads.

Figure 40:
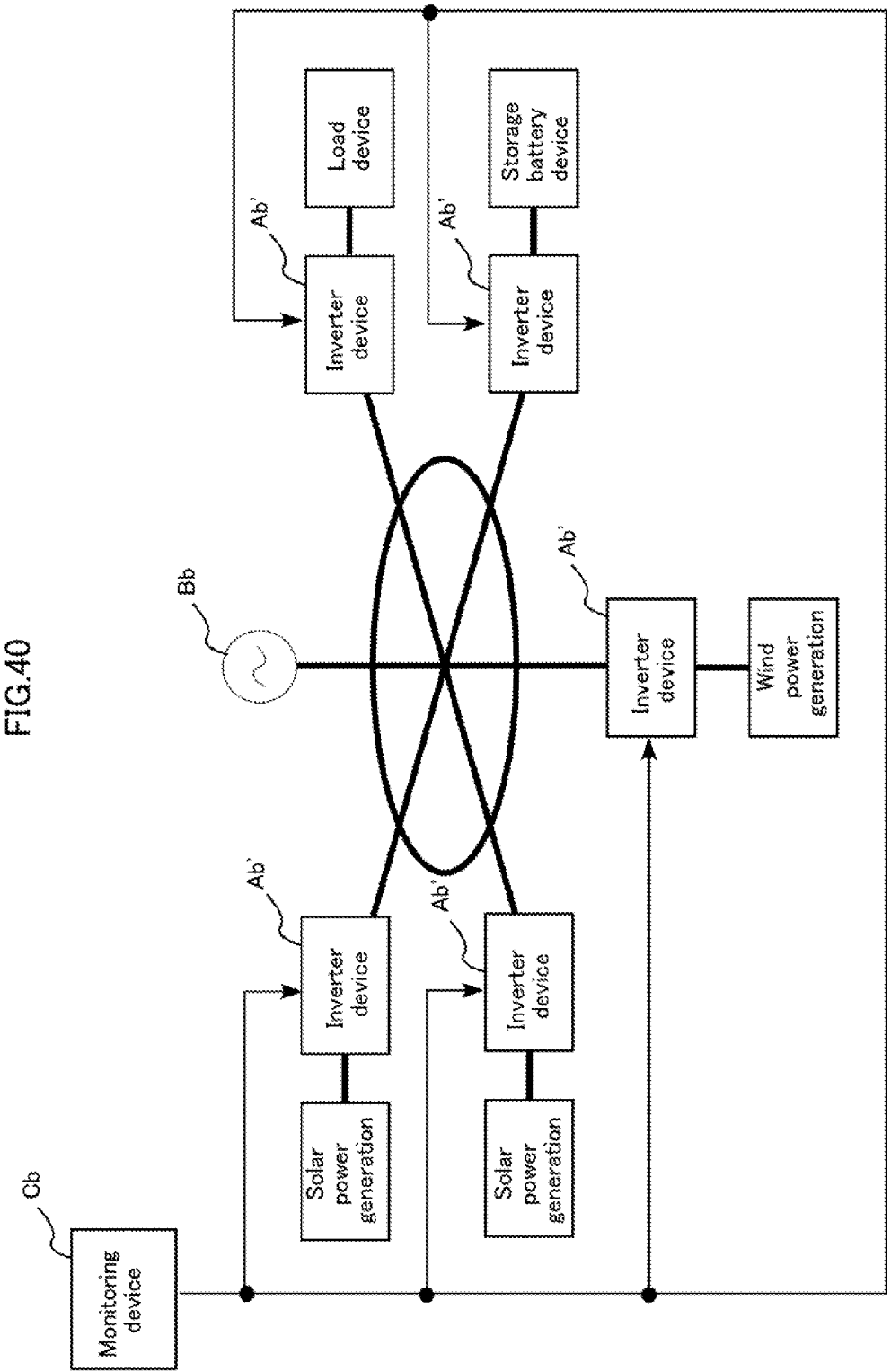
FIG. 40 shows a conventional electric power system.

FIG. 40 shows an electric power system in which a plurality of inverter devices Ab' that are interconnected to an electric power grid Bb adjust active power to suppresses variation in the grid frequency. In this diagram, inverter devices Ab' for distributed power sources realized by a solar power, wind power or the like and inverter devices Ab' for storage battery systems or power adjustable loads are interconnected to an electric power grid Bb.

A monitoring device Cb is for performing centralized monitoring of each inverter device Ab'. In the case where the grid frequency has risen, the monitoring device Cb causes inverter devices Ab' for distributed power sources to suppress output active power, increases the amount of consumption of inverter devices Ab' for loads, and increases the amount of charging (or reduces the amount of discharging) of inverter devices Ab' for storage battery systems. Also, in the case where the grid frequency falls, the amount of consumption of inverter devices Ab' for loads is decreased and the amount of discharging of inverter devices Ab' for storage battery systems is increased (or the amount of charging is reduced). Also, the monitoring device Cb monitors the state of each inverter device Ab', and changes the amount of adjustment of each inverter device Ab' according to a situation. For example, in the case where a certain storage battery system has approached maximum charge, the amount of charging of other storage battery systems is further increased or the amount of consumption of loads is further increased, while increasing the amount of charging of that storage battery system very little. For example, Document 4 describes a system in which load frequency is controlled by a power supply control center controlling the power consumption of a heat pump water heater and the charging of an electric vehicle.

However, in the case where the monitoring device Cb controls the active power of each inverter device Ab' as described above, there is a problem in that the system becomes large-scale and cannot respond flexibly to an increase or decrease in inverter devices Ab', leaving the system prone to faults.

According to a third aspect of the instant invention, a technology that is able to eliminated the above problems and adjust the output active power of each inverter device as will be described below.

Hereinafter, various embodiments of the third aspect of the instant invention will be specifically described, with reference to the drawings.

FIG. 27 is for illustrating an inverter device according to a first embodiment of the third aspect. FIG. 28 shows an electric power system in which a plurality of inverter devices according to the first embodiment are interconnected to an electric power grid.

An inverter device Ab is a so-called power conditioner. The inverter device Ab is provided with an inverter circuit 2b, a control circuit 3b, an electric current sensor 4b, a voltage sensor 5b, and a DC voltage sensor 6b, as shown in FIG. 27, and is interconnected to an electric power grid Bb. The inverter device Ab converts DC power that is output by a DC power source 1b into AC power using the inverter circuit 2b, and outputs the AC power to the electric power grid Bb. Note that, although not illustrated, a transformer for increasing (or decreasing) the AC voltage is provided on the output side of the inverter circuit 2b.

As shown in FIG. 28, the electric power grid Bb to which the inverter device Ab is interconnected also has other inverter devices Ab interconnected thereto. In FIG. 28, an electric power system in which five inverter devices Ab (Ab1 to Ab5) are interconnected to the electric power grid Bb is shown. Note that more inverter devices Ab are interconnected in an actual electric power system.

The arrows shown in FIG. 28 indicate communication. That is, the inverter device Ab1 performs mutual communication with only the inverter device Ab2, and the inverter device Ab2 performs mutual communication with only the inverter device Ab1 and the inverter device Ab3. Also, the inverter device Ab3 performs mutual communication with only the inverter device Ab2 and the inverter device Ab4, the inverter device Ab4 performs mutual communication with only the inverter device Ab3 and the inverter device Ab5, and the inverter device Ab5 only performs mutual communication with the inverter device Ab4.

Returning to FIG. 27, the DC power source 1b outputs DC power, and is provided with a solar cell. The solar cell generates DC power by converting solar energy into electric energy. The DC power source 1b outputs the generated DC power to the inverter circuit 2b. Note that the DC power source 1b is not limited to generating DC power using a solar cell. For example, the DC power source 1b may be a fuel cell, a storage battery, an electric double-layer capacitor or a lithium ion battery, or may be device that converts AC power generated by a diesel engine generator, a micro gas turbine generator, a wind turbine generator or the like into DC power, and outputs the DC power.

The inverter circuit 2b converts the DC power that is input from the DC power source 1b into AC power, and outputs the AC power. The inverter circuit 2b is provided with a PWM control inverter and a filter that are not illustrated. The PWM control inverter is a three-phase inverter provided with three sets of six switching elements in total that are not illustrated, and converts DC power into AC power by switching the ON and OFF of each switching element based on the PWM signal that is input from the control circuit 3b. The filter removes the high frequency component caused by the switching. Note that the inverter circuit 2b is not limited thereto. For example, the PWM control inverter may be a single-phase inverter, or may be a multilevel inverter. Also, another method other than PWM control may be used, such as phase shift control.

The electric current sensor 4b detects the instantaneous value of each of the three-phase output currents of the inverter circuit 2b. The electric current sensor 4b digitally converts the detected instantaneous values, and outputs the resultant values to the control circuit 3b as the current signals Iu, Iv and Iw (hereinafter, the three current signals may be collectively referred to as "current signals I"). The voltage sensor 5b detects the instantaneous value of each of the three-phase interconnection point voltages of the inverter device Ab. The voltage sensor 5b digitally converts the detected instantaneous values, and outputs the resultant values to the control circuit 3b as voltage signals Vu, Vv and Vw (the three voltage signals may be collectively referred to as "voltage signals V"). The DC voltage sensor 6b detects the input voltage of the inverter circuit 2b. The DC voltage sensor 6b digitally converts the detected voltage, and outputs the resultant voltage to the control circuit 3b as a voltage signal Vdc.

The control circuit 3b controls the inverter circuit 2b, and is realized by a microcomputer or the like, for example. The control circuit 3b according to the present embodiment controls the input voltage, the output reactive power and the output current of the inverter circuit 2b, and the grid frequency. Of these, the grid frequency is controlled through the cooperation of all the inverter devices Ab (Ab1 to Ab5) (see FIG. 28) interconnected to the electric power grid Bb.

Hereinafter, a control system for controlling the grid frequency will be described, with reference to FIGS. 29 to 32.

FIGS. 29A to 29D are for illustrating the grid frequency control system of the inverter device Ab.

Figure 29A:
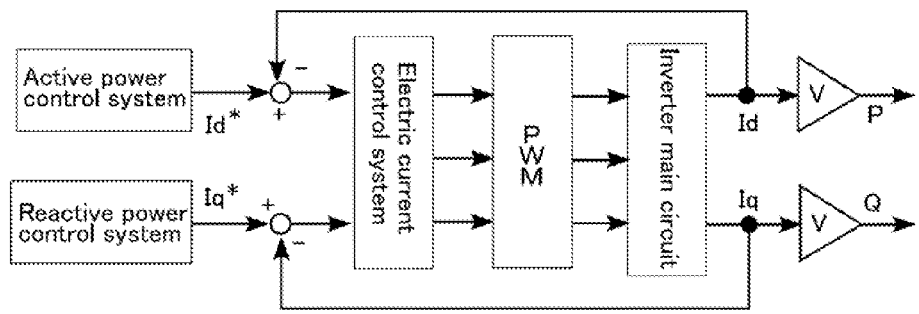
FIGS. 29A to 29D are for illustrating a grid frequency control system of an inverter device.

FIG. 29A shows a model of a typical inverter device. The active power that is output by the inverter device is given as P, the reactive power is given as Q, and the d axis component and the q axis component of the output current of the inverter device are given as Id and Iq (the respective target values are given as Id* and Iq*). Note that the d axis component and the q axis component are two-phase components of a rotating coordinate system after having been transformed by three-phase to two-phase transformation and rotating coordinate transformation that will be discussed later. Also, because the q axis component of the output voltage will be Vq=0 and the d axis component will be Vd=V (effective value of the interconnection point voltage), assuming that the internal phase of the inverter device tracks the phase of the interconnection point voltage perfectly, the following holds:

$P=Vd \cdot Id+Vq \cdot Iq=V \cdot Id$ $Q=Vd \cdot Iq-Vq \cdot Id=V \cdot Iq$

Figure 29B:
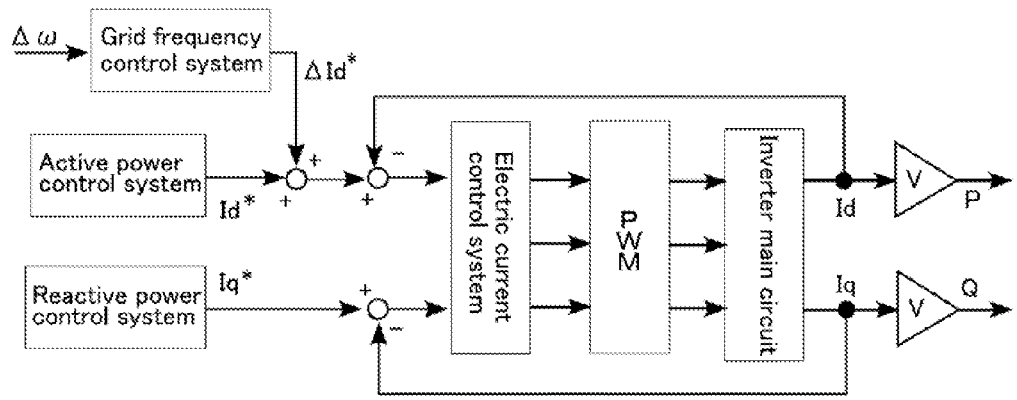

In the third aspect of the instant invention, variation in the grid frequency is suppressed by adjusting output active power, and thus a control system for suppressing variation in the grid frequency is added to the model of FIG. 29A. FIG. 29B shows a model to which a control system for suppressing variation in the grid frequency has been added. In FIG. 29B, a deviation Δω from the target value of a grid frequency ω is input, a grid frequency control system that outputs a grid frequency compensation value ΔId* is added, and the grid frequency compensation value ΔId* is added to a target value Id* of the d axis component of the output current. Note that because angular frequency (obtained by multiplying frequency by 2π) is generally used more than frequency in the control of an electric power system, angular frequency is also used in the present specification.

Figure 29C:
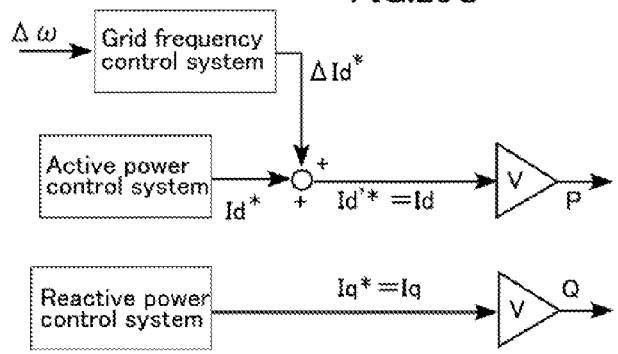

The dynamics of the electric current control system, the PWM and the inverter main circuit can be disregarded, since these dynamics are fast compared with the dynamics of the power control system. FIG. 29C shows an approximated model that disregards these dynamics. Note that Id'*=Id*−ΔId*.

Figure 29D:
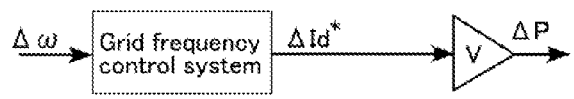

A model that focuses on only the grid frequency control system in the model of FIG. 29C is shown in FIG. 29D.

Figure 30:
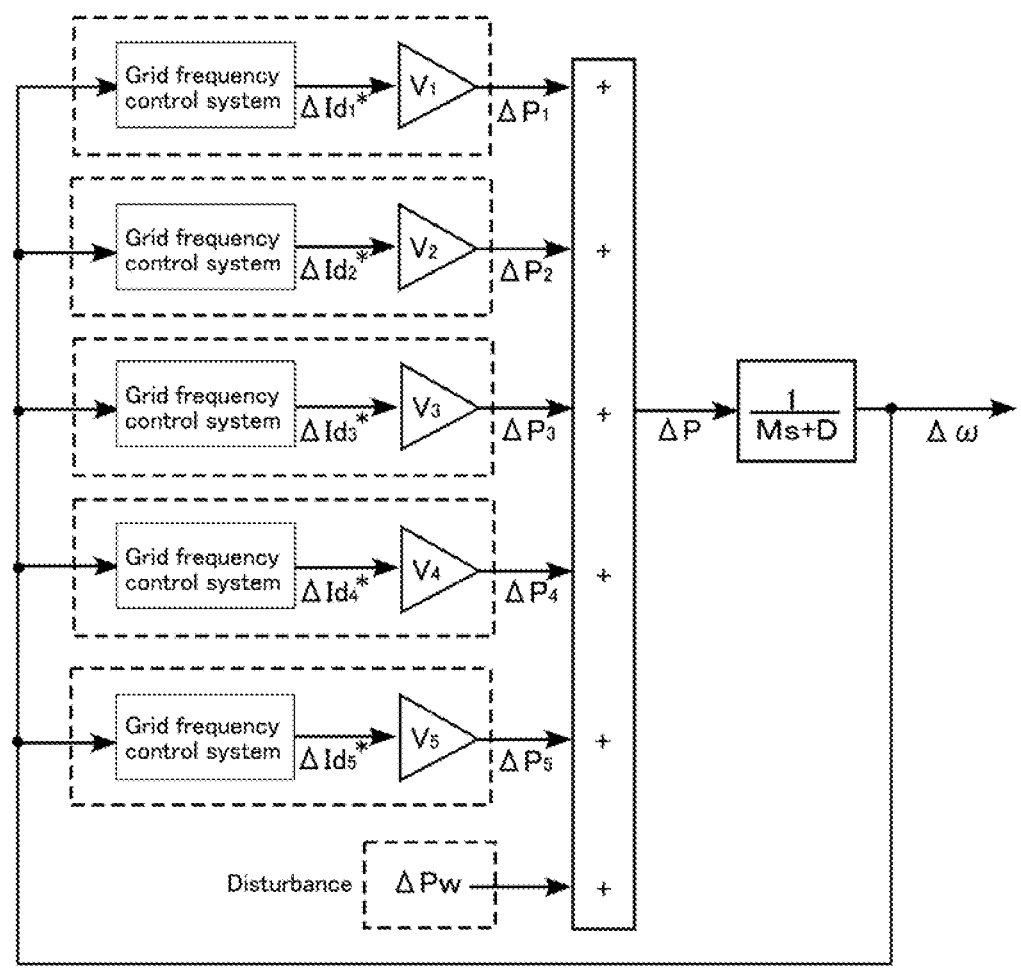
FIG. 30 is for illustrating a grid frequency control system of the entire electric power system.

FIG. 30 is for illustrating the grid frequency control system of the entire electric power system. The active power that is output by the inverter devices Ab1 to Ab5 is respectively varied by $\Delta P_1$ to $\Delta P_5$, and the active power that is supplied to the electric power grid varies by an amount of variation ΔP obtained by adding the respective variations together. The angular frequency ω of the electric power grid varies due to variation in active power P that is supplied. An equivalent power generator model described in Document 4 is used as the frequency variation model. This equivalent power generator model is formulated as the following equation (1b), assuming that all the power generators within the grid perform perfectly synchronized operation. Here, an equivalent inertia constant. M is updated according to the inertia constant of the power generators that are in parallel. A dumping D is updated according to the size of load. Also, included in the variation (disturbance) in active power ΔPw are load variation and variation caused by changes in the output of the solar cell. FIG. 30 represents a system that controls variation in the grid frequency (grid angular frequency) by active power adjustment of each inverter device Ab.

$$\Delta \omega = \frac{1}{Ms+D} \Delta P \quad (1b)$$

In this case, however, not every inverter device Ab cooperatively adjusts output active power, and thus the output active power that is adjusted by each inverter device Ab will be determined by the gain that is set internally, the disposition location of the inverter device Ab, the characteristics of the DC power source 1b, and the like. For example, it is not possible to control the inverter device Ab1 to adjust output active power to half that of the other inverter devices and the inverter devices Ab2 to Ab5 to adjusts output active power equally, or to control each inverter device Ab to adjust output active power according to the capacity thereof.

Next, a method by which the inverter devices Ab cooperatively adjust output active power will be described.

Figure 31A:
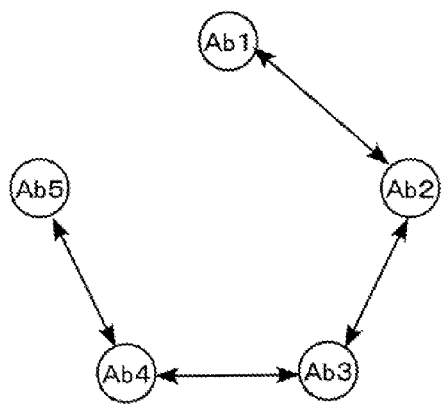
FIGS. 31A to 31D represent the electric power system shown in FIG. 28 in graph form.
Figure 31B:
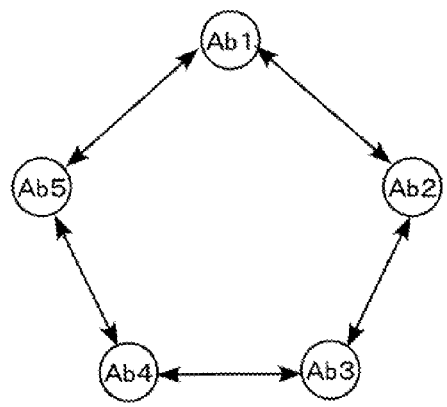
Figure 31C:
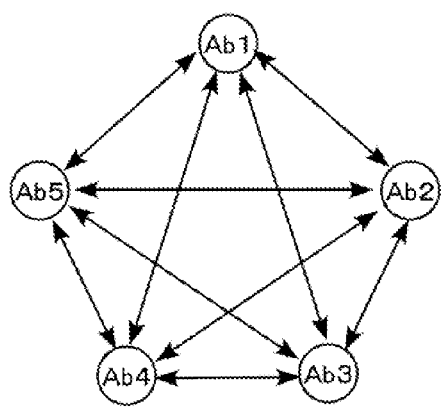
Figure 31D:
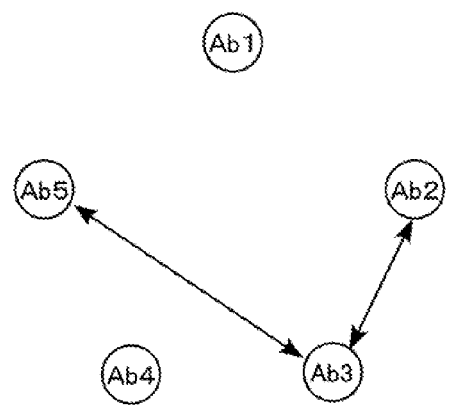

A consensus algorithm for converging the values of the states of a plurality control targets to the same value is known (see Documents 2 and 3). If, in the case where an electric power system is represented as a graph in which the communication states between the respective control targets are represented by edges and each control target represents a vertex, the graph is a connected, undirected graph in graph theory, a consensus can be reached by converging the values of the states of the control targets to the same value using a consensus algorithm. For example, the communication state of the electric power system shown in FIG. 28 will be as shown in FIG. 31A when represented with a graph. The vertices Ab1 to Ab5 respectively represent the inverter devices Ab1 to Ab5, and the edges with arrows represent the communication states between the respective inverter devices. Each edge indicates mutual communication, and the graph is an undirected graph. The graph is a connected graph because a communication path exists to any two vertices of the graph. Accordingly, a consensus can be reached in the case of the electric power system shown in FIG. 28. Because the graphs shown in FIGS. 31B and 31C are also undirected graphs that are connected graphs, a consensus can also be reached in the case where the communication states of the inverter devices Ab1 to Ab5 in the electric power system of FIG. 28 are as shown by these graphs. Thus, a state in which each inverter device Ab performs mutual communication with at least one of the inverter devices Ab that are connected to the electric power system and a communication path exists to any two inverter devices Ab connected to the electric power system need only be realized ("connected state"), and it is not necessary for each inverter device Ab to communicate with all the inverter devices Ab connected to the electric power system.

In the present embodiment, the values of the states of the control targets are weighted rather than being converged to the same value, and the weighted values are converged to the same value. That is, a weight value $W_i$ is set for each inverter device Ab, the value of each state is weighted by dividing the value of the state by the weight value $W_i$, and the weighted values are converged to the same value. The values of the states are thereby converged to a value that depends on the weight value $W_i$. For example, if $W_1=W_2=W_3=W_4=1$ and $W_5=10$, the value of the state of the inverter device Ab5 will be converged on a value that is 10 times the values of the states of inverter devices Ab1 to Ab4.

Figure 32:
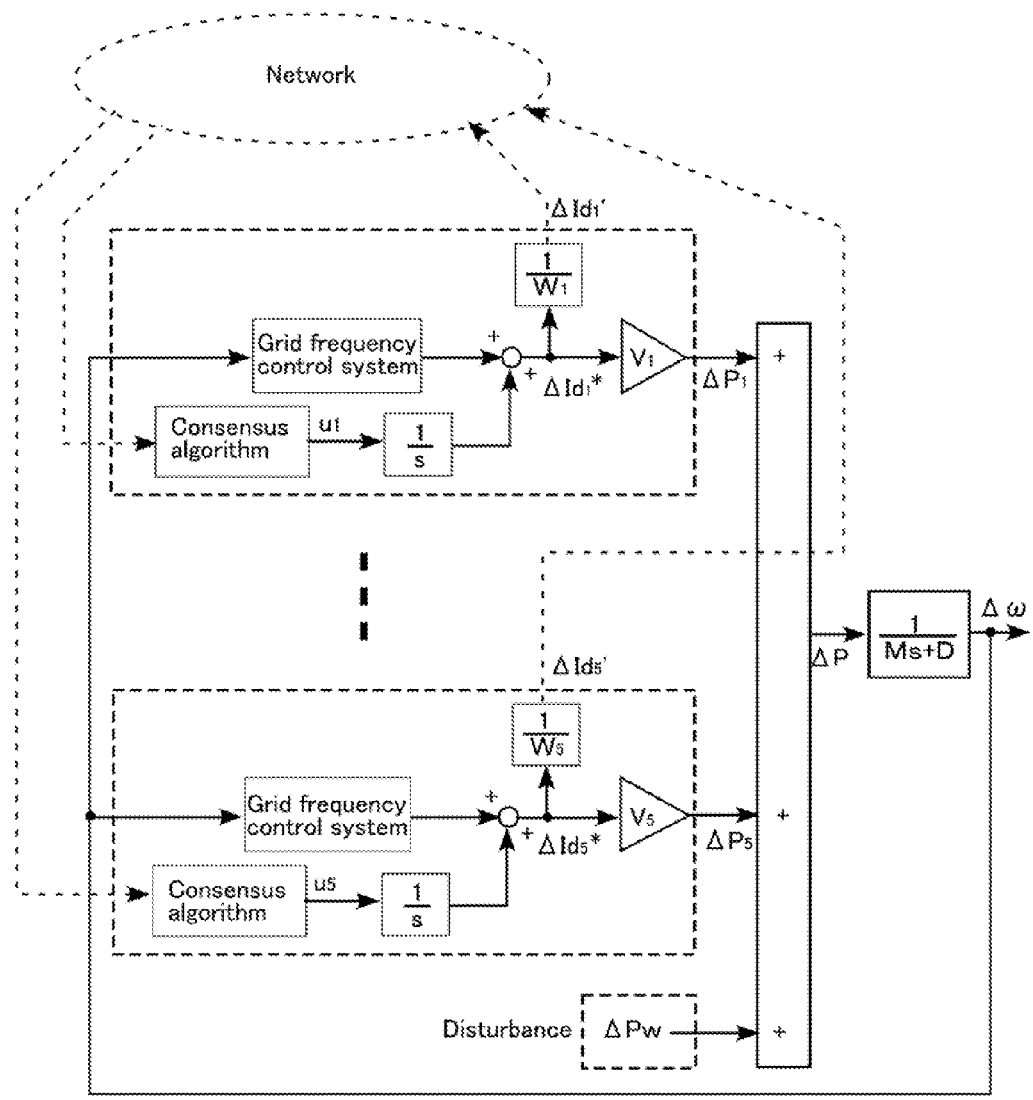
FIG. 32 represents a control system for controlling the grid frequency of the entire electric power system according to the first embodiment of the third aspect.

FIG. 32 represents a control system in which a consensus algorithm and weighting are added to the system shown in FIG. 30, and that controls variation in the grid frequency as a result of the inverter devices Ab each cooperatively adjusting the active power.

As a result of the consensus algorithm, compensation values $\Delta Id_i'$ (=$\Delta Id_i^*/W_i$) obtained by respectively dividing compensation values $\Delta Id_i^*$ by the weight values WS converge to the same value. Each inverter device $Ab_i$ adjusts an amount of active power that depends on a compensation value $\Delta Id_i^* = W_i \cdot \Delta Id\alpha'$, where $\Delta Id\alpha'$ is the convergence value. In other words, active power that depends on the weight value $W_i$ will be adjusted. Accordingly, if $W_1 = W_2 = W_3 = W_4 = 1$ and $W_5 = 10$, for example, the inverter device Ab5 can be made to adjust 10 times as much reactive power as the inverter devices Ab1 to Ab4.

Returning to FIG. 27, the control circuit 3b generates a PWM signal based on the current signals I that are input from the electric current sensor 4b, the voltage signal V that is input from the voltage sensor 5b, and the voltage signal. Vdc that is input from the DC voltage sensor 6b, and outputs the PWM signal to the inverter circuit 2b. The control circuit 3b is provided with a reactive power control unit 30b, an input voltage control unit 31.b, a grid frequency control unit ("target parameter control unit") 32b, a cooperative correction value generation unit 33b, an adder 34b, an electric current control unit 35b, a command signal generation unit 36b, a PWM signal generation unit 37b, a weighting unit 38b, a communication unit 39b, and a grid frequency detection unit 40b.

The reactive power control unit 30b is for controlling the output reactive power of the inverter circuit 2b. Although not illustrated, the reactive power control unit 30b calculates the output reactive power of the inverter circuit 2b from the instantaneous value of the current detected by the electric current sensor 4b and the instantaneous value of the voltage detected by the voltage sensor 5b, performs PI control (proportional-integral control) on the deviation with the target value, and outputs a reactive power compensation value. The reactive power compensation value is input to the electric current control unit 35b as the target value Iq*. Note that the reactive power control unit 30b is not limited to performing PI control, and may be configured to perform other control such as I control (integral control).

The input voltage control unit 31b is for controlling the input voltage of the inverter circuit 2b. The input voltage control unit 31b controls the output active power of the inverter circuit 2b by controlling the input power through controlling the input voltage. The input voltage control unit 31b receives input of a deviation $\Delta Vdc$ of the voltage signal Vdc which is input from the DC voltage sensor 6b from the input voltage target value Vdc* which is the target value of the voltage signal Vdc, performs PI control, and outputs an active power compensation value. Note that the input voltage control unit 31b is not limited to performing PI control, and may be configured to perform other control such as I control.

The grid frequency detection unit 40b detects the angular frequency ω of the electric power grid Bb. The grid frequency detection unit 40b receives input of the voltage signal V from the voltage sensor 5b, detects the angular frequency of the interconnection point voltage, and outputs the detected angular frequency as the angular frequency Q of the electric power grid Bb. Note that a commonly used technique such as a PLL method or a zero-crossing counting method need only by utilized as the method of detecting the angular frequency.

The grid frequency control unit 32b is for controlling the grid frequency. The grid frequency control unit 32b controls the grid frequency through adjusting the active power that is output by the inverter circuit 2b. The grid frequency control unit 32b receives input of a deviation $\Delta\omega$ of the angular frequency ω which is input from the grid frequency detection unit 40b from the grid frequency target value ω* which is the target value of the angular frequency ω, performs PI control, and outputs a grid frequency compensation value. The grid frequency compensation value is input to the adder 34b. Note that the grid frequency control unit 32b is not limited to performing PI control, and may be configured to perform other control such as I control. Also, a configuration may be adopted in which the grid frequency detection unit 40b detects a grid frequency f, and the grid frequency control unit 32b receives input of a deviation $\Delta f$ of the grid frequency f from a target value f* thereof and outputs a grid frequency compensation value.

The cooperative correction value generation unit 33b generates the cooperative correction value for cooperating with the inverter devices Ab. The cooperative correction value generation unit 33b will be discussed in detail later.

The adder 34b calculates the correction compensation value $\Delta Id_i^*$ by adding the cooperative correction value that is input from the cooperative correction value generation unit 33b to the grid frequency compensation value that is input from the grid frequency control unit 32b. The correction compensation value $\Delta Id_i^*$ that is output from the adder 34b is added to the active power compensation value that is output from the input voltage control unit 31b, and the resultant value is input to the electric current control unit 35b as the target value Id*. The adder 34b also outputs the calculated correction compensation value $\Delta Id_i^*$ to the weighting unit 38b.

The electric current control unit 35b is for controlling the output current of the inverter circuit 2b. The electric current control unit 35b generates an electric current compensation value based on the current signals I that are input from the electric current sensor 4b, and outputs the generated electric current compensation value to the command signal generation unit 36b.

Figure 33:
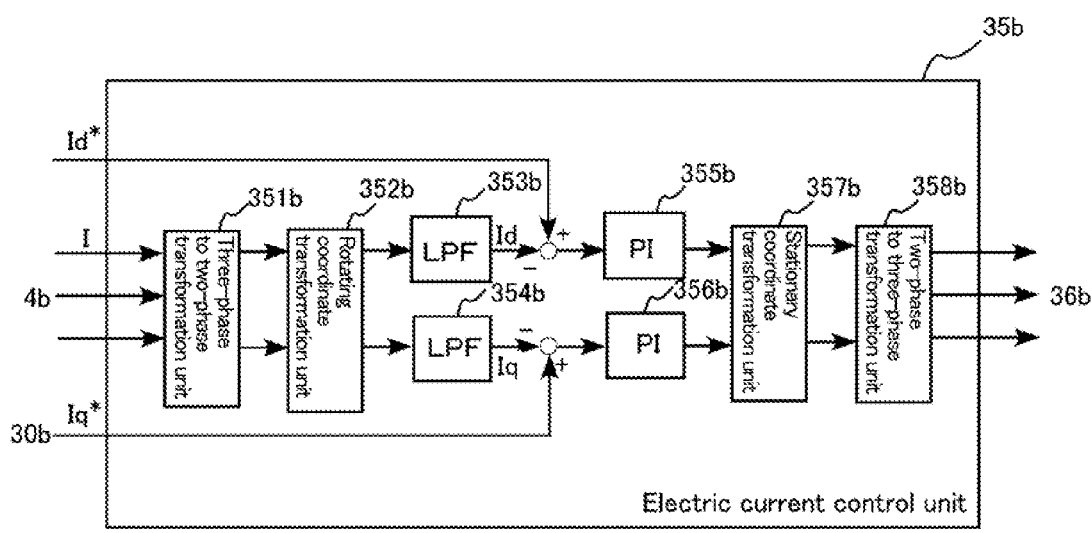
FIG. 33 is for illustrating an internal configuration of an electric current control unit.

FIG. 33 is a functional block diagram for illustrating the internal configuration of the electric current control unit 35b.

The electric current control unit 35b is provided with a three-phase to two-phase transformation unit 351b, a rotating coordinate transformation unit 352b, a LPF 353b, a LPF 354b, a PI control unit 355b, a PI control unit 356b, a stationary coordinate transformation unit 357b, and a two-phase to three-phase transformation unit 358b.

The three-phase to two-phase transformation unit 351b performs so-called three-phase to two-phase transformation (αβ transformation). Three-phase to two-phase transformation is processing for transforming three-phase AC signals into equivalent two-phase AC signals, and involves transforming three-phase AC signals into the AC signal of an α-axis component and the AC signal of a β-axis component by respectively breaking down the three-phase AC signals into the components of the orthogonal α and β axes in a stationary orthogonal coordinate system (hereinafter "stationary coordinate system") and adding together the components of the axes. The three-phase to two-phase transformation unit 351b transforms the three-phase current signals Iu, Iv and Iw input from the electric current sensor 4b into an α-axis current signal Iα and a β-axis current signal Iβ, and output the current signals to the rotating coordinate transformation unit 352b.

The transformation processing that is performed by the three-phase to two-phase transformation unit 351b is represented by the following equation (2b).

$$\begin{bmatrix} I\alpha \\ I\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Iu \\ Iv \\ Iw \end{bmatrix} \quad (2b)$$

The rotating coordinate transformation unit 352b performs so-called rotating coordinate transformation (dq transformation). Rotating coordinate transformation is processing for transforming two-phase signals of a stationary coordinate system into two-phase signals of a rotating coordinate system. The rotating coordinate system is an orthogonal coordinate system that has orthogonal d and q axes, and rotates at the same angular velocity and in the same rotation direction as the fundamental wave of the interconnection point voltage. The rotating coordinate transformation unit 352b transforms the α-axis current signal Iα and the β-axis current signal Iβ of the stationary coordinate system that are input from the three-phase to two-phase transformation unit 351b, based on a phase θ of the fundamental wave of the interconnection point voltage, into a d-axis current signal Id and a q-axis current signal Iq of the rotating coordinate system, and outputs these current signals.

The transformation processing that is performed by the rotating coordinate transformation unit 352b is represented by the following equation (3b).

$$\begin{bmatrix} Id \\ Iq \end{bmatrix} = \begin{bmatrix} \cos\theta & \sin\theta \\ -\sin\theta & \cos\theta \end{bmatrix} \begin{bmatrix} I\alpha \\ I\beta \end{bmatrix} \quad (3b)$$

The LPF 353b and the LPF 354b are low pass filters, and respectively pass only the DC component of the d-axis current signal Id and the q-axis current signal Iq. As a result of the rotating coordinate transformation, the fundamental wave components of the α-axis current signal Iα and the β-axis current signal Iβ are respectively transformed into DC components of the d-axis current signal Id and the q-axis current signal Iq. In other words, the LPF 353b and the LPF 354b remove unbalanced and harmonic components, and pass only fundamental wave components.

The PI control unit 355b performs PI control based on the deviation of the DC component of the d-axis current signal Id from the target value, and outputs an electric current compensation value Xd. The correction compensation value ΔId$_i$* is added to the active power compensation value that is output from the input voltage control unit 31b, and the resultant value is used as the target value Id of the d-axis current signal Id. The PI control unit 356b performs PI control based on the deviation of the DC component of q-axis current signal Iq from the target value Iq*, and outputs an electric current compensation value Xq. The reactive power compensation value that is output from the reactive power control unit 30b is used as the target value Iq* of the q-axis current signal Iq.

The stationary coordinate transformation 357b unit transforms the electric current compensation values Xd and Xq that are respectively input from the PI control unit 355b and the PI control unit 356b into electric current compensation values Xα and Xβ of the stationary coordinate system, and performs processing that is the reverse of the transformation processing performed by the rotating coordinate transformation unit 352b. The stationary coordinate transformation unit 357b performs so-called stationary coordinate transformation (inverse dq transformation), and transforms the electric current compensation values Xd and Xq of the rotating coordinate system into the electric current compensation values Xα and Xβ of the stationary coordinate system based on the phase θ.

The transformation processing that is performed by the stationary coordinate transformation unit 357b is represented by the following equation (4b).

$$\begin{bmatrix} X\alpha \\ X\beta \end{bmatrix} = \begin{bmatrix} \cos\theta & -\sin\theta \\ \sin\theta & \cos\theta \end{bmatrix} \begin{bmatrix} Xd \\ Xd \end{bmatrix} \quad (4b)$$

The two-phase to three-phase transformation unit 358b transforms the electric current compensation values Xα and Xβ that are input from the stationary coordinate transformation unit 357b into three-phase electric current compensation values Xu, Xv and Xw. The two-phase to three-phase transformation unit 358b performs so-called two-phase to three-phase transformation (inverse αβ transformation), which is processing that is the reverse of the transformation processing performed by the three-phase to two-phase transformation unit 351b.

The transformation processing that is performed by the two-phase to three-phase transformation unit 358b is represented by the following equation (5b).

$$\begin{bmatrix} Xu \\ Xv \\ Xw \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} X\alpha \\ X\beta \end{bmatrix} \quad (5b)$$

Note that the inverter device Ab was described as being a three-phase system in the present embodiment, but may be a single-phase system. In the case of a single-phase system, the electric current control unit 35b need only control a single-phase current signal obtained by detecting the output current of the inverter circuit 2b.

The command signal generation unit 36b generates a command signal based on the electric current compensation values Xu, Xv and Xw that are input from the electric current control unit 35b, and outputs the generated command signal to the PWM signal generation unit 37b.

The PWM signal generation unit 37b generates a PWM signal. The PWM signal generation unit 37b generates the PWM signal using the triangular wave comparison method, based on a carrier signal and the command signal that is input from the command signal generation unit 36b. For example, a pulse signal whose level is high in the case where the command signal is larger than the carrier signal and whose level is low in the case where the command signal is smaller than or equal to the carrier signal is generated as the PWM signal. The generated PWM signal is output to the inverter circuit 2b. Note that the PWM signal generation unit 37b is not limited to generating the PWM signal with the triangular wave comparison method, and may generate the PWM signal with a hysteresis method, for example.

The weighting unit 38b weights the correction compensation value ΔId$_i$* that is input from the adder 34b. The weight value W$_i$ is set in advance in the weighting unit 38b. The weighting unit 38b outputs a weighted correction compensation value ΔId$_i$' obtained by dividing the correction compensation value ΔId$_i$* by the weight value W$_i$ to the communication unit 39b and the cooperative correction value generation unit 33b.

The weight value W$_i$ is set in advance according to the size (adjustment amount) of the output active power that is to be adjusted by the inverter device Ab. For example, because the capacity of the inverter device Ab1 (see FIG. 28) is greater than the capacity of the inverter devices Ab2 to Ab5, in the case of wanting to increase the adjustment amount of the inverter device Ab1 (wanting to reduce the adjustment amount of the inverter devices Ab2 to Ab5 as much as possible), the weight value $W_1$ of the inverter device Ab1 is set to a large value compared with the weight values $W_2$ to $W_5$ of the other inverter devices Ab2 to Ab5. The weight values $W_2$ to $W_5$ may be the same value in order to equalize the adjustment amounts. Note that the method of setting the weight value $W_i$ is not limited, and a configuration may be adopted in which the weight value $W_i$ is set according to the size of the solar cell panel connected to the inverter device Ab, for example.

The communication unit 39b communicates with the control circuit 3b of another inverter device Ab. The communication unit 39b receives input of the weighted correction compensation value $\Delta Id_i'$ from the weighting unit 38b, and transmits the weighted correction compensation value $\Delta Id_i'$ to the communication unit 39b of another inverter device Ab. Also, the communication unit 39b outputs the compensation value $\Delta Id_1'$ received from the communication unit 39b of another inverter device Ab to the cooperative correction value generation unit 33b. Note that the communication method is not limited, and may be wired communication or wireless communication.

For example, in the case of the inverter device Ab is the inverter device Ab2 shown in FIG. 28, the communication unit 39b transmits a weighted correction compensation value $\Delta Id_2'$ to the communication unit 39b of the inverter devices Ab1 and A3, receives a compensation value $\Delta Id_1'$ from the communication unit 39b of the inverter device Ab1, and receives a compensation value $\Delta Id_3'$ from the communication unit 39b of the inverter device Ab3.

Next, the cooperative correction value generation unit 33b will be described in detail.

The cooperative correction value generation unit 33b generates the cooperative correction value for cooperating with each inverter device Ab, the weighted correction compensation value $\Delta Id_i'$ (hereinafter, abbreviated to "compensation value $\Delta Id_i'$") that is input from the weighting unit 38b and the compensation value $\Delta Id_j'$ of another inverter device Ab that is input from the communication unit 39b. Even if the compensation value $\Delta Id_i'$ and the compensation value $\Delta Id_j'$ differ, the compensation value $\Delta Id_i'$ and the compensation value $\Delta Id_j'$ are converged to a common value by the operation processing of the cooperative correction value generation unit 33b being repeated. As shown in FIG. 27, the cooperative correction value generation unit 33b is provided with an operation unit 331b, a multiplier 332b, and an integrator 333b.

The operation unit 331b performs the following operation processing that is based on the following equation (6b). That is, the operation unit 331b subtracts the compensation value $\Delta Id_i'$ that is input from the weighting unit 38b from each compensation value $\Delta Id_j'$ that is input from the communication unit 39b, and outputs an operation result $u_i$ obtained by adding together all the subtraction results to the multiplier 332b.

$$u_i = \sum_j (\Delta Id_j' - \Delta Id_i') \tag{6b}$$

For example, in the case where the inverter device Ab is the inverter device Ab2 (see FIG. 28), the operation unit 331b calculates the following equation (7b), and outputs an operation result $u_2$.

$$\begin{aligned}u_2 &= \sum_{j=1,3} (\Delta Id_j' - \Delta Id_2') \\ &= (\Delta Id_1' - \Delta Id_2') + (\Delta Id_3' - \Delta Id_2') \\ &= \Delta Id_1' + \Delta Id_3' - 2\Delta Id_2'\end{aligned} \tag{7b}$$

The multiplier 332b multiplies the operation result $u_i$ that is input from the operation unit 331b by a predetermined coefficient $\epsilon$, and outputs the resultant value to the integrator 333b. The coefficient $\epsilon$ is a value that satisfies $0 < \epsilon < 1/d_{max}$, and is set in advance. $d_{max}$ is the maximum value of $d_i$, which is the number of the other inverter devices Ab with which the communication unit 39b communicates, among all the inverter devices Ab connected to the electric power system. In other words, $d_{max}$ is the number of compensation values $\Delta Id_j'$ that is input to the communication unit 39b of the inverter device Ab that is communicating with the most other inverter devices Ab, among the inverter devices Ab connected to the electric power system. Note that the operation result $u_i$ is multiplied by the coefficient $\epsilon$, in order to ensure that the variation in the cooperative correction value does not become too large due to the operation result $u_i$ being overly large (small). Accordingly, in the case where processing by the cooperative correction value generation unit 33b is continuous-time processing, the multiplier 332b does not need to be provided.

The integrator 333b generates the cooperative correction value by integrating the values that are input from the multiplier 332b, and outputs the generated cooperative correction value. The integrator 333b generates the cooperative correction value by adding the value that is input from the multiplier 332b to the cooperative correction value generated last time. The cooperative correction value is output to the adder 34b.

In the present embodiment, the control circuit 3b was described as being realized as a digital circuit, but may be realized as an analog circuit. Also, the processing that is performed by each constituent element is designed with a program, and a computer may be caused to function as the control circuit 3b by executing the program. Also, a configuration may be adopted in which the program is recorded on a recording medium and read by a computer.

In the present embodiment, the cooperative correction value generation unit 33b generates the cooperative correction value, using the compensation value $\Delta Id_i'$ that is input from the weighting unit 3.b and the compensation value $\Delta Id_j'$ of another inverter device Ab that is input from the communication unit 39b. In the case where the compensation value $\Delta Id_i'$ is larger than the arithmetic mean value of the correction values $\Delta Id_j'$, the operation result $u_i$ that is output by the operation unit 331b will be a negative value. When this is the case, the cooperative correction value decreases and the compensation value $\Delta Id_i'$ will also decrease. On the other hand, in the case where the compensation value $\Delta Id_i'$ is smaller than the arithmetic mean value of the correction values $\Delta Id_j'$, the operation result $u_i$ that is output by the operation unit 331b will be a positive value. When this is the case, the cooperative correction value increases and the compensation value $\Delta Id_i'$ will also increase. In other words, the compensation value $\Delta Id_i'$ approaches the arithmetic mean value of the correction values $\Delta Id_j'$. As a result of this processing being performed by each of the inverter devices Ab, the compensation value $\Delta Id_i'$ of each inverter device Ab converges to the same value. The fact that the values of the states of control targets converge to the same value as a result of using a consensus algorithm has also been proven mathematically (see Documents 2 and 3). In the case of the present embodiment, the compensation value $\Delta Id_i'$ is the value of a state of a control target.

Hereinafter, simulation that confirms that variation in the grid frequency is adjusted by each inverter device Ab cooperatively suppressing output active power in the electric power system shown in FIG. 28 will be described. The simulation was performed using the control system shown in FIG. 32.

A proportional gain $Kp_1$ of the grid frequency control unit 32b of the inverter device Ab1 is given as "1", an integral gain $Ki_1$ is given as "2", a proportional gain $Kp_2$ of the grid frequency control unit 32b of the inverter device Ab2 is given as "1", an integral gain $Ki_2$ is given as "0.5", a proportional gain $Kp_3$ of the grid frequency control unit 32b of the inverter device Ab3 is given as "2", an integral gain $Ki_3$ is given as "3", a proportional gain $Kp_4$ of the grid frequency control unit 32b of the inverter device Ab4 is given as "5", an integral gain $Ki_4$ is given as "1", a proportional gain $Kp_5$ of the grid frequency control unit 32b of the inverter device Ab5 is given as "0.5", an integral gain $Ki_5$ is given as "0.3", the interconnection point voltages $V_1$ to $V_5$ are given as "1 p.u.", M is given as "9 s", D is given as "2 p.u.". FIG. 34A to FIG. 36B show the results of the simulation.

Figure 34A:
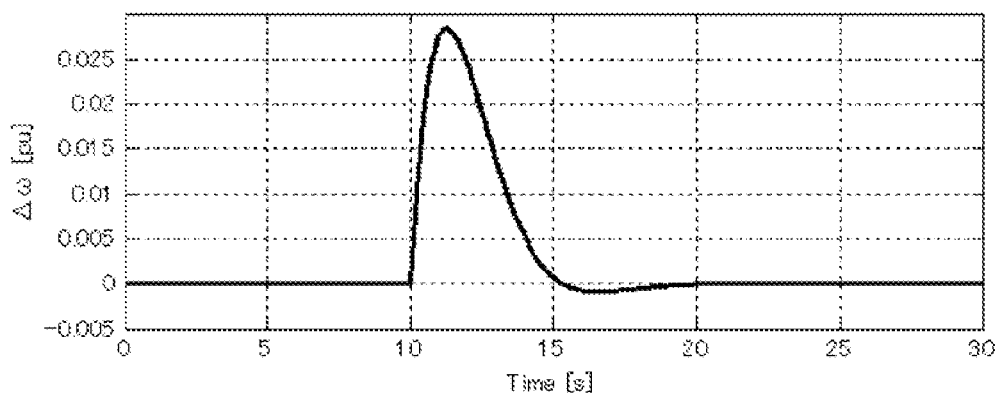
FIGS. 34A and 34B show simulation results confirming suppression of variation in the grid frequency in the electric power system.
Figure 34B:
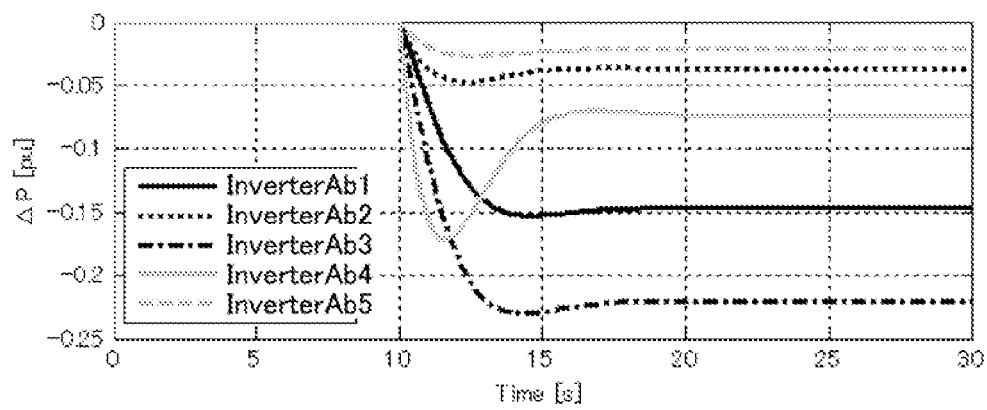
Figure 35A:
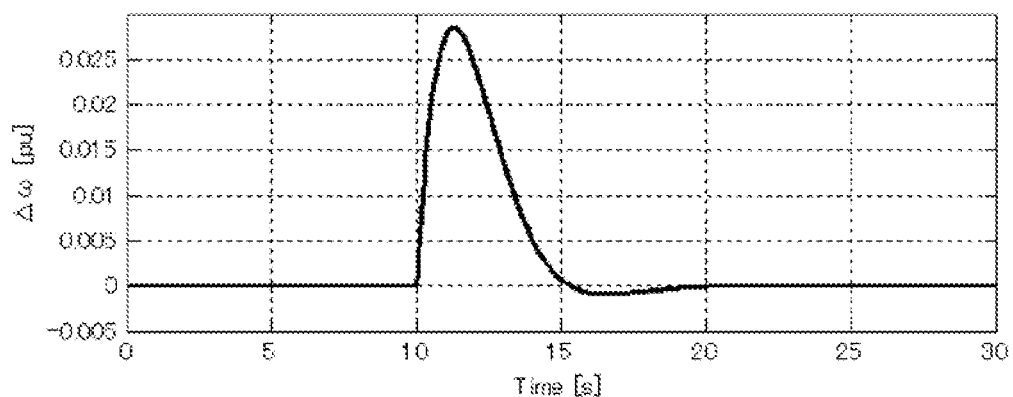
FIGS. 35A and 35B show simulation results confirming suppression of variation in the grid frequency in the electric power system.
Figure 35B:
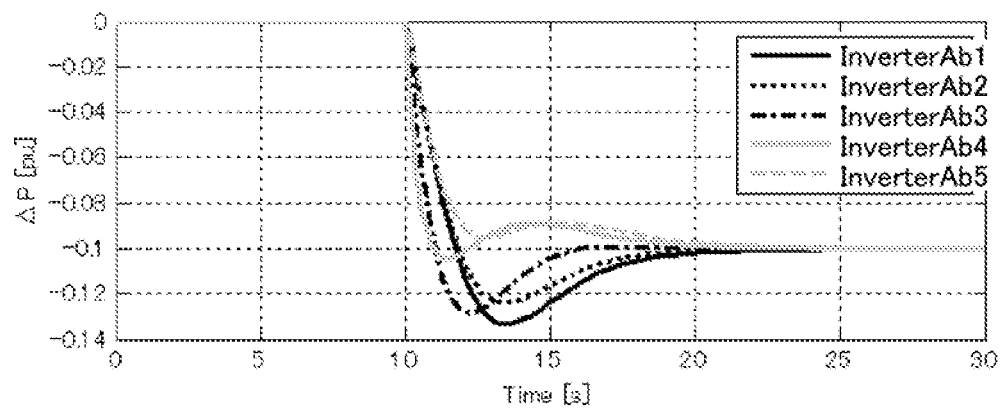

FIGS. 34A and 34B and FIGS. 35A and 35B are for confirming that each inverter device Ab cooperatively suppresses output active power, where the weight values W to $W_5$ that are set in the weighting unit 38b of the inverter devices Ab1 to Ab5 are given as $W_1=W_2=W_3=W_4=W_5=1$. FIGS. 34A and 34B are for comparison and show the case where cooperation is not performed (i.e., in the case where the control system shown in FIG. 30 is used), whereas FIGS. 35A and 35B show the case where cooperation is performed (i.e., in the case where the control system shown in FIG. 32 is used).

In both cases, 0.5 p.u. was injected stepwise as a disturbance ΔPw ten seconds after the start of simulation. FIG. 34A and FIG. 35A show the temporal change in the deviation Δω of the grid angular frequency. Also, FIG. 34B and FIG. 35B show the temporal change in the adjustment amount of output active power of the inverter devices Ab1 to Ab5. This simulation involves injecting a disturbance ΔPw that increases active power, and performing adjustment such that the inverter devices Ab1 to Ab5 suppress output active power. Because the case of increasing output active power is given in the positive direction in each FIG. B, the adjustment amount (suppression amount) is shown with a negative value.

In the case of FIGS. 34A and 34B, variation in the grid angular frequency can be quickly suppressed, but the adjustment amount of each of the inverter devices Ab1 to Ab5 is fixed to a value that depend on the respective gain. Accordingly, the amount of output active power that each of the inverter devices Ab1 to Ab5 suppresses cannot be controlled. In the case of FIG. 34B, the output active power of the inverter device Ab3 is suppressed the most, and adjustment amount thereof cannot be reduced.

In the case of FIGS. 35A and 35B, variation in the grid angular frequency can also be quickly suppressed, similarly to the case of FIGS. 34A and 34B. Also, in the case of FIGS. 35A and 35B, the adjustment amounts of the inverter devices Ab1 to Ab5 converge to the same value approximately 24 seconds after the start of simulation. That is, the inverter devices Ab1 to Ab5 cooperatively suppress output active power.

Simulation was also respectively performed for cases where the communication state of the electric power system shown in FIG. 28 is as depicted in the graphs shown in FIGS. 31B and 31C. It was also confirmed in these cases that, similarly to the case of FIGS. 35A and 35B, variation in the grid angular frequency can be quickly suppressed, and the adjustment amounts of the inverter devices Ab1 to Ab5 converge to the same value. Also, the time taken to converge was shorter in the case of the graph of FIG. 31B than in the case of FIGS. 35A and 35B (in the case of the graph of FIG. 31A), and the time taken to converge was even shorter in the case of the graph of FIG. 31C. Note that illustration of the simulation results is omitted.

Figure 36A:
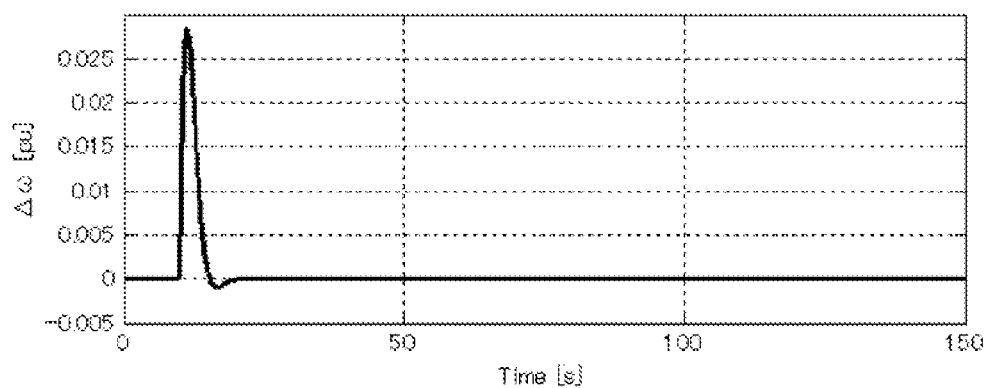
FIGS. 36A and 36B show simulation results confirming suppression of variation in the grid frequency in the electric power system.
Figure 36B:
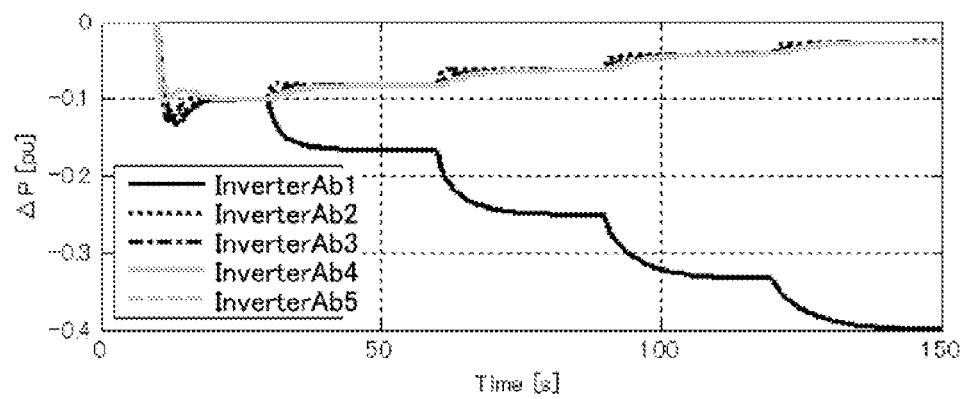

FIGS. 36A and 36B are diagrams in which the weight values $W_1$ to $W_5$ that are set in the weighting unit 38b of the inverter device Ab1 to Ab5 are given as $W_2=W_3=W_4=W_5=1$, and $W_1$ is changed over time, and for confirming that the adjustment amount of the output active power of each inverter device Ab changes depending on the weight value. 0.5 p.u. is also injected stepwise as a disturbance ΔPw 10 seconds after the start of simulation in the case of FIGS. 36A and 36B. FIG. 36A shows the temporal change in the deviation Δω of grid angular frequency, and FIG. 36B shows the temporal change in the adjustment amount of output active power of each inverter device Ab1 to Ab. The weight value $W_1$ is given as "1" when the simulation is started, but is changed to "2" 30 seconds after the start of simulation, to "4" after 60 seconds, to "8" after 90 seconds, and to "16" after 120 seconds.

As shown in FIGS. 36A and 36B, variation in the grid angular frequency can be quickly suppressed, and the adjustment amounts of the inverter devices Ab1 to Ab5 converge to the same value approximately 24 seconds after the start of simulation. Also, after changing the weight value $W_1$ to "2", the adjustment amounts the inverter devices Ab2 to Ab5 decrease (the values in FIG. 36B increase), and the adjustment amount of the inverter device Ab1 increases (the value in FIG. 36B decreases). In other words, the inverter device Ab1 bears part of the adjustment amount of the inverter devices Ab2 to Ab5. The adjustment amount of the inverter devices Ab2 to Ab5 is half the adjustment amount of the inverter device Ab1. Furthermore, after changing the weight value $W_1$ to "4", the adjustment amount of the inverter devices Ab2 to Ab5 falls to one quarter of the adjustment amount of the inverter device Ab1. Also, after changing the weight value $W_1$ to "8", the adjustment amount of the inverter device Ab2 to Ab5 falls to ⅛ of the adjustment amount of the inverter device Ab1, and after changing the weight value $W_1$ to "16", the adjustment amount of the inverter device Ab2 to Ab5 falls to 1/16 of the adjustment amount of the inverter device Ab1. Thus, it could be confirmed that the adjustment amount of output active power of each inverter device Ab changes depending on the weight value.

According to the present embodiment, the cooperative correction value generation unit 33b generates a cooperative correction value using an operation result that is based on the compensation value $\Delta Id_i'$ and the compensation value $\Delta Id_j'$. The compensation values $\Delta Id_i'$ of all the inverter devices Ab1 to Ab5 converge to the same value, as a result of the cooperative correction value generation unit 33b of each of the inverter devices Ab1 to Ab5 performing this processing.

Accordingly, the correction compensation value $\Delta Id_i^*$ of each of the inverter devices Ab1 to Ab5 will be a value that depends on the respective weight values $W_1$ to $W_5$. Because the adjustment amount of output active power of each of the inverter devices Ab1 to Ab5 is adjusted based on the correction compensation value $\Delta Id_i^*$, the adjustment amount of output active power of the inverter devices Ab1 to Ab5 can be adjusted according to the weight values $W_1$ to $W_5$.

Also, a configuration need only be adopted in which each of the inverter devices Ab connected to the electric power system only performs mutual communication with at least one inverter device Ab (e.g., an inverter device Ab that is located nearby or with which communication has been established) and the electric power system is in a connected state, and it is not necessary for one inverter device Ab or a monitoring device to perform communication with all the other inverter devices Ab. Accordingly, the system does not become large-scale. Also, even in the case where there is a fault with a certain inverter device Ab or one of the inverter devices Ab is eliminated, all of the remaining inverter devices Ab need only be able to communicate with one inverter device Ab, and the electric power system need only be in a connected state. Also, in the case of adding an inverter device Ab, that inverter device Ab need only be able to perform mutual communication with at least one inverter device Ab. Accordingly, the number of inverter devices Ab can be flexibly increased or decreased.

Although the case where the inverter device Ab converts the input from the DC power source $1b$ and outputs the conversion result to the electric power system Bb was described in the first embodiment, the present invention is not limited thereto. For example, the inverter device Ab may be an inverter device for charging and discharging a storage battery system, or may be an inverter device for power adjustable loads. These inverter devices Ab adjust the active power used in charging (or discharging) a storage battery or the active power that is consumed by a load. In other words, the active power that is charged or consumed is increased if there is rise in grid frequency, and the active power that is charged or consumed is reduced if there is a fall in grid frequency. Adjustment of active power can also be cooperatively performed with other inverter devices Ab in these cases. In the case of solar power generation and wind power generation, it is preferable to adjust output active power as little as possible. Accordingly, the weight value W of inverter devices Ab that are used for solar power generation, wind power generation, or the like is set to a small value, and the weight value W of inverter devices Ab that are used for storage battery systems or loads is set to a large value. Variation in the grid frequency due to disturbance can thereby be suppressed by adjusting the active power that is used to charge (or that is discharged from) a storage battery, and the active power that is consumed by a load, with minimal adjustment of the output active power resulting from solar power generation, wind power generation, or the like. Note that in the case of the inverter devices for storage battery systems or loads, output active power may be controlled instead of controlling input voltage. Specifically, an output active power control unit is provided instead of the input voltage control unit $31b$, and the output active power of the inverter circuit $2b$ is calculated, PI control is performed on the deviation from the target value thereof, and an active power compensation value is output.

In the case of an inverter device Ab that converts the input from a DC power source $1b$ such as a solar cell and outputs the conversion result to the electric power grid Bb, such as with the first embodiment, adjustment is performed so as to suppress the output active power when the grid frequency rises, and adjustment is performed so as to increase the output active power when the grid frequency falls. Accordingly, in order to leave room for increasing the output active power, it is necessary to control output to about 90 percent of the maximum, rather than performing MPPT control (maximum power point tracking control) so as to output maximum power.

Alternatively, in the case where the grid frequency falls, it is necessary to change the communication state. That is, it is necessary to switch from a communication network for use under normal conditions or when the grid frequency rises to a communication network excluding inverter devices Ab that perform MPPT control (i.e., a communication network constituted by only inverter devices Ab for storage batteries or loads and inverter devices Ab that control output to about 90 percent of the maximum). The inverter devices Ab constituting the communication network that is switched to cooperatively perform adjustment through communication so as to increase active power. The switching of communication networks is performed by the individual inverter devices Ab themselves, through the communication unit $39b$ changing communication partners based on the grid angular frequency ω detected by the grid frequency detection unit $40b$.

For example, in the case of switching from the communication network shown in the graph of FIG. 31A to a communication network (see FIG. 31D) excluding inverter devices Ab1 and Ab4 that performs MPPT control, the inverter device Ab1 disconnects communication with the inverter device Ab2, and the inverter device Ab2 also disconnects communication with the inverter device Ab1. Also, the inverter device Ab3 disconnects communication with the inverter device Ab4, and instead communicates with the inverter device Ab5. The inverter device Ab4 disconnects communication with the inverter devices Ab3 and Ab5. The inverter device Ab5 disconnects communication with the inverter device Ab4, and instead communicates with the inverter device Ab3. Switching to the communication network shown in the graph of FIG. 31D thereby carried out, and the inverter devices Ab2, Ab3, and Ab5 cooperatively perform adjustment so as to increase active power. The inverter devices Ab1 and Ab4 do not perform adjustment for increasing active power. When a state where the grid frequency has fallen is resolved, switching to the communication network shown in the graph of FIG. 31A is carried out by the communication unit $39b$ of each inverter device Ab returning to the original communication partners.

In the first embodiment, the case where the weight values $W_1$ to $W_5$ are set on the premise that the interconnecLion point voltages $V_1$ to $V_5$ (see FIG. 32) of the inverter devices Ab1 to Ab5 are the same was described. However, the method of setting the weight values $W_1$ to $W_5$ changes when the interconnection point voltages $V_1$ to $V_5$ differ. That is, the output active power differs when the interconnection point voltages $V_1$ to $V_5$ differ, even when the inverter devices Ab1 to Ab5 output the same current. Accordingly, in order to make the adjustment amounts of output active power of the inverter devices Ab1 to Ab5 the same, it is necessary to make the weight values $W_1$ to $W_5$ proportional to the reciprocals of the interconnection point voltages $V_1$ to $V_5$, rather than making the weight values $W_1$ to $W_5$ the same. For example, in the case where $V_1=V_2=V_3=V_4=2V$ (i.e., in the case where $V_5$ is half of $V_1$ to $V_4$), the adjustment amounts of output active power can be made the same by setting $W_1=W_2=W_3=W_4=1$ and $W_5=2$.

Note that although the case where the operation equation that is set in the operation unit 331*b* is the equation (6b) was described in the first embodiment, the present invention is not limited thereto. Any other equation that converges the correction values ΔId$_j$' of the inverter devices Ab1 to Ab5 to the same value may be used.

For example, the correction values ΔId$_j$' can also be converges to the same value in the case where the operation equation that is set in the operation unit 331*b* is the following equation (8b), where d$_1$ is the number of the other inverter devices Ab with which the communication unit 39*b* communicates, that is, the number of the correction values ΔId$_j$' that is input to the communication unit 39*b*.

$$u_i = \frac{1}{d_i} \sum_j (\Delta Id_j' - \Delta Id_i') \quad (8b)$$

The compensation values ΔId$_i$' can also be converges to the same value in the case where the operation equation that is set in the operation unit 331*b* is the following equations (9b) to (11b).

$$u_i = \Delta Id_i' \sum_j (\Delta Id_j' - \Delta Id_i') \quad (9b)$$

$$u_i = \Delta Id_i'^2 \sum_j (\Delta Id_i' - \Delta Id_j') \quad (10b)$$

$$u_i = \frac{1}{P \Delta Id_i'^{P-1}} \sum_j (\Delta Id_j' - \Delta Id_i') \quad (11b)$$

Although the case where a fixed value is set in advance as the weight value of each inverter device Ab was described in the first embodiment, the present invention is not limited thereto. A configuration may be adopted in which the weight value of each inverter device Ab is changeable.

Figure 37:
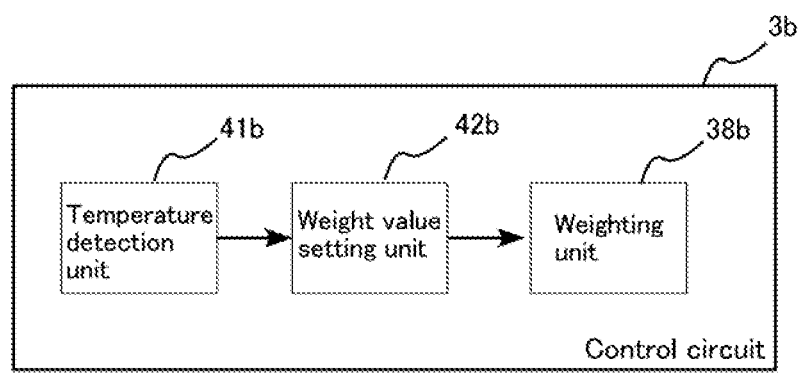
FIG. 37 is for illustrating an inverter device according to a second embodiment of the third aspect.

FIG. 37 is for illustrating an inverter device Ab according to a second embodiment of the third aspect of the instant invention. In FIG. 37, only the control circuit 3*b* is shown, and illustration of portions of the control circuit 3*b* that are in common with the control circuit 3*b* according to the first embodiment (see FIG. 27) is omitted. The inverter device Ab according to the second embodiment differs from the inverter device Ab according to the first embodiment in that the weight value W$_i$ is changed according to the temperature of the inverter circuit 2*b*. As shown in FIG. 37, the control circuit 3*b* of the inverter device Ab according to the second embodiment is further provided with a temperature detection unit 41*b* and a weight value setting unit 42*b*.

Although not illustrated, a temperature sensor is attached to a heat sink of the inverter circuit 2*b*. The temperature detection unit 41*b* detects the temperature that is detected by the temperature sensor, and outputs the detected temperature to the weight value setting unit 42*b*. The weight value setting unit 42*b* sets a weight value W$_i$ that depends on the temperature that is input from the temperature detection unit 41*b* in the weighting unit 38*b*. It is thought that a load is placed on the inverter circuit 2*b* in the case where the temperature of the inverter circuit 2*b* is high, thus making it difficult to further increase the output active power. Accordingly, it is preferable to reduce the adjustment amount. In the present embodiment, the temperature that is input from the temperature detection unit 41*b* is compared with a threshold that is set in advance, and the weight value W$_i$ is changed to a small value in the case where the temperature is larger than the threshold. Note that a configuration may be adopted in which a plurality of thresholds are set and the weight value W$_i$ is changed gradually. Also, a configuration may be adopted in which a calculation equation that calculates the weight value W$_i$ linearly based on the temperature that is input from the temperature detection unit 41*b* is set, and the calculation result of the calculation equation is set.

According to the second embodiment, the weight value W$_i$ is changed to a small value, in the case where the inverter circuit 2*b* of the inverter device Ab is overloaded and the temperature of the inverter circuit 2*b* becomes high. The adjustment amount of output active power of the inverter device Ab is thereby reduced, and the adjustment amount of output active power of the other inverter devices Ab is increased. A situation where the output active power of that inverter device Ab is further increased can thereby be avoided. Similar effects to the first embodiment can also be accomplished in the second embodiment.

Note that in the case where the inverter device Ab participates in the adjustment (suppression) of active power only if the grid frequency rises (i.e., does not participate in the adjustment (increase) of active power if the grid frequency falls), the adjustment amount (suppression amount) may be increased when the detected temperature is high, contrary to the above description. In other words, output active power is reduced by increasing the suppression amount, with the load of that inverter device Ab being reduced, and the other inverter devices Ab incurring that load.

Figures 38A, 38B:
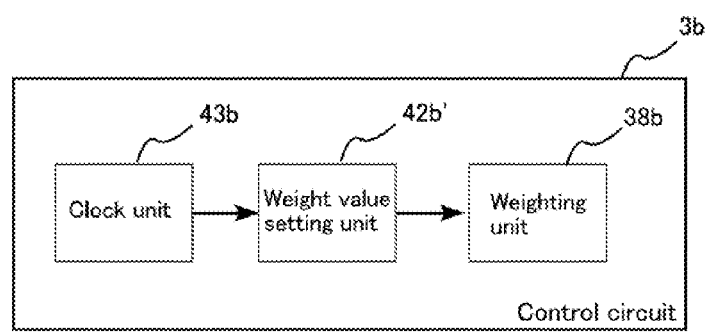
FIGS. 38A and 38B are for illustrating an inverter device according to a third embodiment of the third aspect.

FIGS. 38A and 38B are for illustrating an inverter device Ab according to a third embodiment of the third aspect of the instant invention. In FIG. 38A, only the control circuit 3*b* of the inverter device Ab according to the third embodiment is shown, and illustration of portions of the control circuit 3*b* that are in common with the control circuit 3*b* according to the first embodiment (see FIG. 27) is omitted. The inverter device Ab according to the third embodiment differs from the inverter device Ab according to the first embodiment in that the weight value W$_i$ is changed by date and/or time. As shown in FIG. 33A, the control circuit 3*b* of the inverter device Ab according to the third embodiment is further provided with a clock unit 43*b* and a weight value setting unit 42*b*'.

The clock unit 43*b* outputs the date and time (hereinafter, referred to as "date-time") to the weight value setting unit 42*b*'.

The weight value setting unit 42*b*' sets a weight value W$_i$ that depends on the date-time that is input from the clock unit 43*b* in the weighting unit 38*b*. Because the position of the sun changes with the time of day, the area that is in the shadow of a building or the like changes with the time of day. Also, because the orbit of the sun changes with the time of year (e.g., the sun's orbit differs greatly between the summer and winter solstices), the area that is in the shadow of a building or the like changes also with the time of year. In the case where the solar cell panel connected to the inverter device Ab is in shadow, the amount of electric power that is generated by the solar cell panel is small. In this case, it is desirable to avoid further suppressing the output power of the inverter device Ab, and it is difficult to further increase output power, thus making it desirable to reduce the adjustment amount. In the present embodiment, solar cell panels that are in shadow are searched for in advance, and the weight value W$_i$ of inverter devices Ab to which a solar cell panel that is in shadow is connected is switched to a small value at the date-time at which the solar cell panel is in shadow. Also, the weight value $W_i$ is reduced as the size of the area that is in shadow increases. Specifically, the weight value setting unit 42b' stores a table of weight values $W_i$ shown in FIG. 38B in a memory, and reads out and sets a weight value $W_i$ corresponding to the date-time that is input from the clock unit 43b. Because the solar cell panel is in shadow from 9:00 to 12:00 in January, a smaller value than usual is set for this date-time in FIG. 38B. Note that a configuration may be adopted in which the weight value $W_i$ is only changed by time regardless of the date, or is changed only by date regardless of the time.

According to the third embodiment, the weight value $W_i$ is changed to a small value at the date-time at which the solar cell panel that is connected to the inverter device Ab is in shadow, and the adjustment amount of output active power is reduced. Thereby, when the electric power that is generated as a result of the shadow decreases, the adjustment amount can be reduced. Similar effects to the first embodiment can also be accomplished in the third embodiment.

Figure 39:
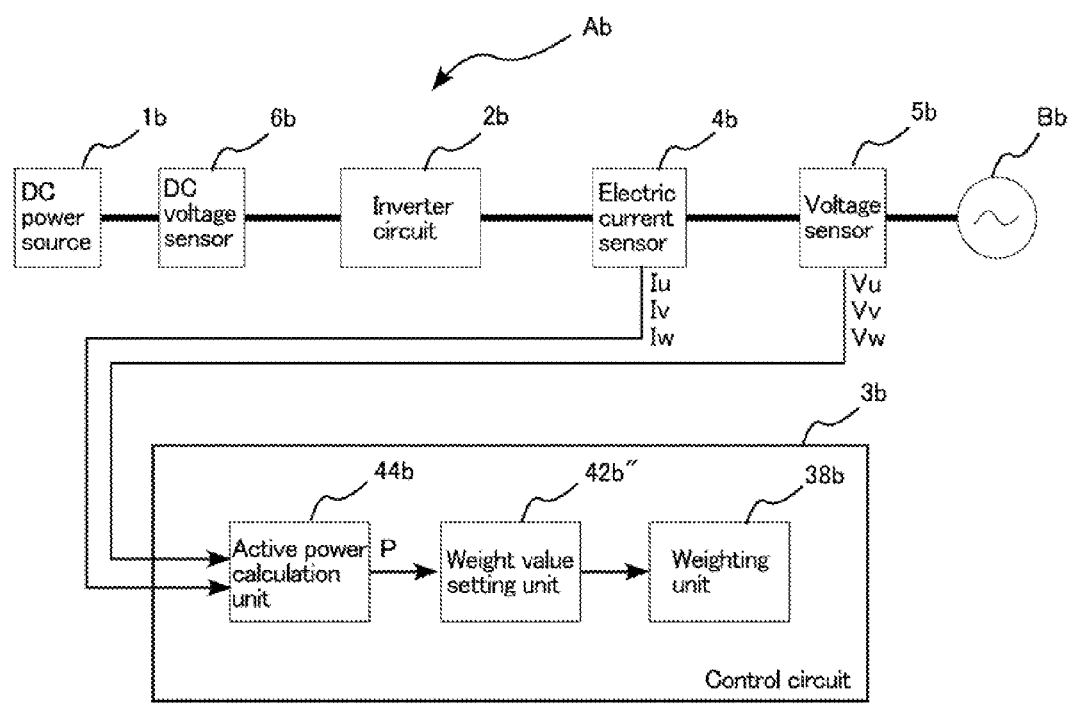
FIG. 39 is for illustrating an inverter device according to a fourth embodiment of the third aspect.

FIG. 39 is for illustrating an inverter device Ab according to a fourth embodiment of the third aspect of the instant invention. In FIG. 39, illustration of portions that are in common with the control circuit 3b according to the first embodiment (see FIG. 27) are omitted. The inverter device Ab according to the fourth embodiment differs from the inverter device Ab according to the first embodiment in that the weight value W is changed according to the output active power of the inverter circuit 2b. As shown in FIG. 39, the control circuit 3b of the inverter device Ab according to the fourth embodiment is further provided with an active power calculation unit 44b and a weight value setting unit 42b".

The active power calculation unit 44b is for calculating an output active power P of the inverter circuit 2b, and calculates the output active power P from the current signals Iu, Iv and Iw that are input from the electric current sensor 4b and from voltage signals Vu, Vv and Vw that are input from the voltage sensor 5b. The active power calculation unit 44b outputs the calculated output active power P to the weight value setting unit 42b".

The weight value setting unit 42b" sets a weight value $W_i$ that depends on the output active power P that is input from the active power calculation unit 44b in the weighting unit 38b. Because the inverter device Ab has little remaining capacity in the case where there is a large amount of output active power P, further increasing output active power is difficult. Accordingly, in the present embodiment, the adjustment amount is reduced. That is, the weight value setting unit 42b" compares the output active power P that is input from the active power calculation unit 44b with a threshold that is set in advance, and changes the weight value $W_i$ to a small value in the case where the output active power P is greater than the threshold. Note that a configuration may be adopted in which a plurality thresholds are set and the weight value $W_i$ is changed gradually. Also, a configuration may be adopted in which the calculation equation for calculating the weight value $W_i$ linearly from the output active power P is set, and the calculation result of the calculation equation is set.

According to the fourth embodiment, the weight value $W_i$ is changed to a small value in the case where the amount of output active power P of the inverter device Ab is large. The adjustment amount of output active power of that inverter device Ab is thereby decreased, and output active power is adjusted. Similar effects to the first, embodiment can also be accomplished in the fourth embodiment.

Note that in the case where the inverter device Ab participates in the adjustment (suppression) of active power only if the grid frequency rises (i.e., does not participate in the adjustment (increase) of active power if the grid frequency falls), the adjustment amount (suppression amount) may be increased when the output active power P is large, contrary to the above description. In other words, the adjustment amount (suppression amount) is increased in the case where the output active power P is large because the inverter device Ab has limited remaining capacity, and the adjustment amount (suppression amount) is reduced in the case where the output active power P is small.

Note that a configuration may be adopted in which the weight value $W_i$ is changed depending on the generation of electricity by the DC power source 1b. Also, in the case where the DC power source 1b is a solar cell, a configuration may be adopted in which the weight value $W_i$ is changed, depending on the amount of wind in the case where the DC power source 1b converts AC power generated by a wind turbine generator or the like into DC power and outputs the DC power depending on the amount of sunlight. Also, in the case where the inverter device Ab is an inverter device for a storage battery, the weight value $W_i$ may be changed depending on the charge amount of the storage battery. For example, in the case where there is sufficient remaining charge, the weight value $W_i$ may be increased. Also, the weight value $W_i$ may be changed according to an electricity power selling price.

Although the case where a control circuit is used in inverter devices that are interconnected to the electric power grid was described in the first to fourth embodiments, the third aspect of the instant invention is not limited to these embodiments. For example, a control circuit may be used as a control circuit of an inverter device that is used in a power plant that generates solar power (e.g., mega solar power plant) or a power plant that generates wind power (wind farm). In these cases, variation in the grid frequency within the mega solar power plant or the wind farm can be suppressed by each inverter device cooperatively adjusting active power.

According to the third aspect of the instant invention, a cooperative correction value generation unit generates a correction value, using an operation result that is based on a weighted correction compensation value and a reception compensation value. As a result of the cooperative correction value generation unit of each inverter device performing this processing, the weighted correction compensation values of all the inverter devices converge to the same value. Accordingly, the correction compensation value of each inverter device will be a value that depends on the respective weight. Because the adjustment amount of output active power of each inverter device is adjusted based on the correction compensation value, the adjustment amount of output active power can be adjusted according on the weighting. Also, each inverter device need only perform mutual communication with at least one inverter device (e.g., an inverter device A that is located nearby or with which communication has been established), and it is not necessary for one inverter device or a monitoring device to communicate with all the other inverter devices. Accordingly, the system does not become large-scale. Even in the case where there is a fault with a certain inverter device, all the other inverter devices need only be able to communicate with one of the inverter devices. Also, increasing or decreasing the number to inverter devices can be flexibly supported.

<Fourth Aspect>

As it described with reference to FIG. 40 in the third aspect abovementioned, heretofore, inverter devices that convert DC power that is generated by a solar cell or the like into AC power and supply the AC power to an electric power grid have been developed.

Figure 42:
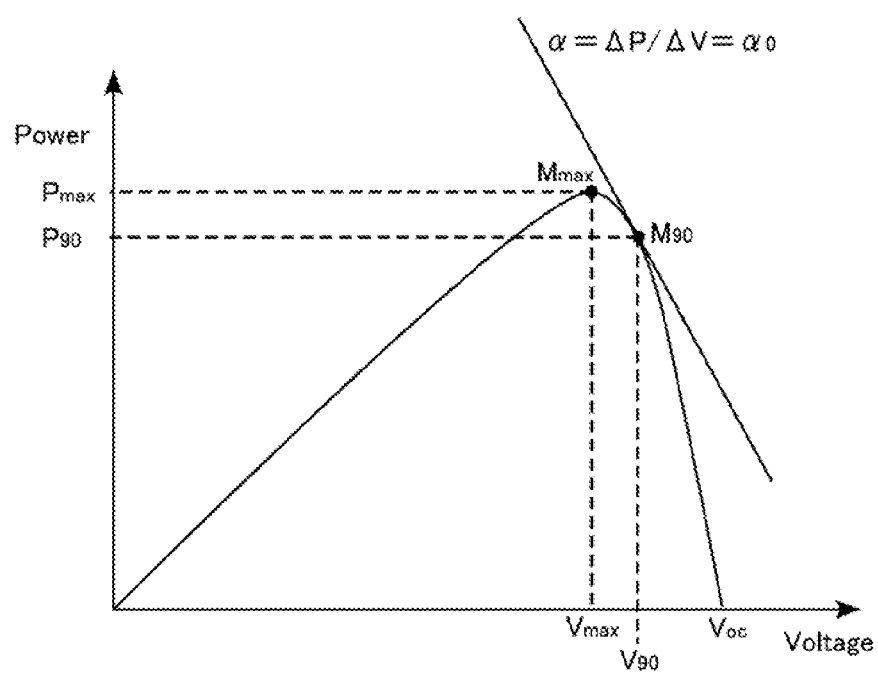
FIG. 42 is for illustrating the voltage-power characteristics of a solar cell and non-maximum power point tracking control.

Generally, inverter devices for use in solar power generation perform maximum power point tracking (MPPT) control, in order to increase the output power of the solar cell as much as possible. Maximum power point tracking control involves detecting the output voltage, for example, of the solar cell and searching for a maximum power point at which the output power is maximized. The voltage-power characteristics of a solar cell are as shown by the curve of FIG. 42. That is, the relationship between power and voltage is characterized in that the maximum power $P_{max}$ is achieved at a predetermined voltage $V_{max}$, and power decreases with increasing separation from that voltage. The so-called hill-climbing method, which utilizing this characteristic, is used in maximum power point tracking control. That is, if the output power increases when the output voltage of the solar cell is increased, the output voltage is continuously increased, and if the output power decreases, the output voltage is reduced, having passed a maximum power point (see point $M_{max}$ in FIG. 42). Also, if the output power increases when the output voltage of the solar cell is reduced, the output voltage is continuously reduced, and if the output power decreases, the output voltage is increased, having passed the maximum power point. By repeating this processing, an operating point is positioned near the maximum power point, and the output power is maintained in the maximum state as long as possible.

In the case where maximum power point tracking control is performed, the output power of the solar cell is close to the maximum. Accordingly, in this state, more power cannot be output from the solar cell. Therefore, an inverter device for use in solar power generation is able to perform adjustment so as to suppress output active power in response to a rise in grid frequency, but is not able to perform adjustment so as to increase output active power in response to a fall in grid frequency. More specifically, in the case where the grid frequency has fallen, conceivable ways of suppressing this are to reduce the amount of consumption of inverter devices for loads or to increase the amount of discharge of inverter devices for storage battery systems. However, in the case where the fall in grid frequency cannot be adequately suppressed even with such techniques, the output active power of inverter devices for solar power generation will need to be increased, although this is not possible in the case where conventional maximum power point tracking control is performed.

In contrast, according to a fourth aspect of the instant invention, a power conversion device for solar power generation that is able to contribute to a cooperative operation for suppressing variation in the grid frequency, even in the case where the grid frequency falls, is provided, as will be described below.

Hereinafter, various embodiments of the fourth aspect of the instant invention will be specifically described with reference to the drawings, taking the case where control circuits are used in inverter devices that are interconnected to an electric power grid as an example.

Figure 41:
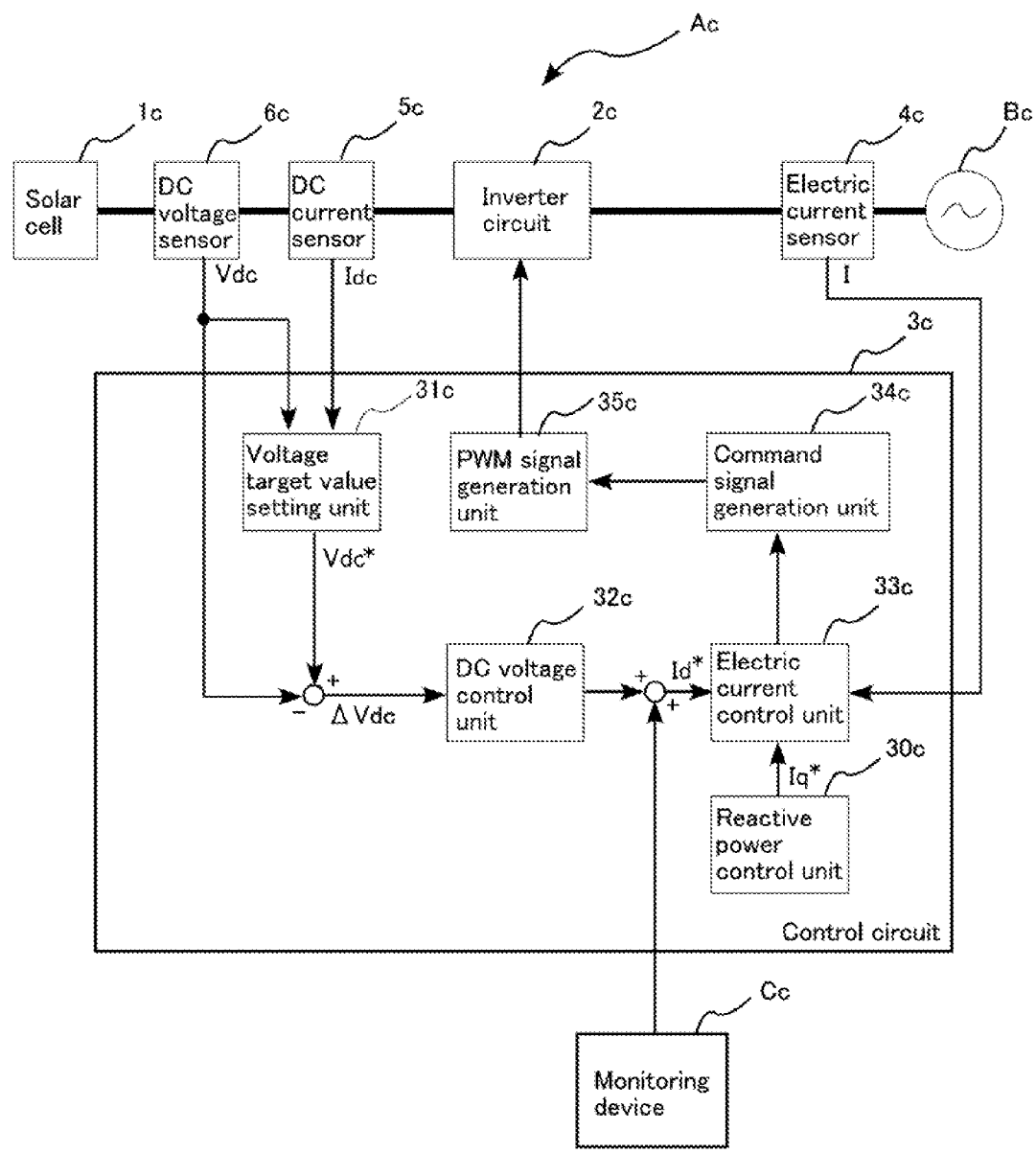
FIG. 41 is for illustrating an inverter device according to a first embodiment of the fourth aspect of the instant invention.

FIG. 41 is for illustrating an inverter device according to a first embodiment of the fourth aspect of the instant invention.

An inverter device Ac is a so-called power conditioner. The inverter device Ac is provided with an inverter circuit 2c, a control circuit 3c, an electric current sensor 4c, a DC current sensor 5c, and a DC voltage sensor 6c, as shown in FIG. 41, and is interconnected to an electric power grid Bc. The electric power grid Bc to which the inverter device Ac is interconnected also has other inverter devices and inverter devices for storage battery systems and power adjustable loads interconnected thereto that constitute an electric power system, and a monitoring device Cc performs centralized monitoring of each inverter device. The inverter device Ac converts DC power that is output by a solar cell 1c into AC power using the inverter circuit 2c, and outputs the AC power to the electric power grid Bc. Note that, although not illustrated, a transformer for increasing (or decreasing) the AC voltage is provided on the output side of the inverter circuit 2c.

The solar cell 1c generates DC power by converting solar energy into electric energy. The solar cell 1c outputs the generated DC power to the inverter circuit 2c.

The inverter circuit 2c converts the DC power that is input from the solar cell 1c into AC power, and outputs the AC power. The inverter circuit 2c is provided with a PWM control inverter and a filter that are not illustrated. The PWM control inverter is a three-phase inverter provided with three sets of six switching elements in total that are not illustrated, and converts DC power into AC power by switching the ON and OFF of each switching element based on the PWM signal that is input from the control circuit 3c. The filter removes the high frequency component caused by the switching. Note that the inverter circuit 2c is not limited thereto. For example, the PWM control inverter may be a single-phase inverter, or may be a multilevel inverter. Also, another method other than PWM control may be used, such as phase shift control.

The electric current sensor 4c detects the instantaneous value of each of the three-phase output currents of the inverter circuit 2c. The electric current sensor 4c digitally converts the detected instantaneous values, and outputs the resultant values to the control circuit 3c as the current signals Iu, Iv and Iw (hereinafter, the three current signals may be collectively referred to as "current signals I"). The DC electric current sensor 5c detects the input current of the inverter circuit 2c (i.e., the output current of the solar cell 1c). The DC electric current sensor 5c digitally converts the detected current, and outputs the conversion result to the control circuit 3c as a current signal Idc. The DC voltage sensor 6c detects the input voltage of the inverter circuit 2c (i.e., the output voltage of the solar cell 1c). The DC voltage sensor 6c digitally converts the detected voltage, and outputs the resultant voltage to the control circuit 3c as a voltage signal Vdc.

The control circuit 3c controls the inverter circuit 2c, and is realized by a microcomputer or the like, for example. The control circuit 3c according to the present embodiment controls the output voltage, the output reactive power and the output current of the solar cell 1c.

The control circuit 3c generates a PWM signal based on the current signals I that are input from the electric current sensor 4c, the current signal Idc that is input from the DC current sensor 5c, and the voltage signal Vdc that is input from the DC voltage sensor 6c, and outputs the PWM signal to the inverter circuit 2c. The control circuit 3c is provided with a reactive power control, unit 30c, a voltage target value setting unit 31c, a DC voltage control unit 32c, an electric current control unit 33c, a command signal generation unit 34c, and a PWM signal generation unit 35c.

The reactive power control unit 30c is for controlling the output reactive power of the inverter circuit 2c. Although not illustrated, the reactive power control unit 30c calculates the output reactive power of the inverter circuit 2c from the instantaneous value of the current detected by the electric current sensor 4c and the instantaneous value of the voltage detected by a voltage sensor, performs PI control (proportional-integral control) on the deviation with the target value, and outputs a reactive power compensation value. The reactive power compensation value is input to the electric current control unit 33c as the target value Iq*. Note that the reactive power control unit 30c is not limited to performing PI control, and may be configured to perform other control such as I control (integral control).

The voltage target value setting unit 31c sets a voltage target value Vdc* that is a target value of the voltage signal Vdc. The voltage target value setting unit 31c changes the voltage target value Vdc*, detects the output power of the solar cell 1c, and adjusts the voltage target value Vdc* such that the output power is about 90 percent of the maximum power. The control method of the present embodiment differs from typical maximum power point tracking control according to which the output power of the solar cell 1c is controlled to be at the maximum power in that the output power is controlled to be about 90 percent of the maximum power. Hereinafter, this control will be referred to as "non-maximum power point tracking control".

The voltage-electric power characteristics of the solar cell 1c are as shown by the curve of FIG. 42. That is, the relationship between power and voltage is characterized in that the maximum power $P_{max}$ is achieved at a predetermined voltage $V_{max}$, and power decreases with increasing separation from the voltage at that time. In maximum power point tracking control, this characteristic is utilized to position the operating point near a maximum power point $M_{max}$ using the so-called hill-climbing method, and output power is maintained in the maximum state as long as possible. On the other hand, in non-maximum power point tracking control according to the present embodiment, the output power is maintained in a state of about 90 percent of the maximum power $P_{max}$ by positioning the operating point near a non-maximum power point $M_{90}$ at which the output power will be $P_{90}$ which is about 90 percent of the maximum power $P_{max}$.

As shown in FIG. 42, a slope a of the tangent of the curve of the voltage-electric power characteristics is "0" at a voltage $V_{max}$. And it inclines as voltage becomes high, and the slope α decreases with increasing voltage, and at a minimum at an open voltage $V_\infty$. In non-maximum power point tracking control, this characteristic is utilized to approximate the slope α to a slope $α_0$ of the tangent at the non-maximum power point $M_{90}$. The slope α is a ratio of the amount of change ΔP in output power to the amount of change ΔV in output voltage, that is, a rate of change (α=ΔP/ΔV). That is, the output voltage is reduced if the rate of change α is smaller than $α_0$ when the output voltage is changed, and output voltage is increased if the rate of change α is greater than or equal to $α_0$. By repeating this processing, the operating point is positioned near the non-maximum power point $M_{90}$.

The output voltage of the solar cell 1c before the conversion operation of the inverter circuit 2c is started is the open voltage $V_\infty$. The output voltage of the solar cell 1c is reduced from the open voltage $V_\infty$ when the conversion operation of the inverter circuit 2c is started, and control is performed such that the operating point is positioned near the non-maximum power point $M_{90}$. Accordingly, in the present embodiment, it is not envisioned that the output voltage of the solar cell 1c will fall to below the voltage $V_{max}$ (the rate of change α will be greater than "0"). However, even in the case where the output voltage of the solar cell 1c falls below the voltage $V_{max}$, the output voltage will return an area above the voltage $V_{max}$, because the output voltage is increased while the rate of change α is at or above $α_0$.

In FIG. 42, although the rate of change αc at the non-maximum power point $M_{90}$ is about "−2", the voltage-electric power characteristics curve differs depending on factors such as the amount of solar radiation, the panel temperature (temperature of the solar cell panel of the solar cell 1c), and the type of solar cell 1c, and thus the curve is set as appropriate based on this information. Because the type of solar cell 1c does not change, the rate of change $α_0$ need only be set in consideration of the type of solar cell 1c at the time of design. The amount of solar radiation, the panel temperature or the like need only be detected and the rate of change $α_0$ changed according to the detected values. Note that because the rate of change $α_0$ does not change much even when an amount of solar radiation changes, a configuration may be adopted in which the rate of change $α_0$ is changed according to the detected value of the panel temperature, without consideration for the amount of solar radiation. Also, the output power of the solar cell 1c does not need to be fixed at 90 percent of the maximum power $P_{max}$, and may be changed to about 80 to 90 percent, for example. Accordingly, if there is little change in the shape of the voltage-electric power characteristics curve even when an amount of solar radiation or the panel temperature changes, resulting in little change in the ratio of output power at a certain voltage to maximum power $P_{max}$, the rate of change $α_0$ may be set as a fixed value.

Figure 43:
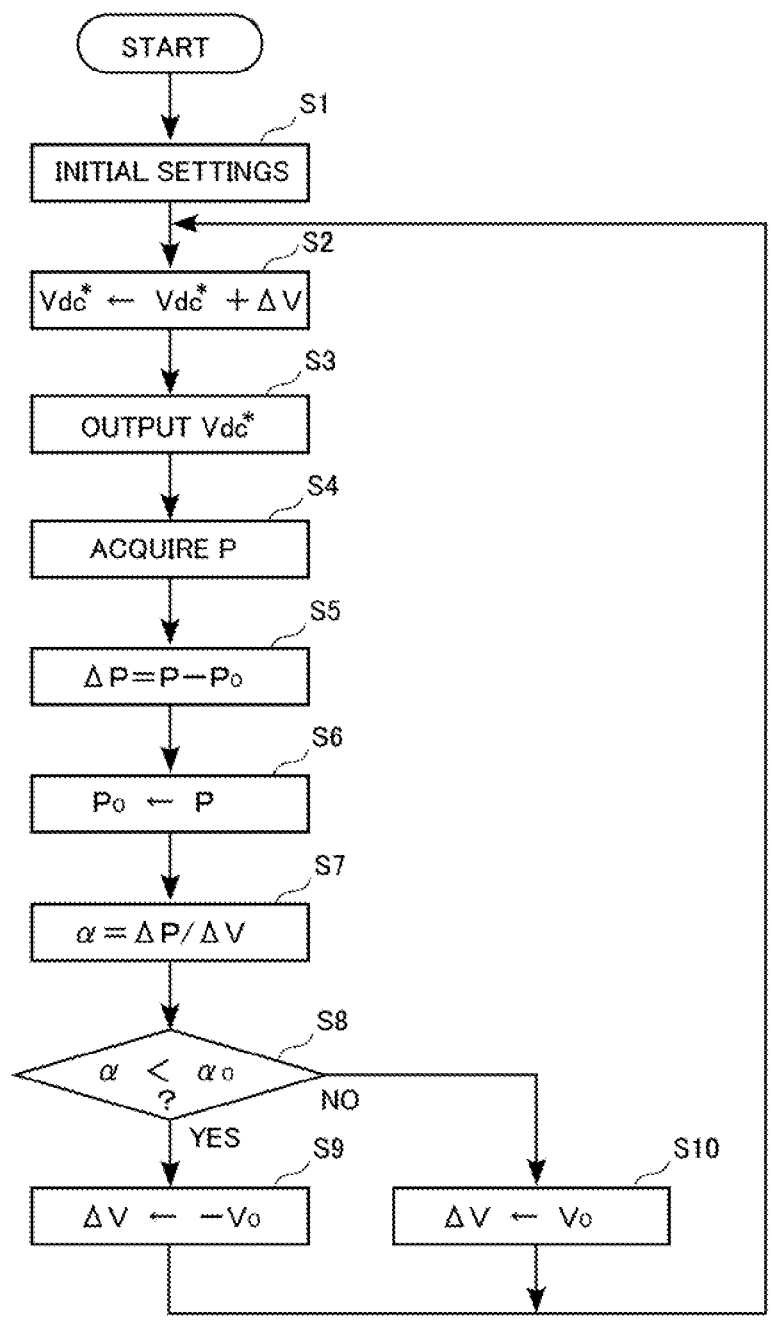
FIG. 43 is a flowchart for illustrating non-maximum power point tracking control processing that is performed by a voltage target value setting unit.

FIG. 43 is a flowchart for illustrating non-maximum power point tracking control processing that is performed by the voltage target value setting unit 31c. Execution of this processing is started when the inverter circuit 2c starts power conversion.

First, the open voltage $V_4$ is set as an initial value in voltage target value Vdc*, and "−$V_0$" is set in amount of change ΔV of the output voltage. Note that because the search from the non-maximum power point $M_{90}$ will take too long when the variance range $V_0$ is too small, and accuracy and stability deteriorate when the variance range $V_0$ is too large, a suitable value needs to be set as appropriate. Also, the output power $P_0$ calculated last time is set to "0" (S1). Note that the setting are not limited thereto. Next, the amount of change ΔV is added to the voltage target value Vdc* (S2), the resultant value is output (S3), and the output voltage of the solar cell 1c is controlled to the voltage target value Vdc*.

The output power P of the solar cell 1c is then acquired (S4). The output power P is calculated from the current signals Idc that is input from the DC electric current sensor 5c and the voltage signal Vdc that is input from the DC voltage sensor 6c. Next, the amount of change ΔP, which is the difference between the output power P and the output power Pr calculated last time, is calculated (S5), and the output power P is set to the output power P calculated last time (S6). Next, the rate of change α (=ΔP/ΔV) is calculated from the amount of change ΔP of output power and the amount of change ΔV of output voltage (S7).

It is then discriminated whether the rate of change α is smaller than a predetermined rate of change $α_0$(S8). If the rate of change α is smaller than the predetermined rate of change $α_0$ (S8: YES), the amount of change ΔV is set to "−$V_0$" in order to reduce the output voltage of the solar cell 1c (S9). On the other hand, if the rate of change α is greater than or equal to the predetermined rate of change $α_0$ (S8:

NO), the amount of change ΔV is set to "$V_0$" in order to increase the output voltage of the solar cell 1c (S10). Thereafter, the processing returns to step S2, and steps S2 to S10 are repeated. Note that non-maximum power point tracking control processing that is performed by the voltage target value setting unit 31c is not limited to the abovementioned processing.

The DC voltage control unit 32c is for controlling the output voltage of the solar cell 1c. The DC voltage control unit 32c controls the output active power of the inverter circuit 2c by controlling the output power of the solar cell 1c through controlling the output voltage of the solar cell 1c. The DC voltage control unit 32c receives input of a deviation ΔVdc (=Vdc*−Vdc) of the voltage signal Vdc which is output from the DC voltage sensor 6c from the voltage target value Vdc* which is output from the voltage target value setting unit 31c, performs PI control, and outputs an active power compensation value. Note that the DC voltage control unit 32c is not limited to performing PI control, and may be configured to perform other control such as I control.

The electric current control unit 33c is for controlling the output current of the inverter circuit 2c. The electric current control unit 33c generates an electric current compensation value based on the current signals I that are input from the electric current sensor 4c, and outputs the generated electric current compensation value to the command signal generation unit 34c. The electric current control unit 33c receives input of a value obtained by adding an adjustment value that is input to the inverter device Ac from the monitoring device Cc to the active power compensation value that is output from the DC voltage control unit 32c, and input of the reactive power compensation value that is output from the reactive power control unit 30c.

Figure 44:
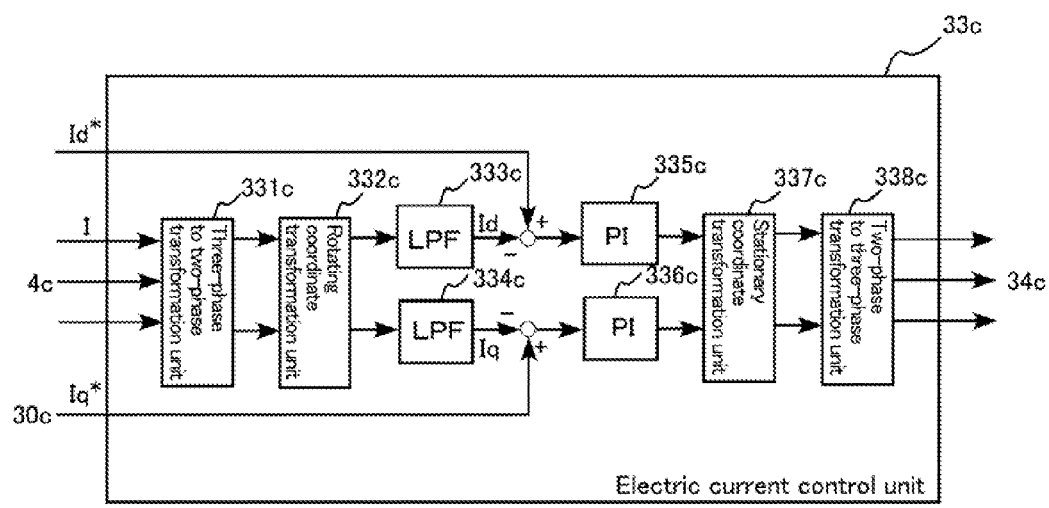
FIG. 44 is a functional block diagram for illustrating an internal configuration of an electric current control unit.

FIG. 44 is a functional block diagram for illustrating the internal configuration of the electric current control unit 33c.

The electric current control unit 33c is provided with a three-phase to two-phase transformation unit 331c, a rotating coordinate transformation unit 332c, a LPF 333c, a LPF 334c, a PI control, unit 335c, a PI control unit 336c, a stationary coordinate transformation unit 337c, and a two-phase to three-phase transformation unit 338c.

The three-phase to two-phase transformation unit 331c performs so-called three-phase to two-phase transformation (αβ transformation). Three-phase to two-phase transformation is processing for transforming three-phase AC signals into equivalent two-phase AC signals, and involves transforming three-phase AC signals into an AC signal of the α-axis component and an AC signal of the β-axis component, by breaking down each of the three-phase AC signals into orthogonal α-axis and β-axis components in a stationary orthogonal coordinate system (hereinafter "stationary coordinate system"), and adding together the components of each axis. The three-phase to two-phase transformation unit 331c transforms the three-phase current signals Iu, Iv and Iw input from the electric current sensor 4c into an α-axis current signal Iα and a β-axis current signal Iβ, and outputs these signals to the rotating coordinate transformation unit 332c.

The transformation processing that is performed by the three-phase to two-phase transformation unit 331c is represented by the following equation (1c).

$$\begin{bmatrix} I\alpha \\ I\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Iu \\ Iv \\ Iw \end{bmatrix} \qquad (1c)$$

The rotating coordinate transformation unit 332c performs so-called rotating coordinate transformation (dq transformation). Rotating coordinate transformation is processing for transforming two-phase signals of a stationary coordinate system into two-phase signals of a rotating coordinate system. A rotating coordinate system is an orthogonal coordinate system that has orthogonal d and q axes, and rotates in the same rotation direction and at the same angular velocity as the fundamental wave of the interconnection point voltage. The rotating coordinate transformation unit 332c transforms the α-axis current signal Iα and the β-axis current signal Iβ of the stationary coordinate system that are input from the three-phase to two-phase transformation unit 331c, based on a phase θ of the fundamental wave of the interconnection point voltage into a d-axis current signal Id and a q-axis current signal Iq of the rotating coordinate system, and outputs these signal.

The transformation processing that is performed by the rotating coordinate transformation unit 332c is represented by the following equation (2c).

$$\begin{bmatrix} Id \\ Iq \end{bmatrix} = \begin{bmatrix} \cos\theta & \sin\theta \\ -\sin\theta & \cos\theta \end{bmatrix} \begin{bmatrix} I\alpha \\ I\beta \end{bmatrix} \qquad (2c)$$

The LPF 333c and the LPF 334c are low pass filters, and respectively pass only the DC component of the d-axis current signal Id and q-axis current signal Iq. As a result of the rotating coordinate transformation, the fundamental wave components of the α-axis current signal Iα and the β-axis current signal Iβ are respectively transformed into the DC components of the d-axis current signal Id and the q-axis current signal Iq. In other words, the LPF 333c and the LPF 334c remove unbalanced components and harmonic components, and pass only fundamental wave components.

The PI control unit 335c performs PI control based on the deviation of the DC component of the d-axis current signal Id from a target value, and outputs an electric current compensation value Xd. The adjustment value that is input from monitoring device Cc is added to the active power compensation value that is output from the DC voltage control unit 32c, and the resultant value is used as a target value Id*, of the d-axis current signal Id. The PI control unit 336c performs PI control based on the deviation of the DC component of the q-axis current signal Iq from a target value Iq*, and outputs an electric current compensation value Xq. The reactive power compensation value that is output from the reactive power control unit 30c is used as the target value Iq* of the q-axis current signal Iq.

The stationary coordinate transformation unit 337c transforms the electric current compensation values Xd and Xq that are respectively input from the PI control unit 335c and the PI control unit 336c into electric current compensation values Xα and Xβ of the stationary coordinate system, and performs processing that is the reverse of the transformation processing performed by the rotating coordinate transformation unit 332c. The stationary coordinate transformation unit 337c performs so-called stationary coordinate transformation processing (inverse dq transformation), which involves transforming the electric current compensation values Xd and Xq of the rotating coordinate system into electric current compensation values Xα and Xβ of the stationary coordinate system, based on the phase θ.

The transformation processing that is performed by the stationary coordinate transformation unit 337c is represented by the following equation (3c).

$$\begin{bmatrix} X\alpha \\ X\beta \end{bmatrix} = \begin{bmatrix} \cos\theta & -\sin\theta \\ \sin\theta & \cos\theta \end{bmatrix} \begin{bmatrix} Xd \\ Xq \end{bmatrix} \quad (3c)$$

The two-phase to three-phase transformation unit 338c transforms the electric current compensation values Xα and Xβ that are input from the stationary coordinate transformation unit 337c into three-phase electric current compensation values Xu, Xv and Xw. The two-phase to three-phase transformation unit 338c performs so-called two-phase to three-phase transformation (inverse αβ transformation), which involves performing processing that is the reverse of the transformation processing performed by the three-phase to two-phase transformation unit 331c.

The transformation processing that is performed by the two-phase to three-phase transformation unit 338c is represented by the following equation (4c).

$$\begin{bmatrix} Xu \\ Xv \\ Xw \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} X\alpha \\ X\beta \end{bmatrix} \quad (4c)$$

Note that the inverter device Ac was described as being a three-phase system in the present embodiment, but may be a single-phase system. In the case of a single-phase system, the electric current control unit 33c need only control a single-phase current signal obtained by detecting the output current of the inverter circuit 2c.

The command signal generation unit 34c generates a command signal based on the electric current compensation values Xu, Xv and Xw that are input from the electric current control unit 33c, and outputs the generated command signal to the PWM signal generation unit 35c.

The PWM signal generation unit 35c generates a PWM signal. The PWM signal generation unit 35c generates the PWM signal using the triangular wave comparison method, based on a carrier signal and the command signal that is input from the command signal generation unit 34c. For example, a pulse signal whose level is high in the case where the command signal is larger than the carrier signal and whose level is low in the case where the command signal is smaller than or equal to the carrier signal is generated as the PWM signal. The generated PWM signal is output to the inverter circuit 2c. Note that the PWM signal generation unit 35c is not limited to generating the PWM signal with the triangular wave comparison method, and may generate the PWM signal with a hysteresis method, for example.

In the present embodiment, the control circuit 3c was described as being realized as a digital circuit, but may be realized as an analog circuit. Also, the processing that is performed by each constituent element is designed with a program, and a computer may be caused to function as the control circuit 3c by executing the program. Also, a configuration may be adopted in which the program is recorded on a recording medium and read by a computer.

Next, operation and effect of the present embodiment will be described.

According to the present embodiment, the voltage target value setting unit 31c changes the voltage target value Vdc*, detects the output power P of the solar cell 1c, and calculates the rate of change α (=ΔP/ΔV) which is amount of change ΔP of output power to the amount of change ΔV of output voltage. The rate of change α then approaches the predetermined rate of change $\alpha_0$ (the rate of change when the output power P is $P_{90}$ which is about 90 percent of the maximum power $P_{max}$, and the slope of the tangent at the non-maximum power point $M_{90}$ in FIG. 42). Accordingly, the output power P of the solar cell 1c is controlled to be $P_{90}$ which is about 90 percent of the maximum power $P_{max}$.

In the case where the grid frequency falls, the monitoring device Cc increases the adjustment value that is input to the control circuit 3c, in order to increase the output active power of the inverter device Ac. The increased adjustment value is added to the active power compensation value that is output from the DC voltage control unit 32c, and the target value Id* of the d-axis current signal Id is increased. The output current of the inverter circuit 2c is thereby increased, and output active power increases. This increase is provided for by an increase in the DC power that is output by the solar cell 1c.

Because the output power P of the solar cell 1c is kept to about 90 percent of the maximum power $P_{max}$, output can be increased. The inverter device Ac is thereby able to increase the active power that is output, and can thus participate in cooperative operation for suppressing variation in the grid frequency, even in the case where the grid frequency falls.

Note that although the case where the output voltage of the solar cell 1c is controlled was described in the present embodiment, the present invention is not limited thereto. A configuration may be adopted in which the output current of the solar cell 1c is controlled. That is, the input current of the inverter circuit 2c (i.e., the output current of the solar cell 1c) that is detected by the DC electric current sensor 5c is controlled, and a search for the non-maximum power point is carried out by changing the current target value.

Note that the inverter device Ac was described as being a three-phase system in the present embodiment, but may be a single-phase system. In this case, the electric current control unit 33c need only use a value obtained by adding the adjustment value that is input to the inverter device Ac from the monitoring device Cc to the active power compensation value that is output from the DC voltage control unit 32c, as a target value of the single-phase current signal that is input from the electric current sensor 4c. Also, a configuration may be adopted in which a single-phase current signal is transformed into two orthogonal current signals with the Hilbert transform or the like, and the two current signals are used as an α-axis current signal iα and a β-axis current signal iβ.

Although the case where the output power of the solar cell 1c is controlled to be about 90 percent of the maximum power $P_{max}$ was described in the present embodiment, the present invention is not limited thereto. For example, the output power of the solar cell 1c may be controlled to be about 80 percent. The increase in active power at the time of a fall in grid frequency will be restricted when the ratio of output power to maximum power $P_{max}$ is too high. Conversely, the capacity to generate power will be overly suppressed when this ratio is too low. Accordingly, a rate of 80 to 90 percent is appropriate.

Although the case where non-maximum power point tracking control is performed by the voltage target value setting unit 31c comparing the rate of change a with a predetermined rate of change ac was described in the present embodiment, the present invention is not limited thereto. The voltage target value setting unit 31c may perform non-maximum power point tracking control with other methods.

Figure 45:
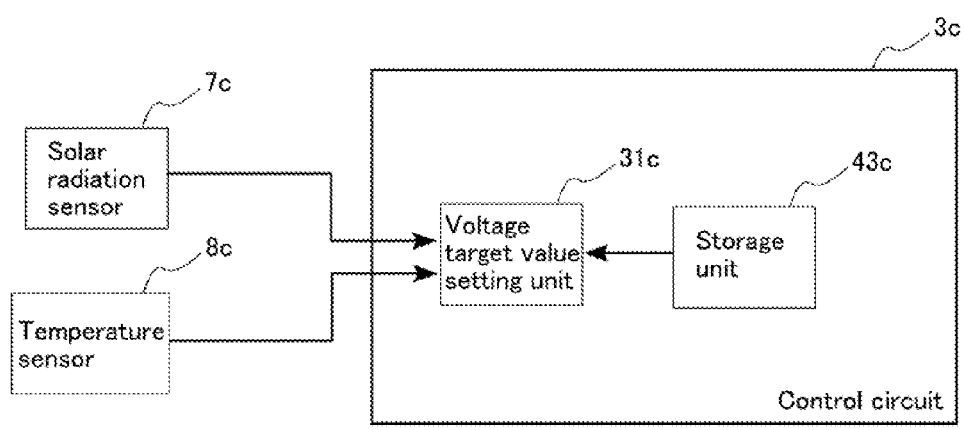
FIG. 45 is for illustrating a modification of the inverter device according to the first embodiment of the fourth aspect.

FIG. 45 is for illustrating a modification of the inverter device according to the first embodiment. In FIG. 45, only the differences with the inverter device Ac according to the first embodiment (see FIG. 41) are shown, and illustration of common portions is omitted. The voltage target value setting unit 31c according to the present embodiment estimates the maximum power $P_{max}$ of the output power P of the solar cell 1c, calculates power $P_{90}$ at 90 percent thereof, and changes the voltage target value Vdc* such that the output power P of the solar cell 1c approaches $P_{90}$.

A solar radiation sensor 7c detects the amount of solar radiation on the solar cell panel of the solar cell 1c. The amount of solar radiation detected by the solar radiation sensor 7c is output to the voltage target value setting unit 31c. A temperature sensor 8c detects the panel temperature. The panel temperature detected by the temperature sensor 8c is output to the voltage target value setting unit 31c.

A storage unit 43c stores the maximum power $P_{max}$ that is generated by the solar cell 1c in association with the amount of solar radiation and the panel temperature. The maximum generated power of the solar cell panel differs depending on the amount of solar radiation on the solar cell panel and the panel temperature, and the maximum generated power for each change in the amount of solar radiation and the panel temperature can be acquired in advance. The maximum power $P_{max}$ that is generated by the solar cell 1c is calculated from each maximum generated power of each solar cell panel of the solar cell 1c, and is stored in the storage unit 43c in association with the amount of solar radiation and the panel temperature.

The voltage target value setting unit 31c reads out the corresponding maximum power $P_{max}$ from the storage unit 43c, based on the amount of solar radiation that is input from the solar radiation sensor 7c and the panel temperature that is input from the temperature sensor 8c. The voltage target value setting unit 31c changes the voltage target value Vdc* such that the output power P of the solar cell 1c approaches 90 percent of the power $P_{90}$ of the maximum power $P_{max}$.

Figure 46:
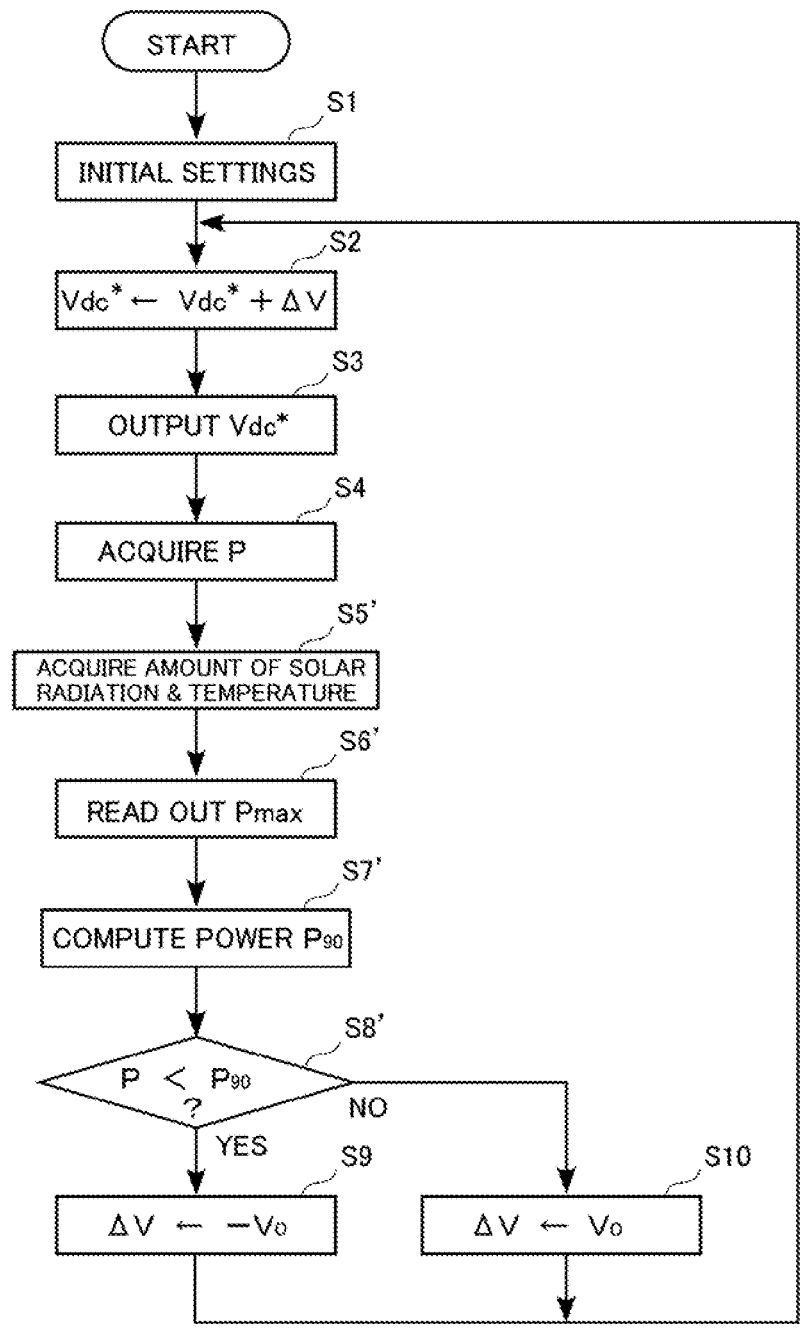
FIG. 46 is a flowchart for illustrating non-maximum power point tracking control processing according to the modification.

FIG. 46 is a flowchart for illustrating non-maximum power point tracking control processing that is performed by the voltage target value setting unit 31c according to the present embodiment. Execution of this processing is started when the inverter circuit 2c starts power conversion.

Because steps S1 to S4 are in common with the non-maximum power point tracking control (see flowchart of FIG. 43) according to the first embodiment, description thereof is omitted.

The amount of solar radiation that is input from the solar radiation sensor 7c and the panel temperature that is input from the temperature sensor 8c are acquired following steps S1 to S4 (S5'). Next, the corresponding maximum power $P_{max}$ is read out from the storage unit 43c, based on the amount of solar radiation and the panel temperature that were acquired (S6'), and power $P_{90}$ at 90 percent of the maximum power $P_{max}$ ($=P_{max}*0.9$) is calculated (S7').

It is then discriminated whether the output power P of the solar cell 1c is less than $P_{90}$ (S8'). In the case where the output power P less than $P_{90}$ (S8': YES), the output voltage of the solar cell 1c is higher than voltage $V_{90}$ when at the non-maximum power point $M_{90}$ (see FIG. 42), and thus the amount of change ΔV is set to "$-V_0$", in order to reduce the output voltage of the solar cell 1c (S9). On the other hand, in the case where the output power P is greater than $P_{90}$ (S8': NO), the output voltage of the solar cell 1c is lower than the voltage $V_{90}$ when at the non-maximum power point $M_{90}$, and thus the amount of change ΔV is set to "$V_0$" in order to increase the output voltage of the solar cell 1c (S10). Note that control is performed such that the output voltage of the solar cell 1c is reduced from the open voltage $V_4$, and the operating point is positioned near the non-maximum power point $M_{90}$. Accordingly, in the present embodiment, it is not envisioned that the output voltage of the solar cell 1c will fall to below the voltage $V_{max}$. Thereafter, the processing returns to step S2 and steps S2 to S10 are repeated. Note that because the amount of solar radiation and the panel temperature does not change rapidly, a configuration may be adopted in which steps S5' to S7' are only performed every predetermined time period (e.g., every 1 min.). Also, the non-maximum power point tracking control processing that is performed by the voltage target value setting unit 31c according to the present embodiment is not limited to the abovementioned processing.

In the case where the voltage $V_{90}$ for setting to the power $P_{90}$ corresponding to the amount of solar radiation and the panel temperature can be acquired in advance from the characteristics of the solar cell 1c, the voltage $V_{90}$ is stored in the storage unit 43c in association with the amount of solar radiation and the panel temperature, the voltage target value setting unit 31c reads out the corresponding voltage $V_{90}$ from the storage unit 43c, based on the amount of solar radiation and the panel temperature that were acquired, and set as the voltage target value Vdc*.

Although the case where the maximum power $P_{max}$ of the solar cell 1c is estimated from the amount of solar radiation and the panel temperature was described in the above embodiment, the maximum power $P_{max}$ may be estimated with other methods. For example, because the amount of solar radiation and the panel temperature change depending on the time of day or the weather, the amount of solar radiation and the panel temperature can be estimated from time of day and the weather. Accordingly, the maximum power $P_{max}$ can also be estimated from time of day and the weather. The maximum power $P_{max}$ of the solar cell 1c may be stored in the storage unit 43c in association with the time of day and the weather, and the corresponding maximum power $P_{max}$ may be used according to the time of day and the weather that are detected. Also, prediction values obtained by power generation prediction using satellite information or the like, which is an area currently being studied at many research institutions, may be used.

If the voltage $V_{90}$ for setting to the power $P_{90}$ corresponding to the time of day and the weather can also be acquired in advance from the characteristics of the solar cell 1c in this case, the voltage $V_{90}$ is stored in the storage unit 43c in association with the time of day and the weather, and the voltage target value setting unit 31c reads out the corresponding voltage $V_{90}$ from the storage unit 43c, based on the time of day and the weather that were acquired, and set as the voltage target value Vdc*.

Although the case where the monitoring device Cc performs centralized monitoring of each inverter device Ac and outputs an adjustment value for suppressing variation in the grid frequency to each inverter device Ac was described in the first embodiment, the present invention is not limited thereto. One inverter device Ac (master) having the function of the monitoring device Cc may output adjustment values to the other inverter devices Ac (slaves).

Also, as in the abovementioned embodiments of the third aspect, each inverter device Ac may communicate with other inverter devices Ac and perform cooperative operation. This case will be described below as a second embodiment of the fourth aspect of the instant invention.

Figure 47:
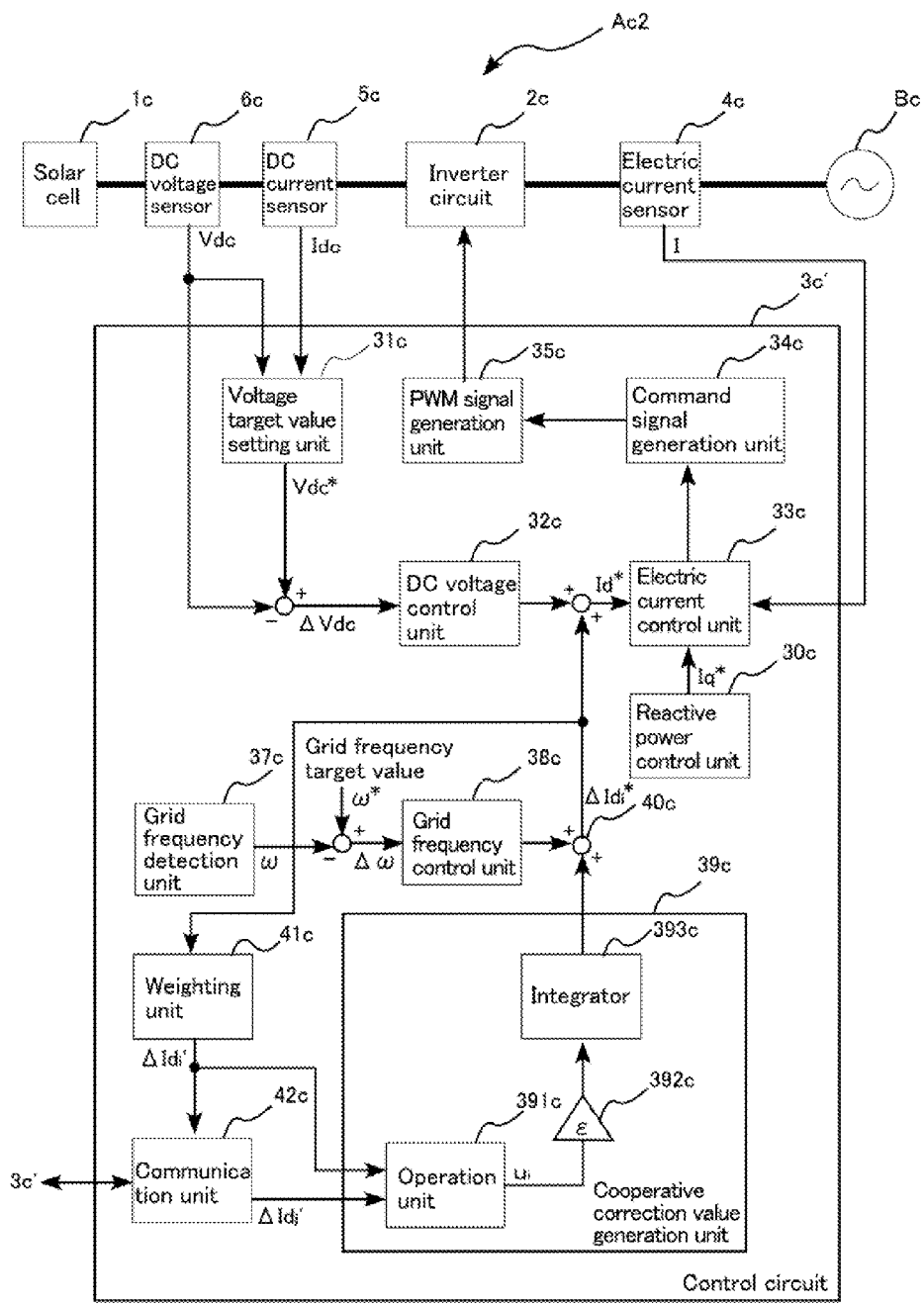
FIG. 47 is for illustrating an inverter device according to a second embodiment of the fourth aspect.

FIG. 47 is for illustrating an inverter device Ac2 according to the second embodiment. In the diagram, the same reference signs are given to elements that are the same as or similar to the inverter device Ac according to the first embodiment (see FIG. 41).

The inverter device Ac2 according to the second embodiment differs from the inverter device Ac according to the first embodiment in that communication is carried out with other inverter devices Ac2 and an adjustment value is calculated in the control circuit $3c'$, instead of receiving input of an adjustment value from the monitoring device Cc. As shown in FIG. 47, the control circuit $3c'$ of the inverter device Ac2 according to the second embodiment is further provided with a grid frequency detection unit 37c, a grid frequency control unit ("target parameter control unit") 38c, a cooperative correction value generation unit 39c, an adder 40c, a weighting unit 41c, and a communication unit 42c.

The grid frequency detection unit 37c detects the angular frequency ω of the electric power grid Bc. The grid frequency detection unit 37c detects the angular frequency from the voltage signal of the interconnection point at which the inverter device Ac2 is interconnected to the electric power grid Bc, and outputs the detected angular frequency as an angular frequency ω of the electric power grid Bc. Note that a commonly used technique such as a PLL method or a zero-crossing counting method need only be utilized as the method of detecting the angular frequency.

The grid frequency control unit 38c is for controlling the grid frequency. The grid frequency control unit 38c controls the grid frequency through adjusting the active power that is output by the inverter circuit 2c. The grid frequency control unit 38c receives input of a deviation Δω of the angular frequency w which is input from the grid frequency detection unit 37c from the grid frequency target value ω* which is the target value of the angular frequency ω, performs PI control, and outputs a grid frequency compensation value. The grid frequency compensation value is input to the adder 40c. Note that the grid frequency control unit 38c is not limited to PI control, and may be configured to perform other control such as I control. Also, a configuration may be adopted in which the grid frequency detection unit 37c detects a grid frequency f, and the grid frequency control unit 38c receives input of a deviation Δf of the grid frequency f from a target value f* thereof and outputs a grid frequency compensation value.

The cooperative correction value generation unit 39c generates the cooperative correction value for cooperating with the inverter devices Ac2. The cooperative correction value generation unit 39c will be discussed in detail later.

The adder 40c calculates the adjustment value $\Delta Id_i^*$ by adding the cooperative correction value that is input from the cooperative correction value generation unit 39c to the grid frequency compensation value that is input from the grid frequency control unit 38c. The adjustment value $\Delta Id_i^*$ that is output from the adder 40c is added to the active power compensation value that is output from the DC voltage control unit 32c, and the resultant value is input to the electric current control unit 33c as the target value Id*. The adder 40c also outputs the calculated adjustment value $\Delta Id_i^*$ to the weighting unit 41c.

The weighting unit 41c weights the adjustment value $\Delta Id_i^*$ that is input from the adder 40c. The weight value $W_i$ is set in advance in the weighting unit 41c. The weighting unit 41c outputs a weighted adjustment value $\Delta Id_i'$ obtained by dividing the adjustment value $\Delta Id_i^*$ by the weight value $W_i$ to the communication unit 42c and the cooperative correction value generation unit 39c.

The weight value $W_i$ is set in advance according to the size (adjustment amount) of the output active power that is to be adjusted by the inverter device Ac2. For example, the weight value $W_i$ may be set according to the capacity of each inverter device Ac2. Also, a configuration may be adopted in which the weight value $W_i$ is set according to the size of the solar cell panel of the solar cell 1c. Note that the method of setting the weight value $W_i$ is not limited.

The communication unit 42c communicates with the control circuit $3c'$ of another inverter device Ac2. The communication unit 42c receives input of the weighted adjustment value $\Delta Id_i'$ from the weighting unit 41c, and transmits the weighted adjustment value $\Delta Id_i'$ to the communication unit 42c of another inverter device Ac2. Also, the communication unit 42c outputs the compensation value $\Delta Id_j'$ received from the communication unit 42c of another inverter device Ac2 to the cooperative correction value generation unit 39c. Note that the communication method is not limited, and may be wired communication or wireless communication.

The communication unit 42c performs mutual communication with at least one inverter device Ac2, without needing to communicate with all of the inverter devices Ac2 that are interconnected to the electric power grid Bc and participating in cooperative operation for suppressing variation in the grid frequency, and it is sufficient if a state exists where a communication path exists to an arbitrary two inverter devices Ac2 participating in the cooperative operation ("connected state").

Next, the cooperative correction value generation unit 39c will be described in detail.

The cooperative correction value generation unit 39c generates the cooperative correction value for cooperating with each inverter device Ac2, the weighted adjustment value $\Delta Id_i'$ (hereinafter, abbreviated to "compensation value $\Delta Id_i'$") that is input from the weighting unit 41c and the compensation value $\Delta Id_j'$ of another inverter device Ac2 that is input from the communication unit 42c. Even if the compensation value $\Delta Id_i'$ and the compensation value $\Delta Id_j'$ differ, the compensation value $\Delta Id_i'$ and the compensation value $\Delta Id_j'$ are converged to a common value by the operation processing of the cooperative correction value generation unit 39c being repeated. As shown in FIG. 47, the cooperative correction value generation unit 39c is provided with an operation unit 391c, a multiplier 392c, and an integrator 393c.

The operation unit 391c performs the following operation processing that is based on the following equation (5c). That is, the operation unit 391c subtracts the compensation value $\Delta Id_i'$ that is input from the weighting unit 41c from each compensation value $\Delta Id_j'$ that is input from the communication unit 42c, and outputs an operation result $u_i$ obtained by adding together all the subtraction results to the multiplier 392c.

$$u_i = \sum_j (\Delta Id_j' - \Delta Id_i') \tag{5c}$$

The multiplier 392c multiplies the operation result $u_i$ that is input from the operation unit 391c by a predetermined coefficient ϵ, and outputs the resultant value to the integrator 393c. The coefficient ϵ is a value that satisfies $0 < \epsilon < 1/d_{max}$, and is set in advance. $d_{max}$ is the maximum value of $d_i$, which is the number of the other inverter devices Ac2 with which the communication unit 42c communicates, among all the inverter devices Ac2 connected to the electric power system. In other words, $d_{max}$ is the number of compensation values $\Delta Id_j'$ that is input to the communication unit 42c of the inverter device Ac2 that is communicating with the most other inverter devices Ac2, among the inverter devices Ac2 connected to the electric power system. Note that the operation result $u_i$ is multiplied by the coefficient $\epsilon$, in order to ensure that the variation in the cooperative correction value does not become too large due to the operation result $u_i$ being overly large (small). Accordingly, in the case where processing by the cooperative correction value generation unit 39c is continuous-time processing, the multiplier 392c does not need to be provided.

The integrator 393c generates the cooperative correction value by integrating the values that are input from the multiplier 392c, and outputs the generated cooperative correction value. The integrator 393c generates the cooperative correction value by adding the value that is input from the multiplier 392c to the cooperative correction value generated last time. The cooperative correction value is output to the adder 40c.

The cooperative correction value generation unit 39c generates the cooperative correction value using the compensation value $\Delta Id_i'$ that is input from the weighting unit 41c, and the compensation value $\Delta Id_j'$ of the other inverter devices Ac2 that is input from the communication unit 42c. The operation result $u_i$ that is output by the operation unit 391c will be a negative value, in the case where the compensation value $\Delta Id_i'$ is larger than the arithmetic mean of the compensation values $\Delta Id_j'$. When this is the case, the cooperative correction value decreases and the compensation value $\Delta Id_i'$ will also decrease. On the other hand, the operation result $u_i$ that is output by the operation unit 391c will be a positive value, in the case where the compensation value $\Delta Id_i'$ is smaller than the arithmetic mean of the compensation values $\Delta Id_j'$. When this is the case, the cooperative correction value increases and the compensation value $\Delta Id_i'$ will also increase. In other words, the compensation value $\Delta Id_i'$ approaches the arithmetic mean of the compensation values $\Delta Id_j'$. As a result of this processing being performed by each of the inverter devices Ac2, the compensation values $\Delta Id_i'$ of the inverter devices Ac2 converge to the same value. Because the compensation values $\Delta Id_i'$ converge to the same value, the adjustment value $\Delta Id_i^*$ before being weighted by the weighting unit 41c converges to a value that depends on the weight value $W_i$. Accordingly, the adjustment amount of the output active power of each inverter device Ac2 can be adjusted according to the weight value $W_i$.

Also, each inverter device Ac2 participating in the cooperative operation only performs mutual communication with at least one inverter device Ac2 (e.g., an inverter device A that is located nearby or with which communication has been established), the communication state of each inverter device Ac2 participating in the cooperative operation need only be in a connected state, and it is not necessary for one inverter device Ac2 or a monitoring device Cc to communicate with all the other inverter devices Ac2. Accordingly, the system does not become large-scale and can respond flexibly to an increase or decrease in number of the inverter devices Ac2 participating in the cooperative operation. Similar effects to the first embodiment can also be accomplished in the second embodiment.

Although the case where the inverter circuit 2c perform non-maximum power point tracking control was described in the first and second embodiments, the present invention is not limited thereto. A configuration may be adopted in which a DC/DC converter circuit provided upstream of the inverter circuit 2c performs non-maximum power point tracking control. The case where a DC/DC converter circuit performs non-maximum power point tracking control will be described below as a third embodiment.

Figure 48:
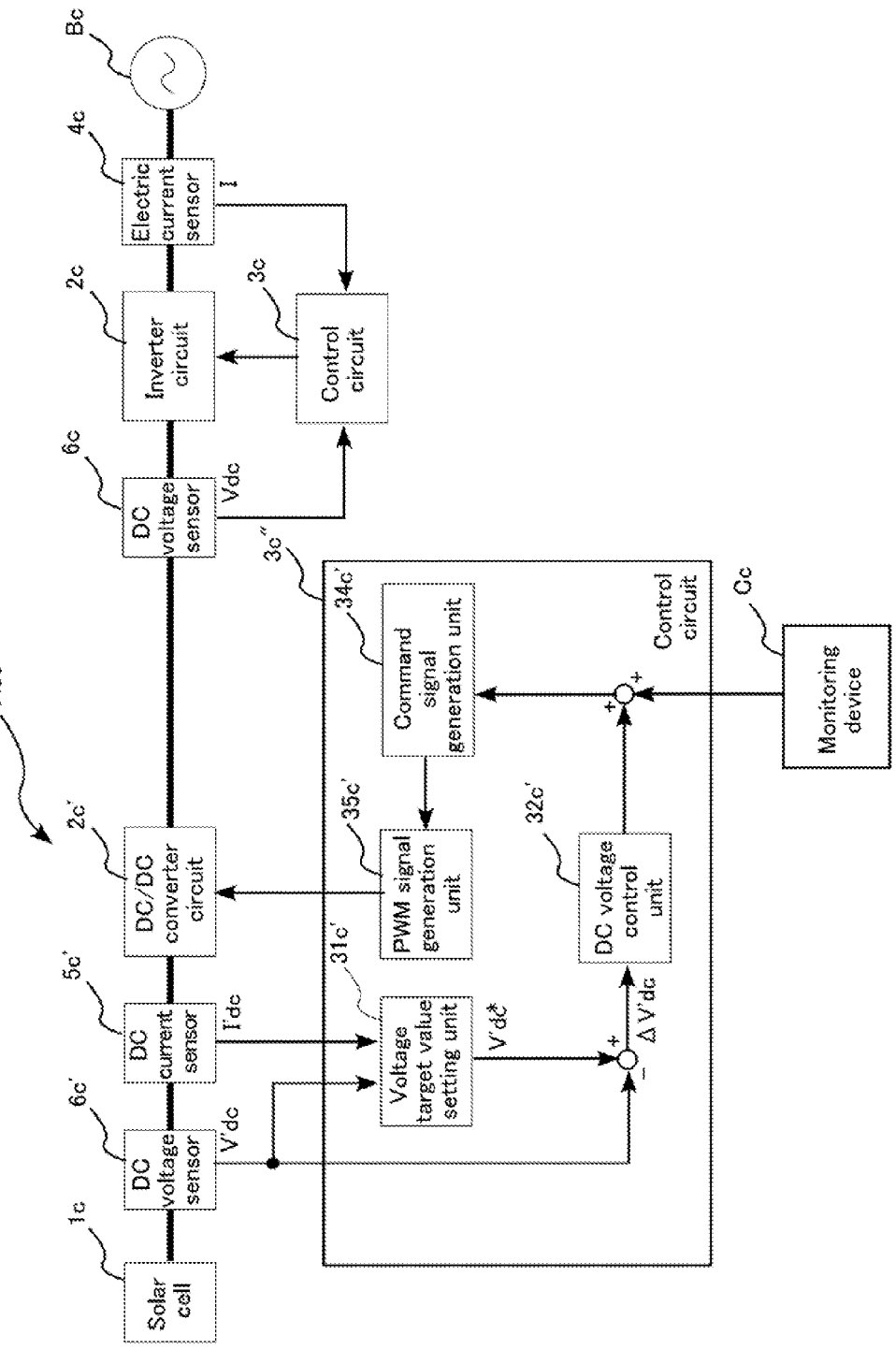
FIG. 48 is for illustrating an inverter device according to a third embodiment of the fourth aspect.

FIG. 48 is for illustrating an inverter device Ac3 according to the third embodiment. In the diagram, the same reference signs are given to elements that are the same as or similar to the inverter device Ac according to the first embodiment (see FIG. 41).

The inverter device Ac3 shown in FIG. 48 differs from the inverter device Ac according to the first embodiment in that a DC/DC converter circuit 2c' is provided upstream of the inverter circuit 2c, an DC current sensor 5c' and a DC voltage sensor 6c' for detecting the input voltage and the input current of the DC/DC converter circuit 2c' and a control circuit 3c" for controlling the DC/DC converter circuit 2c' are provided.

The DC/DC converter circuit 2c' steps the output voltage of the solar cell 1c up or down, and outputs the resultant voltage to the inverter circuit 2c. The DC/DC converter circuit 2c' steps the input voltage up or down, by switching a switching element that is not illustrated ON and OFF, based on the PWM signal that is input from control circuit 3c".

The DC current sensor 5c' detects the input current of the DC/DC converter circuit 2c' (i.e., the output current of the solar cell 1c). The DC current sensor 5c' digitally converts the detected current, and outputs the resultant current to the control circuit 3c" as a current signal I'dc. The DC voltage sensor 6c' detects the input voltage of the DC/DC converter circuit 2c' (i.e., the output voltage of the solar cell 1c). The DC voltage sensor 6c' digitally converts the detected voltage, and outputs the resultant voltage to the control circuit 3c" as a voltage signal V'dc.

The control circuit 3c" controls the DC/DC converter circuit 2c', and is realized by a microcomputer or the like, for example. The control circuit 3c" generates a PWM signal based on the DC current signal I'dc that is input from the DC current sensor 5c' and the DC voltage signal V'dc that is input from the DC voltage sensor 6c', and outputs the generated PWM signal to the DC/DC converter circuit 2c'. The control circuit 3c" is provided with a voltage target value setting unit 31c', a DC voltage control unit 32c', a command signal generation unit 34c', and a PWM signal generation unit 35c'.

The voltage target value setting unit 31c' is similar to the voltage target value setting unit 31c according to the first embodiment, and sets a voltage target value V'dc* that is a target value of the DC voltage signal V'dc. The voltage target value setting unit 31c' changes the voltage target value V'dc*, detects the output power of the solar cell 1c, and adjusts the voltage target value V'dc* such that the output power will be about 90 percent of the maximum power.

The DC voltage control unit 32c' is similar to the DC voltage control unit 32c according to the first embodiment, and is for controlling the output voltage of the solar cell 1c. The DC voltage control unit 32c' receives input of a deviation $\Delta V'dc$ (=V'dc*−V'dc) of the DC voltage signal V'dc that is output from the DC voltage sensor 6c' from the voltage target value V'dc* that is output from the voltage target value setting unit 31c', performs PI control, and outputs a DC voltage compensation value. In the inverter device Ac3, the DC/DC converter circuit 2c' performs non-maximum power point tracking control.

The command signal generation unit 34c' is similar to the command signal generation unit 34c according to the first embodiment, and generates a command signal based on a value obtained by adding the adjustment value that is input to inverter device Ac3 from the monitoring device Cc to the DC voltage compensation value that is output from the DC voltage control unit 32c', and outputs the generated command signal to the PWM signal generation unit 35c'.

The PWM signal generation unit 35c' is similar to the PWM signal generation unit 35c according to the first embodiment, and generates a PWM signal that is output to the DC/DC converter circuit 2c'. The PWM signal generation unit 35c' generates the PWM signal using the triangular wave comparison method, based on a carrier signal and the command signal that is input from the command signal generation unit 34c'. The generated PWM signal is output to the DC/DC converter circuit 2c'. Note that the PWM signal generation unit 35c' is not limited to generating the PWM signal using the triangular wave comparison method, and may generate the PWM signal with a hysteresis system, for example.

Note that the configuration of the control circuit 3c" is not limited to the above. Also, the control circuit 3c" was described as being realized as a digital circuit in the present embodiment, but may be realized as an analog circuit. Also, the processing that is performed by each constituent element is designed with a program, and a computer may be caused to function as the control circuit 3c" by executing the program. Also, a configuration may be adopted in which the program is recorded on a recording medium and read by a computer.

The inverter circuit 2c converts the DC power that is input from the DC/DC converter circuit 2c' into AC power. The control circuit 3c is not provided with a voltage target value setting unit 31c (see FIG. 41), and the voltage target value Vdc* is a fixed value. The output voltage of the DC/DC converter circuit 2c' is thereby fixed to the voltage target value Vdc*.

According to the third embodiment, the voltage target value setting unit 31c' changes the voltage target value V'dc*, and performs control such that the output power P of the solar cell 1c will be $P_{90}$ which is about 90 percent of the maximum power $P_{max}$. Accordingly, similar effects to the first embodiment can also be accomplished in the third embodiment.

Although the case where control circuits are used in the inverter devices that are interconnected to the electric power grid was described in the first to third embodiments, the fourth aspect of the instant invention is not limited to these embodiments. For example, a control circuit may be used as a control circuit of an inverter device that is used in a power plant that generates solar power (e.g., mega solar power plant).

The control circuit can also be used in a converter device that steps DC power that is output by a solar cell up or down. An example in the case where the control circuit is applied to a converter device will be described below as a fourth embodiment.

Figure 49:
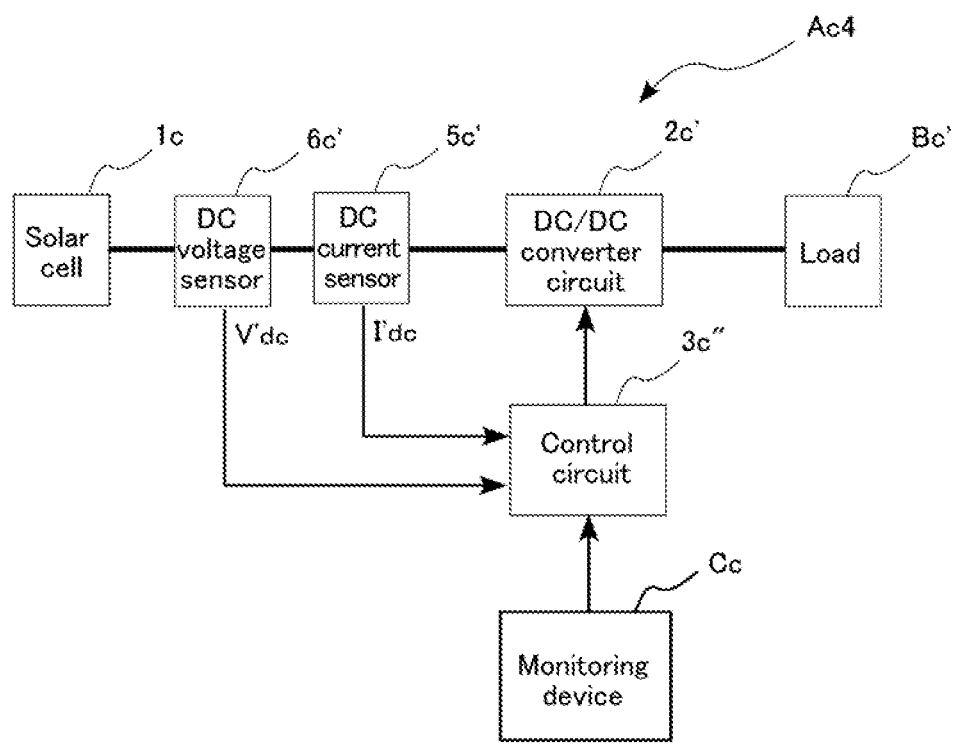
FIG. 49 is for illustrating an inverter device according to a fourth embodiment of the fourth aspect.

FIG. 49 is for illustrating a converter device Ac4 according to the fourth embodiment of the fourth aspect of the instant invention. In the diagram, the same reference signs are given to elements that are the same as or similar to the inverter device Ac3 according to the third embodiment (see FIG. 48).

The converter device Ac4 shown in FIG. 49 differs from the inverter device Ac3 according to the third embodiment in that an inverter circuit 2c, a control circuit 3c, an electric current sensor 4c and a DC voltage sensor 6c are not provided. The converter device Ac4 converts the DC voltage that is output by the solar cell 1c into a predetermined voltage using the DC/DC converter circuit 2c', and outputs the predetermined voltage to a load Bc'.

Similar effects to the first embodiment can also be accomplished in the fourth embodiment.

According to the fourth aspect of the instant invention, DC power that is output by a solar cell is controlled to be a power value that is not the maximum value. Accordingly, DC power that is output by a solar cell can be increased when necessary. Because the output power of the power converter circuit can thereby be increased, it is possible to participate in the cooperative operation for suppressing variation in the grid frequency, even in the case where the grid frequency falls.

The control circuits in the fourth aspect of the instant invention, the power conversion devices provided with the control circuits, and the methods are not limited to the abovementioned embodiments. Various design changes can be freely made to the specific configurations of the elements of the control circuits, the power conversion devices provided with the control circuits, and the methods.

The invention claimed is:

1. A control, circuit for controlling an inverter circuit that is included in one of a plurality of inverter devices that are connected in parallel in an electric power system and are not in a master-slave relationship, the control circuit comprising:
    a target parameter control unit for generating a compensation value for controlling a predetermined target parameter to be a target value;
    a cooperative correction value generation unit for generating a correction value for cooperating with another of the plurality of inverter devices;
    a PWM signal generation unit for generating a PWM signal based at least on a correction compensation value obtained by adding the correction value to the compensation value;
    a weighting unit for weighting the correction compensation value; and
    a communication unit for communicating with a predetermined number of other inverter devices,
    wherein the communication unit transmits the weighted correction compensation value to the predetermined number of other inverter devices, and
    the cooperative correction value generation unit generates the correction value, using an operation result that is based on the weighted correction compensation value and a reception compensation value that is received by the communication unit from each of the predetermined number of other inverter devices.

2. The control circuit according to claim 1, wherein the target parameter is an interconnection point voltage.

3. The control circuit according to claim 1, wherein the cooperative correction value generation unit includes:
    an operation unit for performing an operation that is based on the weighted correction compensation value and the reception compensation value; and
    an integration unit for calculating the correction value by integrating the operation result that is output by the operation unit.

4. The control circuit according to claim 1, wherein the operation unit calculates an operation result by subtracting the weighted correction compensation value from the reception compensation value received from each of the predetermined number of other inverter devices, and adding together all the subtraction results.

5. The control circuit according to claim 1, wherein the operation unit calculates an operation result by subtracting the weighted correction compensation value from the reception compensation value received from each of the predetermined number of other inverter devices, adding together all the subtraction results, and dividing the addition result by the predetermined number.

6. The control circuit according to claim 1, wherein the operation unit calculates an operation result by subtracting the weighted correction compensation value from the reception compensation value received from each of the predetermined number of other inverter devices, adding together all the subtraction results, and multiplying the addition result by the weighted correction compensation value.

7. The control circuit according to claim 1, wherein the operation unit calculates an operation result by subtracting the reception compensation value received from each of the predetermined number of other inverter devices from the weighted correction compensation value, adding together all the subtraction results, and multiplying the addition result by the square of the weighted correction compensation value.

8. The control circuit according to claim 1, wherein the weighting unit divides the correction compensation value by a weight value set in advance.

9. The control circuit according to claim 1, further comprising: a temperature detection unit for detecting a temperature of the inverter circuit; and a weight value setting unit for setting a weight value corresponding to the temperature,
wherein the weighting unit divides the correction compensation value by the weight value set by the weight value setting unit.

10. The control circuit according to claim 1, further comprising: a clock unit for outputting a date-time or a time; and a weight value setting unit for storing a weight value in association with the date-time or the time, and setting a weight value corresponding to the date-time or time output by the clock unit,
wherein the weighting unit divides the correction compensation value by the weight value set by the weight value setting unit.

11. The control circuit according to claim 1, further comprising: an active power calculation unit for calculating an output active power of the inverter circuit; and a weight value setting unit for setting a weight value corresponding to the output active power,
wherein the weighting unit divides the correction compensation value by the weight value set by the weight value setting unit.

12. An inverter device comprising:
the control circuit according to claim 1; and
an inverter circuit.

13. An electric power system in which a plurality of the inverter devices according to claim 12 are connected in parallel.

14. A control method for controlling an inverter circuit that is included in one of a plurality of inverter devices that are connected in parallel in an electric power system and are not in a master-slave relationship, the control method comprising:
a first step of generating a compensation value for controlling a predetermined target parameter to be a target value;
a second step of generating a correction value for cooperating with another of the plurality of inverter devices;
a third step of generating a PWM signal based at least on a correction compensation value obtained by adding the correction value to the compensation value;
a fourth step of weighting the correction compensation value;
a fifth step of transmitting the weighted correction compensation value to a predetermined number of other inverter devices; and
a sixth step of receiving a reception compensation value transmitted from each of the predetermined number of other inverter devices,
wherein, in the second step, the correction value is generated using an operation result that is based on the weighted correction compensation value and the reception compensation value in the sixth step.

15. The control method according to claim 14, wherein the target parameter is an interconnection point voltage.

* * * * *